US012604254B2

(12) United States Patent
Prasad et al.

(10) Patent No.: US 12,604,254 B2
(45) Date of Patent: Apr. 14, 2026

(54) FORWARDING-CAPABLE NETWORK ENTITY RECONFIGURATION RATE CONTROL

(71) Applicant: QUALCOMM Incorporated, San Diego, CA (US)

(72) Inventors: Narayan Prasad, Westfield, NJ (US); Yavuz Yapici, Florham Park, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 18/332,568

(22) Filed: Jun. 9, 2023

(65) Prior Publication Data

US 2024/0414626 A1 Dec. 12, 2024

(51) Int. Cl.
*H04W 40/24* (2009.01)
*H04W 24/02* (2009.01)

(52) U.S. Cl.
CPC ........... *H04W 40/24* (2013.01); *H04W 24/02* (2013.01)

(58) Field of Classification Search
None
See application file for complete search history.

(56) References Cited

U.S. PATENT DOCUMENTS

| | | | | |
|---|---|---|---|---|
| 11,540,089 | B1 * | 12/2022 | Balasubramanian ... | H04W 4/44 |
| 11,570,629 | B2 * | 1/2023 | Haija .................... | H04L 5/0048 |
| 2018/0091269 | A1 * | 3/2018 | Ratilainen ............ | H04W 72/54 |
| 2022/0322321 | A1 * | 10/2022 | Dai ....................... | H04W 72/51 |
| 2025/0202539 | A1 * | 6/2025 | Hemadeh ............. | H04J 11/0079 |

FOREIGN PATENT DOCUMENTS

| | | |
|---|---|---|
| WO | 2023283760 | 1/2023 |
| WO | 2023025888 A2 | 3/2023 |

OTHER PUBLICATIONS

International Search Report and Written Opinion—PCT/US2024/029435—ISA/EPO—Nov. 28, 2024.
Partial International Search Report—PCT/US2024/029435—ISA/EPO—Sep. 16, 2024.

* cited by examiner

*Primary Examiner* — Brian S Roberts
(74) *Attorney, Agent, or Firm* — Paul M. McAdams; Harrity & Harrity, LLP

(57) ABSTRACT

Various aspects of the present disclosure generally relate to wireless communication. In some aspects, a first network entity may transmit, to a forwarding-capable network entity and at a first time, a first forwarding configuration. The first network entity may transmit, to the forwarding-capable network entity and at a second time, a second forwarding configuration, wherein the transmission is associated with an amount of time between the first time and the second time. Numerous other aspects are described.

28 Claims, 17 Drawing Sheets

1210   Transmit, to a forwarding-capable network entity and at a first time, a first forwarding configuration 1220   Transmit, to the forwarding-capable network entity and at a second time, a second forwarding configuration, wherein the transmission is associated with an amount of time between the first time and the second time

1200

Receive, from a second network entity, information indicative of a network performance impact caused by a forwarding-capable network entity

1310

Transmit, in association with receiving the information, an indication of an amount of time associated with controlling a forwarding reconfiguration rate associated with the forwarding-capable network entity

1320

1300

1410    Receive, from a first network entity and at a first time, a first forwarding configuration 1420    Receive, from the first network entity and at a second time, a second forwarding configuration, wherein receiving the second forwarding configuration is associated with an amount of time between the first time and the second time

1400

1

FORWARDING-CAPABLE NETWORK ENTITY RECONFIGURATION RATE CONTROL

FIELD OF THE DISCLOSURE

Aspects of the present disclosure generally relate to wireless communication and to techniques and apparatuses for forwarding-capable network entity reconfiguration rate control.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for a user equipment (UE) or multiple UEs. A UE may communicate with a network entity via downlink communications and uplink communications. "Downlink" (or "DL") refers to a communication link from the network entity to the UE, and "uplink" (or "UL") refers to a communication link from the UE to the network node.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first network entity for wireless communication. The first network entity may include at least one memory and at least one communication interface. The first network entity may include at least one processor coupled to the at least one memory and the at least one communication interface. The first network entity may be configured to transmit, to a forwarding-capable network entity and at a first time, a first forwarding configuration. The first network entity may be configured to transmit, to the forwarding-capable network entity and at a second time, a second forwarding configuration, wherein the transmission is associated with an amount of time between the first time and the second time.

Some aspects described herein relate to a first network entity for wireless communication. The first network entity may include at least one memory and at least one communication interface. The first network entity may include at least one processor coupled to the at least one memory and the at least one communication interface. The first network entity may be configured to receive, from a second network entity, information indicative of a network performance impact caused by a forwarding-capable network entity. The first network entity may be configured to transmit, in association with receiving the information, an indication of an amount of time associated with controlling a forwarding reconfiguration rate associated with the forwarding-capable network entity.

Some aspects described herein relate to a method of wireless communication performed by a first network entity. The method may include receiving, from a second network entity, information indicative of a network performance impact caused by a forwarding-capable network entity. The method may include transmitting, in association with receiving the information, an indication of an amount of time associated with controlling a forwarding reconfiguration rate associated with the forwarding-capable network entity.

Some aspects described herein relate to a forwarding-capable network entity for wireless communication. The forwarding-capable network entity may include at least one memory and at least one communication interface. The forwarding-capable network entity may include at least one processor coupled to the at least one memory and the at least one communication interface. The forwarding-capable network entity may be configured to receive, from a first network entity and at a first time, a first forwarding configuration. The forwarding-capable network entity may be configured to receive, from the first network entity and at a second time, a second forwarding configuration, wherein receiving the second forwarding configuration is associated with an amount of time between the first time and the second time.

Some aspects described herein relate to a method of wireless communication performed by a forwarding-capable network entity. The method may include receiving, from a first network entity and at a first time, a first forwarding configuration. The method may include receiving, from the first network entity and at a second time, a second forwarding configuration, wherein receiving the second forwarding configuration is associated with an amount of time between the first time and the second time.

Some aspects described herein relate to a non-transitory computer-readable medium having instructions for wireless communication stored thereon. The instructions, when executed by a first network entity, may cause the first network entity to a transmit, to a forwarding-capable network entity and at a first time, a first forwarding configuration. The instructions, when executed by a first network entity, may cause the first network entity to transmit, to the forwarding-capable network entity and at a second time, a second forwarding configuration, wherein the transmission is associated with an amount of time between the first time and the second time.

Some aspects described herein relate to a non-transitory computer-readable medium having instructions for wireless communication stored thereon. The instructions, when executed by a first network entity, may cause the first network entity to receive, from a second network entity, information indicative of a network performance impact caused by a forwarding-capable network entity. The instructions, when executed by the first network entity, may cause the first network entity to transmit, in association with receiving the information, an indication of an amount of time associated with controlling a forwarding reconfiguration rate associated with the forwarding-capable network entity.

Some aspects described herein relate to a non-transitory computer-readable medium having instructions for wireless communication stored thereon. The instructions, when executed by a forwarding-capable network entity, cause the forwarding-capable network entity to receive, from a first network entity and at a first time, a first forwarding configuration. The instructions, when executed by the forwarding-capable network entity, cause the forwarding-capable network entity to receive, from the first network entity and at a second time, a second forwarding configuration, wherein receiving the second forwarding configuration is associated with an amount of time between the first time and the second time.

Some aspects described herein relate to an apparatus for wireless communication. The apparatus may include means for transmitting, to a forwarding-capable network entity and at a first time, a first forwarding configuration. The apparatus may include means for transmitting, to the forwarding-capable network entity and at a second time, a second forwarding configuration, wherein the transmission is associated with an amount of time between the first time and the second time.

Some aspects described herein relate to an apparatus for wireless communication. The apparatus may include means for receiving, from a second network entity, information indicative of a network performance impact caused by a forwarding-capable network entity. The apparatus may include means for transmitting, in association with receiving the information, an indication of an amount of time associated with controlling a forwarding reconfiguration rate associated with the forwarding-capable network entity.

Some aspects described herein relate to an apparatus for wireless communication. The apparatus may include means for receiving, from a first network entity and at a first time, a first forwarding configuration. The apparatus may include means for receiving, from the first network entity and at a second time, a second forwarding configuration, wherein receiving the second forwarding configuration is associated with an amount of time between the first time and the second time.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing broadly outlines example features and example technical advantages of examples according to the disclosure. Additional example features and example advantages are described hereinafter.

BRIEF DESCRIPTION OF THE DRAWINGS

The appended drawings illustrate certain example aspects of this disclosure and are therefore not limiting in scope. The same reference numbers in different drawings may identify the same or similar elements.

DETAILED DESCRIPTION

Figure 1:
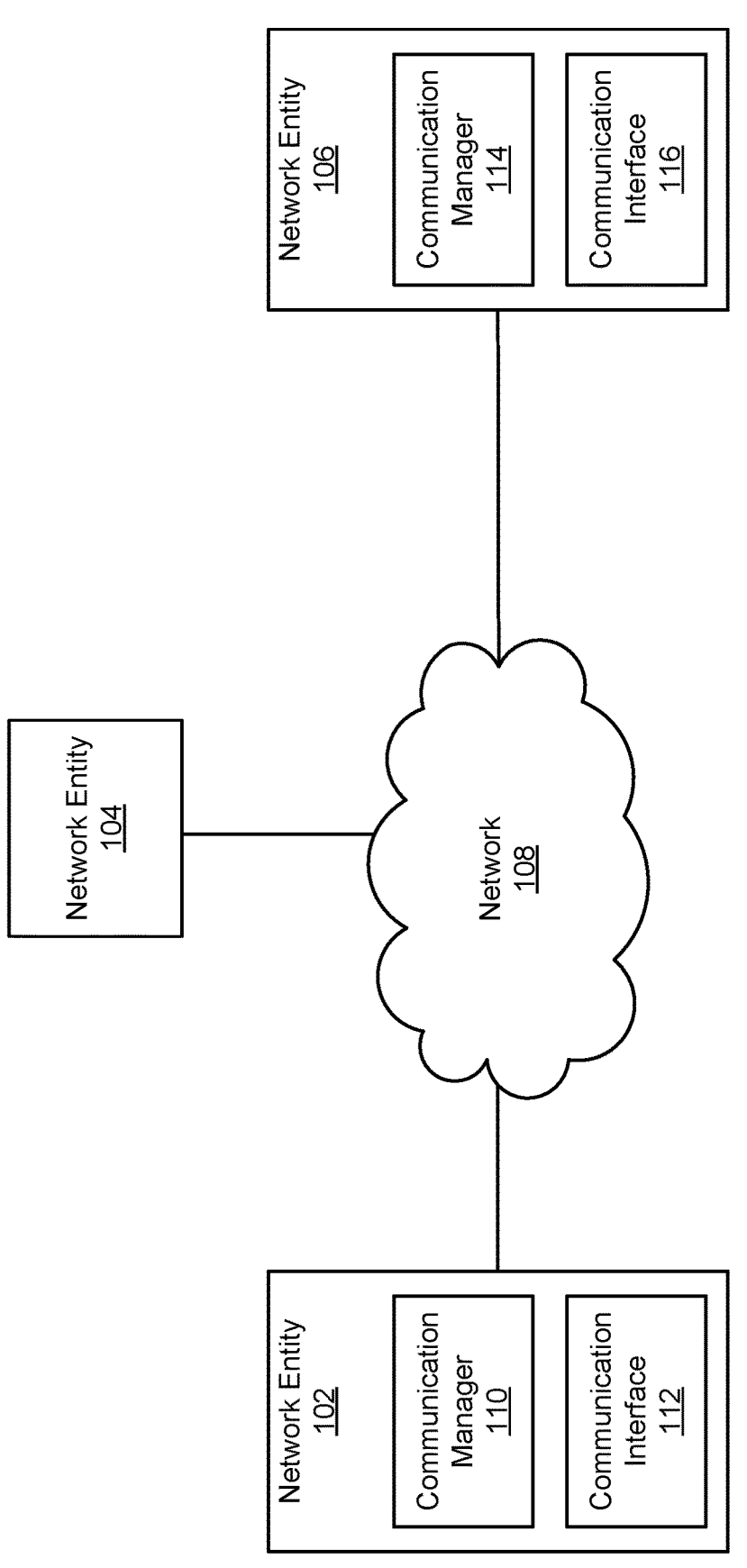
FIG. 1 is a diagram illustrating an example environment in which apparatuses and/or methods described herein may be implemented, in accordance with the present disclosure.

In some examples, a transmitting device may transmit a signal that is forwarded (e.g., reflected, redirected, and/or refracted) by a forwarding-capable network entity to a receiving device. The forwarding-capable network entity may be a reconfigurable intelligent surface (RIS) (among other examples described herein) and may have an array of passive and reconfigurable reflecting or refracting elements that can boost coverage and spectral efficiency at a low deployment cost. The reconfigurability of a forwarding-capable network entity may enable a transmitting device, such as a network entity (e.g., a base station or a user equipment (UE)), to realize multiple anomalous reflections or redirections, which are reflections or redirections that would have altered forwarding angles (e.g., that violate Snell's law). Each reflection or redirection may be specified by a target incident direction and a forwarding direction. The ability to select multiple anomalous reflections or redirections may enable a network entity to have more options or more flexibility in UE selection (e.g., selection of a forwarding angle in a spatial direction toward a given UE) and may enhance an end-to-end channel to the UEs.

For example, the forwarding-capable network entity may forward (e.g., reflect, redirect, refract, and/or otherwise forward) signals in various spatial directions (e.g., various beam directions or beam states). For example, the forwarding-capable network entity may be configured (e.g., via a first forwarding configuration from a network entity) to forward a signal using a first beam state. The first beam state may cause the signal to be forwarded (e.g., via the forwarding-capable network entity) in a spatial direction toward another network entity (e.g., a UE). As another example, the forwarding-capable network entity may be configured (e.g., via a second forwarding configuration from the network entity) to forward the signal using a second beam state. The second beam state may cause the signal to be forwarded in a spatial direction toward another UE. However, the spatial direction toward the other UE may also be toward a UE that is operating in a different cell and/or using a different frequency band. As a result, the signal forwarded by the forwarding-capable network entity in the second beam state may cause interference at the other UE.

Additionally, the forwarding-capable network entity may not support controllable frequency selective operations. For example, the reconfigurable elements (e.g., meta-elements) of the forwarding-capable network entity may be configured to reflect and/or redirect signals using a reflection (or reflective) coefficient. However, the reconfigurable elements and/or the forwarding-capable network entity may not be capable of filtering and/or selecting to forward (e.g., reflect, redirect, and/or refract) only signals associated with a given frequency. In other words, any incident signal arriving at the forwarding-capable network entity may be forwarded in accordance with a current forwarding configuration. Therefore, even signals associated with a different frequency band and/or different cell than the frequency band and/or cell for which the forwarding-capable network entity is configured to assist may be forwarded by the forwarding-capable network entity (e.g., signals associated with a frequency band other than the first frequency band and/or associated with a cell other than the first cell may also be forwarded by the forwarding-capable network entity). The signals associated with a different frequency band and/or different cell that are forwarded by the forwarding-capable network entity may cause interference within the first cell and/or within another cell.

Therefore, signals that are forwarded (e.g., reflected, redirected, and/or refracted) by the forwarding-capable network entity may cause out-of-band interference and/or inter-cell interference. The interference caused by the signals that are forwarded by the forwarding-capable network entity may be exacerbated in multi-band and/or multi-cell scenarios where the forwarding-capable network entity is operating in a geographic region in which network entities are communicating via multiple frequency bands and/or via multiple cells. Additionally, the interference caused by the signals that are forwarded by the forwarding-capable network entity may be worsened by the forwarding configuration of the forwarding-capable network entity changing frequently over time. For example, frequently changing the forwarding configuration of the forwarding-capable network entity may result in interference experienced at a given network entity changing frequently over time (e.g., an interference profile experienced by the given network entity may change frequently over time). It may be more difficult for the given network entity to mitigate and/or compensate for interference experienced by the given network entity when the interference experienced at the given network entity is changing frequently over time.

Various aspects relate generally to wireless communication and more particularly to forwarding-capable network entity reconfiguration rate control. Some aspects more specifically relate to controlling a rate at which a forwarding-capable network entity can be reconfigured. In some aspects, a network entity (e.g., that controls and/or serves a forwarding-capable network entity) may obtain (e.g., receive and/or determine) one or more reconfiguration rate control settings. The network entity may transmit one or more forwarding configurations to the forwarding-capable network entity in accordance with the one or more reconfiguration rate control settings.

For example, the one or more reconfiguration rate control settings may include a timer setting. The timer setting may indicate an amount of time associated with a timer. After transmitting a first forwarding configuration to the forwarding-capable network entity (e.g., at a first time), the network entity may initiate the timer. The network entity may transmit, to the forwarding-capable network entity, a second forwarding configuration (e.g., at a second time) based on, in response to, or otherwise associated with an expiration of the timer (e.g., based on, in response to, or otherwise associated with a difference between the first time and the second time being greater than or equal to an amount of time indicated by the timer setting).

In some aspects, the one or more reconfiguration rate control settings may be based on, or otherwise associated with, differential utility information. "Differential utility information" includes information that is indicative of a network performance difference between a first reconfiguration rate control setting (e.g., a first timer setting) and a second reconfiguration rate control setting (e.g., a second timer setting). For example, the first timer setting may be a current timer setting used by the forwarding-capable network entity, and the second timer setting may be a candidate timer setting. The network performance difference may be a network utility difference. For example, the difference in network performance may be a difference in a spectral efficiency for one or more network entities (e.g., UEs) served by a given network entity, a difference in a latency and/or throughput, a difference in one or more channel quality metrics (e.g., signal-to-noise ratio (SNR) or signal-to-interference-plus-noise ratio (SINR)), among other examples.

Particular aspects of the subject matter described in this disclosure can be implemented to realize one or more of the following potential advantages. In some aspects, by controlling the rate at which a forwarding-capable network entity can be reconfigured, other network entities (e.g., UEs) that may be impacted by signals forwarded by the forwarding-capable network entity may have enough time to measure interference caused by the signals and perform one or more operations to mitigate the interference. As another example the one or more reconfiguration rate control settings (e.g., a timer setting) for a forwarding-capable network entity may ensure a highest level of network performance among network entities (e.g., UEs) served by the forwarding-capable network entity and one or more other network entities (e.g., UEs) that may be impacted by signals forwarded by the forwarding-capable network entity (e.g., because the one or more reconfiguration rate control settings may be based on, or otherwise associated with, the differential utility information).

Various aspects of the disclosure are described more fully hereinafter with reference to the accompanying drawings. This disclosure may, however, be embodied in many different forms and is not limited to any specific structure, function, example, aspect, or the like presented throughout this disclosure. This disclosure includes, for example, any aspect disclosed herein, whether implemented independently of or combined with any other aspect of the disclosure. For example, an apparatus may be implemented or a method may be practiced using any number of the aspects set forth herein. In addition, the scope of the disclosure includes such an apparatus or method which is practiced using other structure, functionality, or structure and functionality in addition to or other than the various aspects of the disclosure set forth herein. Any aspect of the disclosure disclosed herein may be embodied by one or more elements of a claim.

Aspects and examples generally include a method, apparatus, network node, network entity, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the example concepts disclosed herein, both their organization and method of operation, together with associated example advantages, are described in the following description and in connection with the accompanying figures. Each of the figures is provided for the purposes of illustration and description, and not as a definition of the limits of the claims. Each of the figures is provided for the purposes of illustration and description, and not as a definition of the limits of the claims.

While aspects are described in the present disclosure by illustration to some examples, those skilled in the art understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described example aspects and example features may include additional example components and example features for implementation and practice of claimed and described aspects. For example, transmission and reception of wireless signals may include one or more components for analog and digital purposes (e.g., hardware components including antennas, RF chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems are presented with reference to various apparatuses and techniques. These apparatuses and techniques are described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example environment 100 in which apparatuses and/or methods described herein may be implemented, in accordance with the present disclosure. As shown in FIG. 1, the environment 100 may include a network entity 102, a network entity 104, and a network entity 106, that may communicate with one another via a network 108. The network entities 102, 104, and 106, may be dispersed throughout the network 108, and each network entity 102, 104, and 106 may be stationary and/or mobile. The network 108 may include wired communication connections, wireless communication connections, or a combination of wired and wireless communication connections.

The network 108 may include, for example, a cellular network (e.g., a Long-Term Evolution (LTE) network, a code division multiple access (CDMA) network, a 4G network, a 5G network, a 6G network, or another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In general, any number of networks 108 may be deployed in a given geographic area. Each network 108 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, Open-RAT, NR or 5G RAT networks may be deployed.

In some aspects, the environment 100 may include one or more non-terrestrial network (NTN) deployments in which a non-terrestrial wireless communication device may include a non-terrestrial network entity (e.g., the network entity 102, 104, and 106). The non-terrestrial network entity may include a network entity such as, for example, a UE (which may be referred to herein, interchangeably, as a "non-terrestrial UE"), a base station (referred to herein, interchangeably, as a "non-terrestrial BS" and "non-terrestrial base station"), and/or a relay station (referred to herein, interchangeably, as a "non-terrestrial relay station"), among other examples. As used herein, "NTN" may refer to a network for which access is facilitated by a non-terrestrial network entity such as a non-terrestrial UE, a non-terrestrial base station, and/or a non-terrestrial relay station, among other examples.

One or more of the network entities 102, 104, and 106 may be, include, or be included in, any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. Satellites may communicate directly and/or indirectly with other entities in the environment using satellite communication. The other entities may include UEs (e.g., terrestrial UEs and/or non-terrestrial UEs), other satellites in the one or more NTN deployments, other types of base stations (e.g., stationary and/or ground-based base stations), relay stations, and/or one or more components and/or devices included in a core network, among other examples.

As described herein, a network entity (which may alternatively be referred to as an entity, a node, a network node, or a wireless entity) may be, be similar to, include, or be included in (e.g., be a component of) a base station (e.g., any base station described herein, including a disaggregated base station), a UE (e.g., any UE described herein), a reduced capability (RedCap) device, an enhanced reduced capability (eRedCap) device, an ambient internet-of-things (IoT) device, an energy harvesting (EH)-capable device, a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network entity may be a UE. As another example, a network entity may be a base station. As used herein, "network entity" may refer to an entity that is configured to operate in a network, such as the network 108. For example, a "network entity" is not limited to an entity that is currently located in and/or currently operating in the network. Rather, a network entity may be any entity that is capable of communicating and/or operating in the network.

The adjectives "first," "second," "third," and so on are used for contextual distinction between two or more of the modified noun in connection with a discussion and are not meant to be absolute modifiers that apply only to a certain respective entity throughout the entire document. For example, a network entity may be referred to as a "first network entity" in connection with one discussion and may be referred to as a "second network entity" in connection with another discussion, or vice versa. As an example, a first network entity may be configured to communicate with a second network entity or a third network entity. In one aspect of this example, the first network entity may be a UE, the second network entity may be a base station, and the third network entity may be a UE. In another aspect of this example, the first network entity may be a UE, the second network entity may be a base station, and the third network entity may be a base station. In yet other aspects of this example, the first, second, and third network entities may be different relative to these examples.

Similarly, reference to a UE, base station, apparatus, device, computing system, or the like may include disclosure of the UE, base station, apparatus, device, computing system, or the like being a network entity. For example, disclosure that a UE is configured to receive information from a base station also discloses that a first network entity is configured to receive information from a second network entity. Consistent with this disclosure, once a specific example is broadened in accordance with this disclosure (e.g., a UE is configured to receive information from a base station also discloses that a first network entity is configured to receive information from a second network entity), the broader example of the narrower example may be interpreted in the reverse, but in a broad open-ended way. In the example above where a UE is configured to receive information from a base station also discloses that a first network entity is configured to receive information from a second network entity, the first network entity may refer to a first UE, a first base station, a first apparatus, a first device, a first computing system, a first set of one or more one or more components, a first processing entity, or the like configured to receive the information; and the second network entity may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network entity may be described as being configured to transmit information to a second network entity. In this example and consistent with this disclosure, disclosure that the first network entity is configured to transmit information to the second network entity includes disclosure that the first network entity is configured to provide, send, output, communicate, or transmit information to the second network entity. Similarly, in this example and consistent with this disclosure, disclosure that the first network entity is configured to transmit information to the second network entity includes disclosure that the second network entity is configured to receive, obtain, or decode the information that is provided, sent, output, communicated, or transmitted by the first network entity.

As shown, the network entity 102 may include a communication manager 110 and one or more communication interfaces 112. The communication manager 110 may be configured to perform one or more communication tasks as described herein. In some aspects, the communication manager 110 may direct the communication interface 112 to perform one or more communication tasks as described herein. Similarly, the network entity 106 may include a communication manager 114 and one or more communication interfaces 116. The communication manager 114 may be configured to perform one or more communication tasks as described herein. In some aspects, the communication manager 114 may direct the communication interface 116 to perform one or more communication tasks as described herein. Although depicted, for clarity of description, with reference only to the network entities 102 and 104, any one or more of the network entities 102, 104, and 106 also may include a communication manager and a communication interface.

As used herein, "communication interface" refers to an interface that enables communication (e.g., wireless communication or wired communication) between a first network entity and a second network entity. A communication interface may include electronic circuitry that enables a network entity to transmit, receive, or otherwise perform the communication. A communication interface may include one or more components that are configured to enable communication between the first network entity and the second network entity. For example, a communication interface may include a transmission component, a reception component, and/or a transceiver, among other examples. Communication interfaces are described in more detail elsewhere herein, such as in connection with FIG. 2.

As described in more detail elsewhere herein, the network entity 102 may (e.g., the communication manager 110 may, or may cause the communication interface 112 to) transmit, to a forwarding-capable network entity and at a first time, a first forwarding configuration; and/or transmit, to the forwarding-capable network entity and at a second time, a second forwarding configuration, where the transmission is associated with an amount of time between the first time and the second time. Additionally, or alternatively, the network entity 102 and/or the communication manager 110 may perform one or more other operations described herein.

As described in more detail elsewhere herein, the network entity 106 may (e.g., the communication manager 114 may, or may cause the communication interface 116 to) receive, from a second network entity, information indicative of a network performance impact caused by a forwarding-capable network entity; and/or transmit, in association with receiving the information, an indication of an amount of time associated with controlling a forwarding reconfiguration rate associated with the forwarding-capable network entity. Additionally, or alternatively, the network entity 106 and/or the communication manager 114 may perform one or more other operations described herein.

The number and arrangement of entities shown in FIG. 1 are provided as one or more examples. In practice, there may be additional network entities and/or networks, fewer network entities and/or networks, different network entities and/or networks, or differently arranged network entities and/or networks than those shown in FIG. 1. Furthermore, the network entity 102, 104, and 106 may be implemented using a single apparatus or multiple apparatuses.

Figure 2:
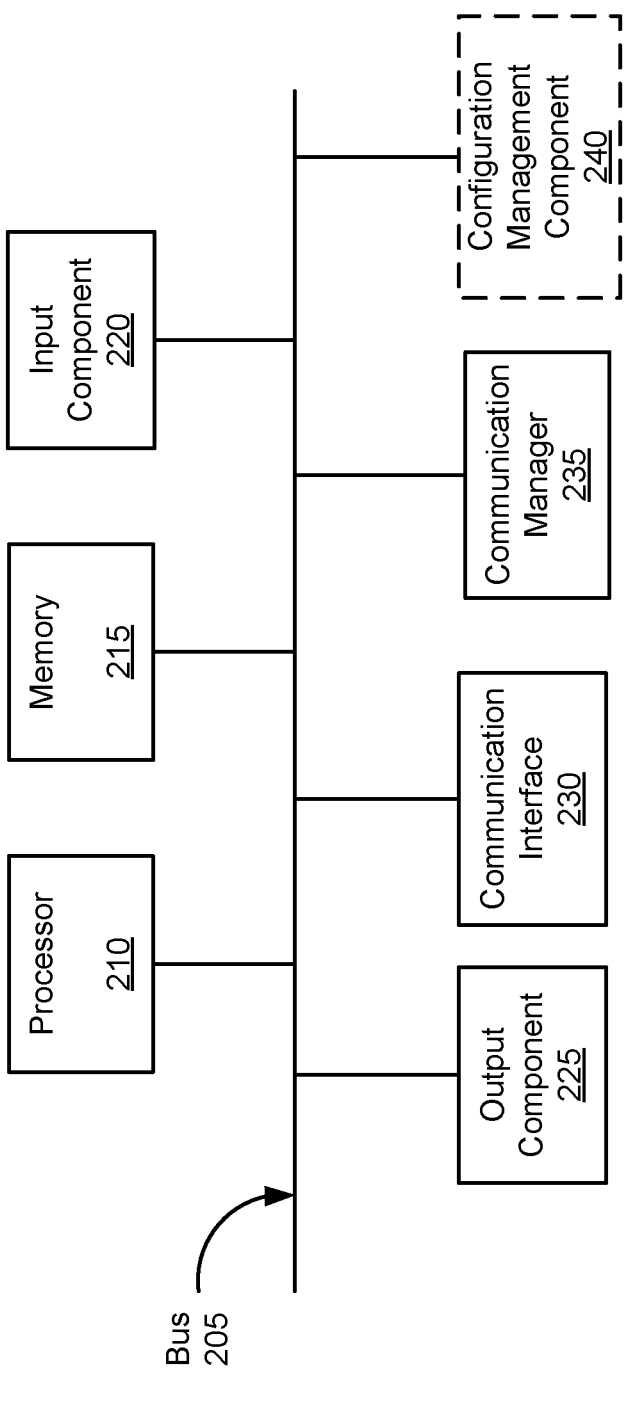
FIG. 2 is a diagram of example components of an apparatus, in accordance with the present disclosure.

FIG. 2 is a diagram of example components of an apparatus 200, in accordance with the present disclosure. The apparatus 200 may correspond to any one or more of the network entities 102, 104, and 106 or another network entity described herein. Additionally, or alternatively, any one or more of the network entities 102, 104, and 106 or another network entity described herein may include one or more apparatuses 200 and/or one or more components of the apparatus 200. For example, in some aspects, the apparatus 200 may include an apparatus (e.g., a device, a device component, a modem, a chip, and/or a set of device components, among other examples) that is configured to perform a wireless communication method, as described herein. As shown in FIG. 2, the apparatus 200 may include components such as a bus 205, a processor 210, a memory 215, an input component 220, an output component 225, a communication interface 230, a communication manager 235, and a configuration management component 240. Any one or more of the components 205, 210, 215, 220, 225 230, 235, and/or 240 may be implemented in hardware, software, or a combination of hardware and software.

The bus 205 includes a component that permits communication among the components of the apparatus 200. The processor 210 includes a central processing unit (CPU), a graphics processing unit (GPU), an accelerated processing unit (APU), a digital signal processor (DSP), a microprocessor, a microcontroller, a field-programmable gate array (FPGA), an application-specific integrated circuit (ASIC), and/or another type of processing component. In some aspects, the processor 210 includes one or more processors capable of being programmed to perform a function.

The memory 215 includes a random-access memory (RAM), a read only memory (ROM), and/or another type of dynamic or static storage device (e.g., a flash memory, a magnetic memory, and/or an optical memory) that stores information and/or instructions for use by the processor 210. The memory 215 may store other information and/or software related to the operation and use of the apparatus 200. For example, the memory 215 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium.

The input component 220 includes a component that permits the apparatus 200 to receive information, such as via user input. For example, the input component 220 may be associated with a user interface as described herein (e.g., to permit a user to interact with the one or more features of the apparatus 200). The input component 220 may include a capacitive touchscreen display that can receive user inputs. The input component 220 may include a keyboard, a keypad, a mouse, a button, a switch, and/or a microphone, among other examples. Additionally, or alternatively, the input component 220 may include a sensor for sensing information (e.g., a vision sensor, a location sensor, an accelerometer, a gyroscope, and/or an actuator, among other examples). In some aspects, the input component 220 may include a camera (e.g., a high-resolution camera and/or a low-resolution camera, among other examples). The output component 225 may include a component that provides output from the apparatus 200 (e.g., a display, a speaker, and/or one or more light-emitting diodes (LEDs), among other examples).

The communication interface 230 may include a transmission component and/or a reception component. For example, the communication interface 230 may include a transceiver and/or one or more separate receivers and/or transmitters that enable the apparatus 200 to communicate with other devices, such as via a wired connection, a wireless connection, or a combination of wired and wireless connections. In some aspects, the communication interface may include one or more radio frequency reflective elements and/or one or more radio frequency refractive elements. The communication interface 230 may permit the apparatus 200 to receive information from another apparatus and/or provide information to another apparatus. For example, the communication interface 230 may include an Ethernet interface, an optical interface, a coaxial interface, an infrared interface, an RF interface, a universal serial bus (USB) interface, a Wi-Fi interface, a cellular network interface, a wireless modem, an inter-integrated circuit ($I^2C$), and/or a serial peripheral interface (SPI), among other examples.

The communication manager 235 may include hardware, software, or a combination of hardware and software configured to cause the apparatus 200 to perform one or more communication tasks associated with the communication manager 110 and/or the communication interface 112 or the communication interface 230. Similarly, the communication manager 235 may include hardware, software, or a combination of hardware and software configured to cause the apparatus 200 to perform one or more communication tasks associated with the communication manager 114 and/or the communication interface 116 or the communication interface 230. In some aspects, the communication manager 235 may be, be similar to, include, or be included in, the communication manager 110 and/or the communication manager 114 depicted in FIG. 1. In some aspects, the communication manager 235 may include the processor 210, the memory 215, the input component 220, the output component 225, the communication interface 230, and/or the configuration management component 240, and/or one or more aspects thereof. The configuration management component 240 may include hardware, software, or a combination of hardware and software configured to cause the apparatus 200 to manage forwarding configurations of one or more forwarding-capable network entities, as described in more detail elsewhere herein. For example, the configuration management component 240 may determine whether it is permissible to reconfigure a forwarding-capable network entity (e.g., based on, or otherwise associated with, one or more reconfiguration rate control settings).

As indicated above, FIG. 2 is provided as an example. Other examples may differ from what is described with regard to FIG. 2.

As described above, in some aspects, the network 108 depicted in FIG. 1 may include a cellular network that includes a RAT. While some aspects may be described herein using terminology commonly associated with a 5G or NR RAT, aspects of the present disclosure can be applied to other RATs, such as a 3G RAT, a 4G RAT, and/or a RAT subsequent to 5G (e.g., 6G).

Figure 3:
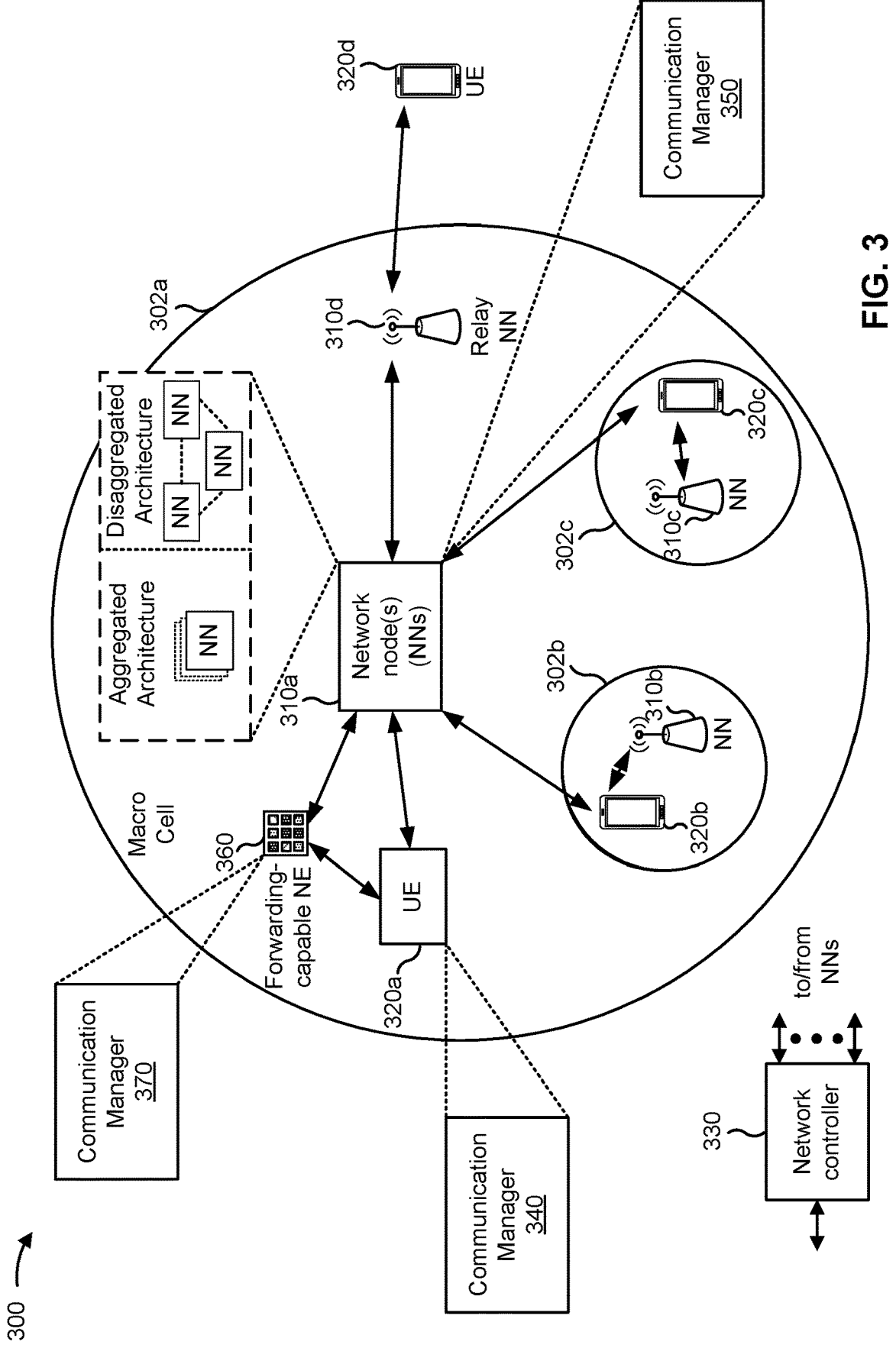
FIG. 3 is a diagram illustrating an example of a wireless network, in accordance with the present disclosure.

FIG. 3 is a diagram illustrating an example of a wireless network 300, in accordance with the present disclosure. The wireless network 300 may be or may include elements of a 4G (e.g., LTE) network, a 5G (e.g., NR) network, and/or, a 6G network, among other examples. The wireless network 300 may include one or more network nodes 310 (shown as a network node 310a, a network node 310b, a network node 310c, and a network node 310d), a UE 320 or multiple UEs 320 (shown as a UE 320a, a UE 320b, a UE 320c, and a UE 320d), and/or other entities. A network node 310 is a network node that communicates with UEs 320. As shown, a network node 310 may include one or more network nodes. For example, a network node 310 may be an aggregated network node, meaning that the aggregated network node is configured to utilize a radio protocol stack that is physically or logically integrated within a single radio access network (RAN) node (e.g., within a single device or unit). As another example, a network node 310 may be a disaggregated network node (sometimes referred to as a disaggregated base station), meaning that the network node 310 is configured to utilize a protocol stack that is physically or logically distributed among two or more nodes (such as one or more CUs, one or more DUs, or one or more RUs).

In some examples, a network node 310 is or includes a network node that communicates with UEs 320 via a radio access link, such as an RU. In some examples, a network node 310 is or includes a network node that communicates with other network nodes 310 via a fronthaul link or a midhaul link, such as a DU. In some examples, a network node 310 is or includes a network node that communicates with other network nodes 310 via a midhaul link or a core network via a backhaul link, such as a CU. In some examples, a network node 310 (such as an aggregated network node 310 or a disaggregated network node 310) may include multiple network nodes, such as one or more RUs, one or more CUs, and/or one or more DUs. A network node 310 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 310 may be interconnected to one another or to one or more other network nodes 310 in the wireless network 300 through various types of fronthaul, midhaul, and/or backhaul interfaces, such as a direct physical connection, an air interface, or a virtual network, using any suitable transport network.

In some examples, a network node 310 may provide communication coverage for a particular geographic area. In the Third Generation Partnership Project (3GPP), the term "cell" can refer to a coverage area of a network node 310 and/or a network node subsystem serving this coverage area, depending on the context in which the term is used. A network node 310 may provide communication coverage for a macro cell, a pico cell, a femto cell, and/or another type of cell. A macro cell may cover a relatively large geographic area (e.g., several kilometers in radius) and may allow unrestricted access by UEs 320 with service subscriptions. A pico cell may cover a relatively small geographic area and may allow unrestricted access by UEs 320 with service subscriptions. A femto cell may cover a relatively small geographic area (e.g., a home) and may allow restricted access by UEs 320 having association with the femto cell (e.g., UEs 320 in a closed subscriber group (CSG)). A network node 310 for a macro cell may be referred to as a macro network node. A network node 310 for a pico cell may be referred to as a pico network node. A network node 310 for a femto cell may be referred to as a femto network node or an in-home network node. In the example shown in FIG. 3, the network node 310a may be a macro network node for a macro cell 302a, the network node 310b may be a pico network node for a pico cell 302b, and the network node 310c may be a femto network node for a femto cell 302c. A network node may support one or multiple (e.g., three) cells. In some examples, a cell may not necessarily be stationary, and the geographic area of the cell may move according to the location of a network node 310 that is mobile (e.g., a mobile network node).

In some aspects, the terms "base station" or "network entity" may refer to an aggregated base station, a disaggregated base station, an IAB node, a relay node, or one or more components thereof. For example, in some aspects, "base station" or "network entity" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the network node 310. In some aspects, the term "base station" or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations or one or more virtual base station functions. For example, in some aspects, two or more base station functions may be instantiated on a single device. In some aspects, the term "base station" or "network entity"

may refer to one of the base station functions and not another. In this way, a single device may include more than one base station.

The wireless network 300 may include one or more relay stations. A relay station is a network node that can receive a transmission of data from an upstream node (e.g., a network node 310 or a UE 320) and send a transmission of the data to a downstream node (e.g., a UE 320 or a network node 310). A relay station may be a UE 320 that can relay transmissions for other UEs 320. In the example shown in FIG. 3, the network node 310*d* (e.g., a relay network node) may communicate with the network node 310*a* (e.g., a macro network node) and the UE 320*d* in order to facilitate communication between the network node 310*a* and the UE 320*d*. A network node 310 that relays communications may be referred to as a relay station, a relay base station, a relay network node, a relay node, a relay, or the like.

The wireless network 300 may be a heterogeneous network that includes network nodes 310 of different types, such as macro network nodes, pico network nodes, femto network nodes, relay network nodes, or the like. These different types of network nodes 310 may have different transmit power levels, different coverage areas, and/or different impacts on interference in the wireless network 300. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 330 may couple to or communicate with a set of network nodes 310 and may provide coordination and control for these network nodes 310. The network controller 330 may communicate with the network nodes 310 via a backhaul communication link or a midhaul communication link. The network nodes 310 may communicate with one another directly or indirectly via a wireless or wireline backhaul communication link. In some aspects, the network controller 330 may be a CU or a core network device, or may include a CU or a core network device.

For example, in some aspects, the wireless network 300 may be, include, or be included in a wireless backhaul network, sometimes referred to as an IAB network. In an IAB network, at least one network entity (e.g., network node 310) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations or IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station(s) may communicate with one or more UEs (e.g., UE 320) via access links, which may be wireless links for carrying access traffic.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target network entity (e.g., a UE and/or a base station). In this way, inter-link interference may be reduced.

An IAB network may include an IAB donor that connects to a core network via a wired connection (e.g., a wireline backhaul). For example, an Ng interface of an IAB donor may terminate at a core network. Additionally, or alternatively, an IAB donor may connect to one or more devices of the core network that provide a core access and mobility management function (AMF). In some aspects, an IAB donor may include a network node 310, such as an anchor base station. An IAB donor may include a CU, which may perform access node controller (ANC) functions and/or AMF functions. The CU may configure a DU of the IAB donor and/or may configure one or more IAB nodes (e.g., a mobile termination (MT) function and/or a DU function of an IAB node) that connect to the core network via the IAB donor. Thus, a CU of an IAB donor may control and/or configure the entire IAB network (or a portion thereof) that connects to the core network via the IAB donor, such as by using control messages and/or configuration messages (e.g., a radio resource control (RRC) configuration message or an F1 application protocol (F1AP) message).

The MT functions of an IAB node (e.g., a child node) may be controlled and/or scheduled by another IAB node (e.g., a parent node of the child node) and/or by an IAB donor. The DU functions of an IAB node (e.g., a parent node) may control and/or schedule other IAB nodes (e.g., child nodes of the parent node) and/or UEs 320. Thus, a DU may be referred to as a scheduling node or a scheduling component, and an MT may be referred to as a scheduled node or a scheduled component. In some aspects, an IAB donor may include DU functions and not MT functions. That is, an IAB donor may configure, control, and/or schedule communications of IAB nodes and/or UEs 320. A UE 320 may include only MT functions, and not DU functions. That is, communications of a UE 320 may be controlled and/or scheduled by an IAB donor and/or an IAB node (e.g., a parent node of the UE 320).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor or an IAB node, and a child node may be an IAB node or a UE 320. Communications of an MT function of a child node may be controlled and/or scheduled by a parent node of the child node.

A link between a UE 320 and an IAB donor, or between a UE 320 and an IAB node, may be referred to as an access link. An access link may be a wireless access link that provides a UE 320 with radio access to a core network via an IAB donor, and optionally via one or more IAB nodes. Thus, the wireless network 300 may be referred to as a multi-hop network or a wireless multi-hop network.

A link between an IAB donor and an IAB node or between two IAB nodes may be referred to as a backhaul link. A backhaul link may be a wireless backhaul link that provides an IAB node with radio access to a core network via an IAB donor, and optionally via one or more other IAB nodes. In an IAB network, network resources for wireless communications (e.g., time resources, frequency resources, and/or spatial resources) may be shared between access links and backhaul links. In some aspects, a backhaul link may be a primary backhaul link or a secondary backhaul link (e.g., a backup backhaul link). In some aspects, a secondary backhaul link may be used if a primary backhaul link fails, becomes congested, and/or becomes overloaded, among other examples.

The UEs 320 may be dispersed throughout the wireless network 300, and each UE 320 may be stationary or mobile. A UE 320 may include, for example, an access terminal, a terminal, a mobile station, and/or a subscriber unit. A UE 320 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 320 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 320 may be considered Internet-of-Things (IoT) devices, and/or may be implemented as NB-IoT (narrowband IoT) devices. Some UEs 320 may be considered a Customer Premises Equipment. A UE 320 may be included inside a housing that houses components of the UE 320, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

Some network nodes may have a reduced feature set compared to other network nodes. A network node with a reduced feature set may be referred to as a reduced capability (RedCap) node, a low-tier node, an NR-Lite node, an IoT node, an ambient IoT node, a passive node, a terminal (e.g., a radio frequency identification (RFID) device, a tag, or a similar device), and/or an energy-harvesting-capable node, among other examples. For example, a node with a reduced feature set may support a lower maximum modulation and coding scheme (MCS) than other nodes (e.g., quadrature phase shift keying (QPSK) or the like as compared to 256-quadrature amplitude modulation (QAM) or the like), may support a lower maximum transmit power, may have a less advanced beamforming capability (e.g., may not be capable of forming as many beams as other nodes), may require a longer processing time, may include less hardware (e.g., fewer antennas, fewer RF components, fewer transmit antennas, and/or fewer receive antennas), and/or may not be capable of communicating on as wide of a maximum bandwidth, among other examples.

In general, any number of wireless networks 300 may be deployed in a given geographic area. Each wireless network 300 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 320 may communicate directly using one or more sidelink channels (e.g., without using a network node 310 as an intermediary to communicate with one another). For example, the UEs 320 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 320 may perform scheduling operations, resource selection operations, and/or other operations described elsewhere herein as being performed by the network node 310.

Devices of the wireless network 300 may communicate using the electromagnetic spectrum, which may be subdivided by frequency or wavelength into various classes, bands, channels, or the like. For example, devices of the wireless network 300 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 may be referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz" or the like, if used herein, may broadly represent frequencies that may be less than 6 GHz, may be within FR1, or may include mid-band frequencies. Further, unless specifically stated otherwise, the term "millimeter wave" or the like, if used herein, may broadly represent frequencies that may include mid-band frequencies, may be within FR2, FR4, FR4-a or FR4-1, and/or FR5, or may be within the EHF band. The frequencies included in these operating bands (e.g., FR1, FR2, FR3, FR4, FR4-a, FR4-1, and/or FR5) may be modified, and techniques described herein are applicable to those modified frequency ranges.

As described above, in some aspects, a network entity (e.g., the network entity 102, 104, and/or 106 depicted in FIG. 1) may be implemented in a wireless communication environment. For example, in some aspects, the network node may be implemented as a UE, a base station, relay device, and/or TRP, among other examples. In some such aspects, as shown in FIG. 3, the UE 320a may include a communication manager 340 and/or a transceiver and the network node 310a may include a communication manager 350 and/or a transceiver. In some aspects, the communication manager 340 and/or 350 may be, be similar to, include, or be included in, the communication manager 110 and/or the communication manager 114 depicted in FIG. 1 and/or the communication manager 235 depicted in FIG. 2. In some aspects, the transceiver(s) may be, be similar to, include, or be included in, the communication interface 112 and/or the communication interface 116 depicted in FIG. 1. In some aspects, the transceiver(s) may include, or be included in, the communication interface 230 depicted in FIG. 2.

As shown in FIG. 3, the wireless network 300 may include a forwarding-capable network entity (NE) 360. A first device (e.g., a UE 320, or a network node 310) may communicate with a second device (e.g., a network node 310, or a UE 320) directly or by reflecting signals via the forwarding-capable network entity 360 (e.g., an RIS or another device). The first device may be a transmitting device (e.g., the network node 310 or the UE 320), and the second device may be a receiving device (e.g., the UE 320 or the network node 310), because the transmitting device is transmitting a signal to the receiving device. In some examples, the forwarding-capable network entity 360 may be an RIS, a repeater, a relay, an amplify and forward device, a decode and forward device, and/or another device capable of forwarding, reflecting, and/or refracting wireless communication signals.

The forwarding-capable network entity 360 may be a two-dimensional surface of engineered material whose properties are reconfigurable rather than static. The engineered material may contain integrated electronic circuits and software that enable the control of a wireless medium by altering an impedance of the surface or a portion of the surface. The change in impedance may alter a phase shift and/or an angle of reflection. Scattering, absorption, reflection, or diffraction properties may be changed with time and controlled by the software. The forwarding-capable network entity 360 may act as a reflective lens. In one example, the forwarding-capable network entity 360 may include large arrays of inexpensive antennas spaced half of a wavelength apart. In another example, the forwarding-capable network entity 360 may include metamaterial-based planar or conformal large surfaces whose elements (e.g., square or rectangular elements) have sizes and inter-distances that are smaller than the wavelength. Each of the elements may have a configured impedance or other surface properties that are controlled by a voltage to the element.

The forwarding-capable network entity 360 may be, or may include, a planar or two-dimensional structure or surface that is designed to have properties to enable a dynamic control of signals or electromagnetic waves reflected, refracted, and/or redirected by the forwarding-capable network entity 360. The forwarding-capable network entity 360 may include one or more reconfigurable elements. For example, the forwarding-capable network entity 360 may include an array of reconfigurable elements (e.g., an array of uniformly distributed reconfigurable elements). The reconfigurable elements may be elements with a reconfigurable electromagnetic characteristic. For example, the electromagnetic characteristic may include a reflection characteristic (e.g., a reflection coefficient), a scattering characteristic, an absorption characteristic, a refraction characteristic (e.g., a refraction coefficient), and/or a diffraction characteristic. The electromagnetic characteristic(s) of each reconfigurable element may be independently controlled and changed over time. The electromagnetic characteristic(s) of each reconfigurable element may be independently configured such that the combination of configured states of the reconfigurable elements reflects or refracts an incident signal or waveform in a controlled manner. For example, the reconfigurable elements may be configured to reflect or redirect an impinging signal in a controlled manner, such as by reflecting or refracting the impinging signal in a desired direction, with a desired beam width, with a desired phase, with a desired amplitude, and/or with a desired polarization, among other examples. In other words, the forwarding-capable network entity 360 may be capable of modifying one or more properties (e.g., direction, beam width, phase, amplitude, and/or polarization) of an impinging signal.

In some aspects, the network node 310 may include a communication manager 350. As described in more detail elsewhere herein, the communication manager 350 may transmit, to a forwarding-capable network entity and at a first time, a first forwarding configuration; and/or transmit, to the forwarding-capable network entity and at a second time, a second forwarding configuration, where the transmission is associated with an amount of time between the first time and the second time. As another example, the communication manager 350 may receive, from a second network entity, information indicative of a network performance impact caused by a forwarding-capable network entity; and/or transmit, in association with receiving the information, an indication of an amount of time associated with controlling a forwarding reconfiguration rate associated with the forwarding-capable network entity. Additionally, or alternatively, the communication manager 350 may perform one or more other operations described herein.

In some aspects, the forwarding-capable network entity 360 may include a communication manager 370. As described in more detail elsewhere herein, the communication manager 370 may receive, from a first network entity and at a first time, a first forwarding configuration; and/or receive, from the first network entity and at a second time, a second forwarding configuration, where receiving the second forwarding configuration is associated with an amount of time between the first time and the second time. Additionally, or alternatively, the communication manager 370 may perform one or more other operations described herein.

As indicated above, FIG. 3 is provided as an example. Other examples may differ from what is described with regard to FIG. 3.

Figure 4:
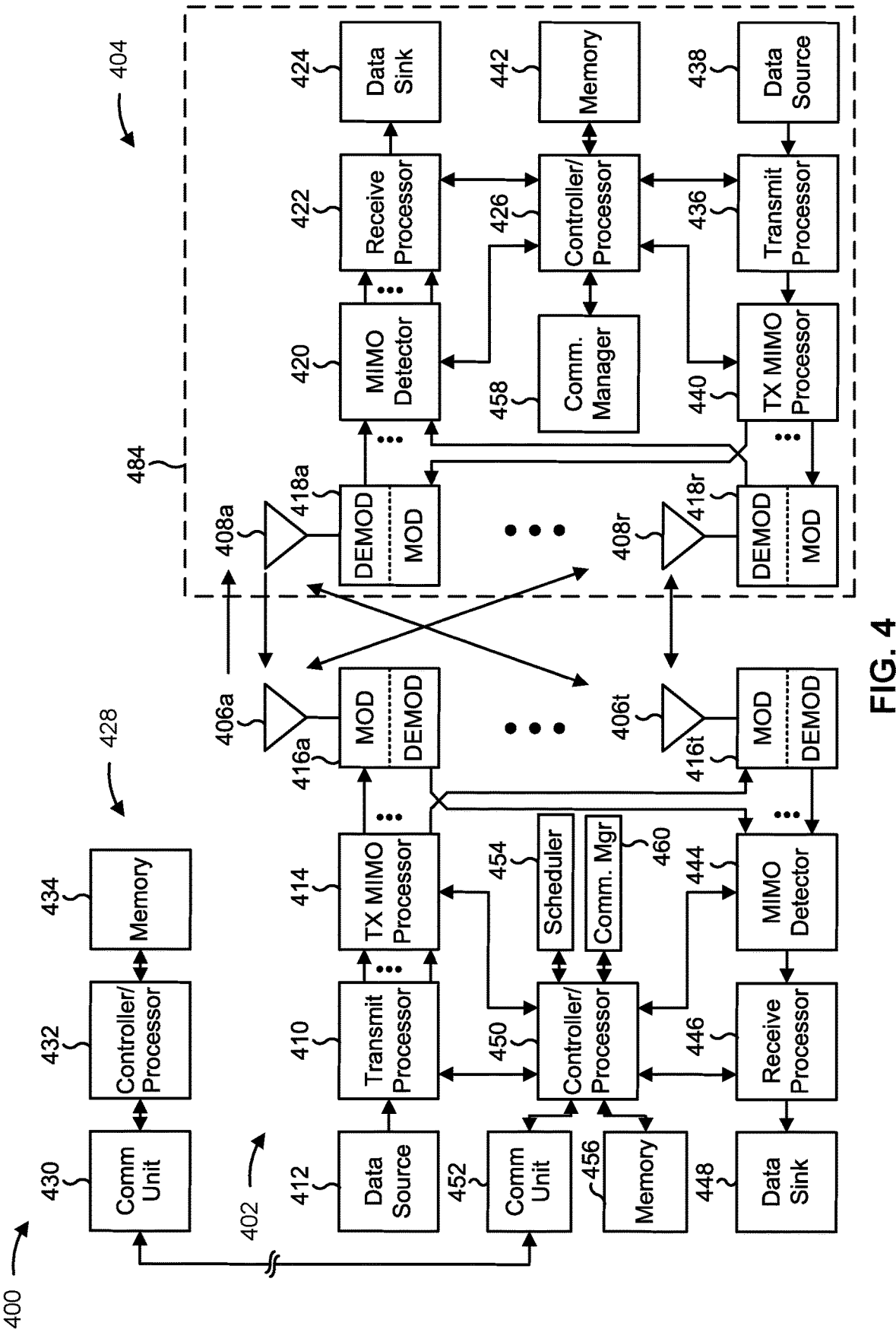
FIG. 4 is a diagram illustrating an environment including a network entity in wireless communication with another network entity, in accordance with the present disclosure.

FIG. 4 is a diagram illustrating an environment 400 including a network entity 402 in wireless communication with a network entity 404 (e.g., via a network such as the network 108 depicted in FIG. 1 and/or the wireless network 300 depicted in FIG. 3), in accordance with the present disclosure. The network entity 402 may be equipped with a set of antennas 406a through 406t, such as T antennas (T≥1). The network entity 404 may be equipped with a set of antennas 408a through 408r, such as R antennas (R≥1).

At the network entity 402, a transmit processor 410 may receive data, from a data source 412, intended, or otherwise destined, for the network entity 404 (or a set of network entities 404). The transmit processor 410 may select one or more MCSs for the network entity 404 based on one or more channel quality indicators (CQIs) received from that network entity 404. The network entity 402 may process (e.g., encode and modulate) the data for the network entity 404 based on the MCS(s) selected for the network entity 404 and may provide data symbols for the network entity 404. The transmit processor 410 may process system information (e.g., for semi-static resource partitioning information (SRPI)) and control information (e.g., CQI requests, grants, and/or upper layer signaling) and provide overhead symbols and control symbols. The transmit processor 410 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 414 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 416a through 416t (e.g., T modems). For example, each output symbol stream may be provided to a modulator component (shown as MOD) of a modem of the set of modems 416a through 416t. Each modem of the set of modems 416a through 416t may use a respective modulator component to process a respective output symbol stream (e.g., for OFDM) to obtain an output sample stream. Each modem of the set of modems 416a through 416t may further use a respective modulator component to process (e.g., convert to analog, amplify, filter, and/or upconvert) the output sample stream to obtain a signal. One or more modems of the set of modems 416a through 416t may transmit a set of signals (e.g., T signals) via a corresponding antenna of the set of antennas 406a through 406t. The signal may include, for example, a downlink signal.

At the network entity 404, one or more antennas of the set of antennas 408a through 408r may receive the signals from the network entity 402 and/or network nodes and may provide a set of received signals (e.g., R received signals) to one or more modems of a set of modems 418a through 418r (e.g., R modems). For example, each received signal may be provided to a demodulator component (shown as DEMOD) of a respective modem of the set of modems 418a through 418r. Each modem of the set of modems 418a through 418r may use a respective demodulator component to condition (e.g., filter, amplify, downconvert, and/or digitize) a received signal to obtain input samples. Each modem of the set of modems 418a through 418r may use a demodulator component to further process the input samples (e.g., for OFDM) to obtain received symbols. A MIMO detector 420 may obtain received symbols from one or more modems of the set of modems 418a through 418r, may perform MIMO detection on the received symbols if applicable, and may provide detected symbols.

A receive processor 422 may process (e.g., demodulate and decode) the detected symbols, may provide decoded data for the network entity 404 to a data sink 424, and may provide decoded control information and system information to a controller/processor 426. The term "controller/processor" may refer to one or more controllers, one or more processors, or a combination thereof. The controller/processor 426 may be, be similar to, include, or be included in, the processor 210 depicted in FIG. 2. The controller/processor 426 may determine a reference signal received power (RSRP) parameter, a received signal strength indicator (RSSI) parameter, a reference signal received quality (RSRQ) parameter, and/or a CQI parameter, among other examples.

A network controller 428 may include a communication unit 430, a controller/processor 432, and a memory 434. The network controller 428 may be, be similar to, include, or be included in, the network controller 330 depicted in FIG. 3. The network controller 428 may include, for example, one or more devices in a core network. The network controller 428 may communicate with the network entity 402 via the communication unit 430.

One or more antennas (e.g., antennas 406a through 406t and/or antennas 408a through 408r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings, such as a housing 484), a set of coplanar antenna elements, a set of non-coplanar antenna elements, and/or one or more antenna elements coupled to one or more transmission and/or reception components, such as one or more components of FIG. 4.

Similarly, at the network entity 404, a transmit processor 436 may receive and process data from a data source 438 and control information (e.g., for reports that include RSRP, RSSI, RSRQ, and/or CQI) from the controller/processor 426. The transmit processor 436 may generate reference symbols for one or more reference signals. The symbols from the transmit processor 436 may be precoded by a TX MIMO processor 440 if applicable, and further processed by one or more of the set of modems 418a through 418r (e.g., for DFT-s-OFDM or CP-OFDM), and transmitted to the network entity 402. In some examples, each modem of the set of modems 418a through 418r of the network entity 404 may include a modulator and a demodulator. The network entity 404 may include a communication manager 458. The communication manager 458 may be, or may be similar to, the communication manager 110, the communication manager 114, the communication manager 235, the communication manager 340, and/or the communication manager 350. In some examples, the network entity 404 includes a transceiver. The transceiver may include any combination of the antenna(s) 408a through 408r, the modem(s) 418a through 418r, the MIMO detector 420, the receive processor 422, the transmit processor 436, and/or the TX MIMO processor 440. The transceiver may be, be similar to, include, or be included in, the communication interface 112 and/or the communication interface 116 depicted in FIG. 1 and/or the communication interface 230 depicted in FIG. 2. The transceiver may be used by a processor (e.g., the controller/processor 426) and/or a memory 442 to perform aspects of any of the methods described herein (e.g., with reference to FIGS. 9-17).

At the network entity 402, the signals from network entity 404 and/or other network nodes may be received by one or more antennas of the set of antennas 406a through 406t, processed by one or more modems of the set of modems 416a through 416t (e.g., a demodulator component, shown as DEMOD), detected by a MIMO detector 444 if applicable, and further processed by a receive processor 446 to obtain decoded data and control information sent by the network entity 404. The receive processor 446 may provide the decoded data to a data sink 448 and provide the decoded control information to a controller/processor 450. The network entity 402 may include a communication unit 452 and may communicate with the network controller 428 via the communication unit 452. The network entity 402 may include a communication manager 460. The communication manager 460 may be, or may be similar to, the communication manager 110, the communication manager 114, the communication manager 235, the communication manager 340, and/or the communication manager 350. The network entity 402 may include a scheduler 454 to schedule one or more network entities 404 for downlink and/or uplink communications. In some examples, one or more modems of the set of modem 416a through 416t of the network entity 402 may include a modulator and a demodulator. In some examples, the network entity 402 includes a transceiver. The transceiver may include any combination of the antenna(s) 406a through 406t, the modem(s) 416a through 416t, the MIMO detector 444, the receive processor 446, the transmit processor 410, and/or the TX MIMO processor 414. The transceiver may be, be similar to, include, or be included in, the communication interface 112 and/or the communication interface 116 depicted in FIG. 1 and/or the communication interface 230 depicted in FIG. 2. The transceiver may be used by a processor (e.g., the controller/processor 450) and a memory 456 to perform aspects of any of the methods described herein (e.g., with reference to FIGS. 9-17).

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The controller/processor 450 of the network entity 402, the controller/processor 426 of the network entity 404, and/or any other component(s) of FIG. 4 may perform one or more techniques associated with helper signal based envelope tracking, as described in more detail elsewhere herein. For example, the controller/processor 450 of the network entity 402, the controller/processor 426 of the network entity 404, and/or any other component(s) of FIG. 4 may perform or direct operations of, for example, process 1200 of FIG. 12, process 1300 of FIG. 13, process 1400 of FIG. 14, and/or other processes as described herein. The memory 442 and the memory 456 may store data and program codes for the network entity 402 and the network entity 404, respectively. In some examples, the memory 442 and/or the memory 456 may include a non-transitory computer-readable medium storing one or more instructions (e.g., code and/or program code) for wireless communication. For example, the one or more instructions, when executed (e.g., directly, or after compiling, converting, and/or interpreting) by one or more respective processors of the network entity 402 and/or the network entity 404, may cause the one or more processors, the network entity 404, and/or the network entity 402 to perform or direct operations of, for example, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, a first network entity (e.g., the network entity 402 or the network entity 404) includes means for transmitting, to a forwarding-capable network entity and at a first time, a first forwarding configuration; and/or means for transmitting, to the forwarding-capable network entity and at a second time, a second forwarding configuration, where the transmission is associated with an amount of time between the first time and the second time. Additionally or alternatively, the first network entity may include means for receiving, from a second network entity, information indicative of a network performance impact caused by a forwarding-capable network entity; and/or means for transmitting, in association with receiving the information, an indication of an amount of time associated with controlling a forwarding reconfiguration rate associated with the forwarding-capable network entity. In some aspects, the means for the first network entity to perform operations described herein may include, for example, one or more of communication manager 460, transmit processor 410, TX MIMO processor 414, modem 416, antenna 406, MIMO detector 444, receive processor 446, controller/processor 450, memory 456, scheduler 454, the communication interface 112, the communication interface 116, and/or the communication interface 230, among other examples. In some aspects, the means for the first network entity to perform operations described herein may include, for example, one or more of communication manager 458, antenna 408, modem 418, MIMO detector 420, receive processor 422, transmit processor 436, TX MIMO processor 440, controller/processor 426, memory 442, the communication interface 112, the communication interface 116, and/or the communication interface 230, among other examples.

While blocks in FIG. 4 are illustrated as distinct components, the functions described above with respect to the blocks may be implemented in a single hardware, software, or combination component or in various combinations of components. For example, the functions described with respect to the transmit processor 436, the receive processor 422, and/or the TX MIMO processor 440 may be performed by or under the control of the controller/processor 426. Any number of other combination of various combinations of components depicted in FIG. 4 may be considered to be within the ambit of the present disclosure.

As indicated above, FIG. 4 is provided as an example. Other examples may differ from what is described with regard to FIG. 4.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network entities. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

As used herein, a first network entity "outputting" or "transmitting" a communication to a second network entity may refer to a direct transmission (for example, from the first network entity to the second network entity) or an indirect transmission via one or more other network entities or devices. For example, if the first network entity is a DU, an indirect transmission to the second network entity may include the DU outputting or transmitting a communication to an RU and the RU transmitting the communication to the second network entity, or may include causing the RU to transmit the communication (e.g., triggering transmission of a physical layer reference signal). Similarly, the second network entity "transmitting" a communication to the first network entity may refer to a direct transmission (e.g., from the second network entity to the first network entity) or an indirect transmission via one or more other network entities or devices. For example, if the first network entity is a DU, an indirect transmission to the first network entity may include the second network entity transmitting a communication to an RU and the RU transmitting the communication to the DU. Similarly, the first network entity "obtaining" a communication may refer to receiving a transmission carrying the communication directly (for example, from the second network entity to the first network entity) or receiving the communication (or information derived from reception of the communication) via one or more other network entities or devices.

Figure 5:
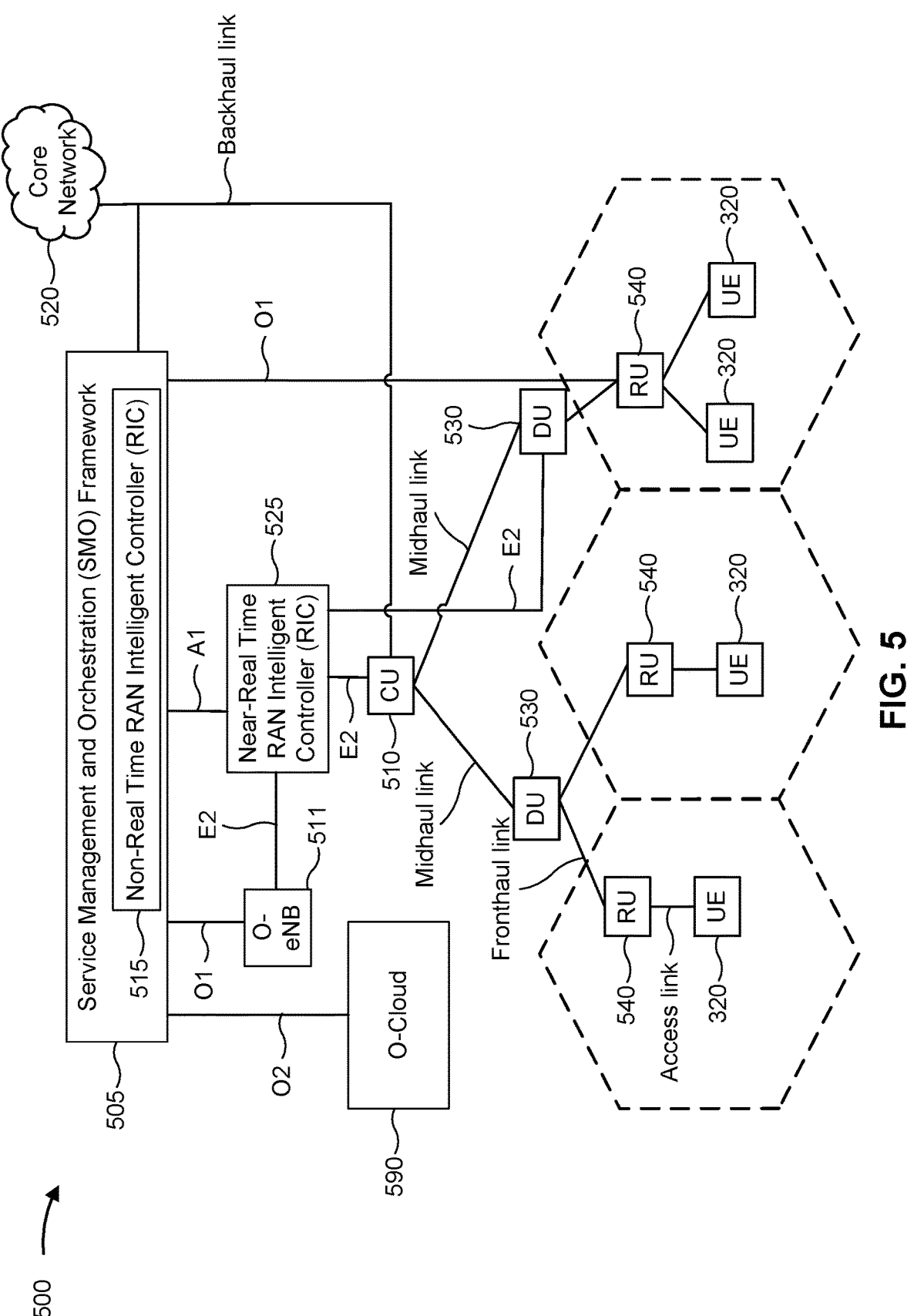
FIG. 5 is a diagram illustrating an example disaggregated base station architecture, in accordance with the present disclosure.

FIG. 5 is a diagram illustrating an example disaggregated base station architecture 500, in accordance with the present disclosure. The disaggregated base station architecture 500 may include a CU 510 that can communicate directly with a core network 520 via a backhaul link, or indirectly with the core network 520 through one or more disaggregated control units (such as a Near-RT RIC 525 via an E2 link, or a Non-RT RIC 515 associated with a Service Management and Orchestration (SMO) Framework 505, or both). A CU 510 may communicate with one or more DUs 530 via respective midhaul links, such as through F1 interfaces. Each of the DUs 530 may communicate with one or more RUs 540 via respective fronthaul links. Each of the RUs 540 may communicate with one or more UEs 320 via respective RF access links. In some implementations, a UE 320 may be simultaneously served by multiple RUs 540.

Each of the units, including the CUs 510, the DUs 530, the RUs 540, as well as the Near-RT RICs 525, the Non-RT RICs 515, and the SMO Framework 505, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 510 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 510. The CU 510 may be configured to handle user plane functionality (for example, Central Unit-User Plane (CU-UP) functionality), control plane functionality (for example, Central Unit-Control Plane (CU-CP) functionality), or a combination thereof. In some implementations, the CU 510 can be logically split into one or more CU-UP units and one or more CU-CP units. A CU-UP unit can communicate bidirectionally with a CU-CP unit via an interface, such as the E1 interface when implemented in an O-RAN configuration. The CU 510 can be implemented to communicate with a DU 530, as necessary, for network control and signaling.

Each DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 530 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 530, or with the control functions hosted by the CU 510.

Each RU 540 may implement lower-layer functionality. In some deployments, an RU 540, controlled by a DU 530, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 540 can be operated to handle over the air (OTA) communication with one or more UEs 320. In some implementations, real-time and non-real-time aspects of control and user plane communication with the RU(s) 540 can be controlled by the corresponding DU 530. In some scenarios, this configuration can enable each DU 530 and the CU 510 to be implemented in a cloud-based RAN architecture, such as a vRAN architecture.

The SMO Framework 505 may be configured to support RAN deployment and provisioning of non-virtualized and virtualized network elements. For non-virtualized network elements, the SMO Framework 505 may be configured to support the deployment of dedicated physical resources for RAN coverage requirements, which may be managed via an operations and maintenance interface (such as an O1 interface). For virtualized network elements, the SMO Framework 505 may be configured to interact with a cloud computing platform (such as an open cloud (O-Cloud) platform 590) to perform network element life cycle management (such as to instantiate virtualized network elements) via a cloud computing platform interface (such as an O2 interface). Such virtualized network elements can include, but are not limited to, CUs 510, DUs 530, RUs 540, non-RT RICs 515, and Near-RT RICs 525. In some implementations, the SMO Framework 505 can communicate with a hardware aspect of a 4G RAN, such as an open eNB (O-eNB) 511, via an O1 interface. Additionally, in some implementations, the SMO Framework 505 can communicate directly with each of one or more RUs 540 via a respective O1 interface. The SMO Framework 505 also may include a Non-RT RIC 515 configured to support functionality of the SMO Framework 505.

The Non-RT RIC 515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 525. The Non-RT RIC 515 may be coupled to or communicate with (such as via an A1 interface) the Near-RT RIC 525. The Near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the Near-RT RIC 525.

In some implementations, to generate AI/ML models to be deployed in the Near-RT RIC 525, the Non-RT RIC 515 may receive parameters or external enrichment information from external servers. Such information may be utilized by the Near-RT RIC 525 and may be received at the SMO Framework 505 or the Non-RT RIC 515 from non-network data sources or from network functions. In some examples, the Non-RT RIC 515 or the Near-RT RIC 525 may be configured to tune RAN behavior or performance. For example, the Non-RT RIC 515 may monitor long-term trends and patterns for performance and employ AI/ML models to perform corrective actions through the SMO Framework 505 (such as reconfiguration via an O1 interface) or via creation of RAN management policies (such as A1 interface policies).

As indicated above, FIG. 5 is provided as an example. Other examples may differ from what is described with regard to FIG. 5.

Figure 6:
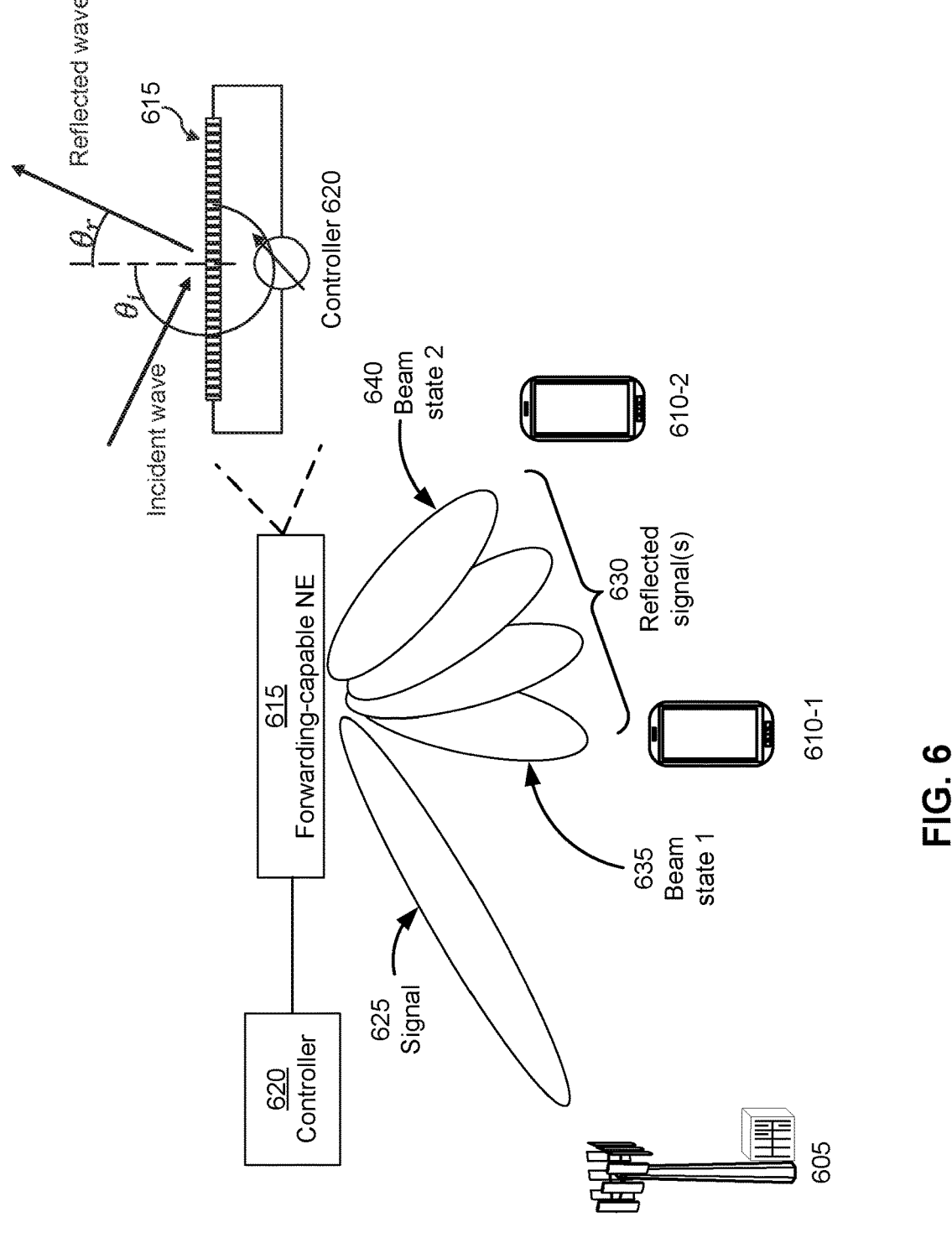
FIG. 6 is a diagram illustrating an example of communications using a forwarding-capable network entity, in accordance with the present disclosure.

FIG. 6 is a diagram illustrating an example 600 of communications using a forwarding-capable network entity, in accordance with the present disclosure. As shown in FIG. 6, a first network entity 605 (e.g., the network entity 102, the network entity 104, the network entity 106, the apparatus 200, the network node 310, the network entity 402, the network entity 404, a base station, a CU, a DU, and/or an RU, among other examples) may communicate with a second network entity 610 (e.g., the network entity 102, the network entity 104, the network entity 106, the apparatus 200, the UE 320, the network entity 402, the network entity 404, a DU, and/or an RU, among other examples) in a wireless network, such as the wireless network 300. The first network entity 605 and the second network entity 610 may use a forwarding-capable network entity (NE) 615 (e.g., the forwarding-capable network entity 360) to communicate with one another. For example, the forwarding-capable network entity 615 may reflect, refract, or redirect a signal to the first network entity 605 and/or the second network entity 610. The forwarding-capable network entity 615 may also be referred to as an RIS, a forwarding-capable device, an intelligent reflecting surface, and/or a software-controlled meta-surface. In some examples, the forwarding-capable network entity 615 may be an RIS, a repeater, a relay, an amplify and forward device, a decode and forward device, or another device capable of forwarding, reflecting, and/or refracting wireless communication signals.

A network entity may have antennas that are grouped together at a transmitter or receiver, in order to increase throughput. The grouping of antennas may be referred to as "massive MIMO." Massive MIMO may use active antenna units (AAUs) to achieve high beamforming gain. An AAU may combine an antenna, a radio, a tower-mounted amplifier, a feeder, and/or jumper functionalities into a single unit. An AAU may include an individual RF chain for each antenna port. There may be barriers to massive MIMO. The transmission of signals may be blocked by buildings, natural topography, or other blocking structures. In order to resolve transmission issues due to the blockage, the network may use the forwarding-capable network entity 615. As another example, the network may use the forwarding-capable network entity 615 to improve reliability for the second network entity 610 that is moving at high speeds (e.g., to enable multiple links for the high-speed UE).

The forwarding-capable network entity 615, when configured to operate as an RIS, may not have RF chains, but may include a large number of small, low-cost elements on a surface to passively reflect or refract incident signals transmitted from the first network entity 605. A controller 620 of the forwarding-capable network entity 615 may control the elements on the surface, and the surface may act as a phased array. The forwarding-capable network entity 615 may be a smart device that is configured to use a specific angle of reflection for the signals. The first network entity 605 may use the controller 620 to control, as part of a reflective configuration, the angle of reflection (angle of arrival $\theta_i$ for an incident wave, angle of departure $\theta_r$ for a reflected wave), an amplitude, a phase, and/or a electrical-length (or width) of the elements of the forwarding-capable network entity 615 by controlling a voltage to each of the elements. The reflective configuration may also correspond to analog beamforming weights or coefficients that are provided by the forwarding-capable network entity 615 when reflecting signals from one device to another. The reflective configuration may also be referred to as a "forwarding configuration," an "RIS configuration," an "RIS reflection configuration," an "RIS reflection matrix," or a "P-MIMO configuration." In sum, the forwarding-capable network entity 615 may help to control a propagation environment with less power consumption than AAUs.

The reconfigurable elements of the forwarding-capable network entity 615 may be controlled and/or configured by a controller 620 (e.g., an RIS controller). The controller 620 may be a control module (e.g., a controller and/or a processor) that is capable of configuring the electromagnetic characteristic(s) of each reconfigurable element of the forwarding-capable network entity 615. The controller 620 may be, or may be included in, the communication manager 370. Alternatively, the communication manager 370 may be included in the controller 620. The controller 620 may be associated with certain components similar to the components described in connection with the devices in FIG. 4, such as a modem 416 and/or a modem 418 and/or a similar component for purposes of communicating with a first network entity 605. The controller 620 may receive control communications (e.g., from a first network entity 605 and/or a second network entity 610) indicating one or more properties of reflected signals (e.g., indicating a desired direction, a desired beam width, a desired phase, a desired amplitude, and/or a desired polarization). Therefore, in some examples, the forwarding-capable network entity 615 may be capable of receiving communications (e.g., via the forwarding-capable network entity 615 and/or the controller 620). In some examples, the forwarding-capable network entity 615 and/or the controller 620 may not have transmit capabilities (e.g., the forwarding-capable network entity 615 may be capable of reflecting and/or redirecting impinging signals via the reconfigurable elements, but may not be capable of generating and/or transmitting signals). Alternatively, in some examples, the forwarding-capable network entity 615 and/or the controller 620 may have transmit capabilities (e.g., the forwarding-capable network entity 615 may be capable of reflecting and/or redirecting impinging signals via the reconfigurable elements and may be capable of generating and/or transmitting signals). For example, the forwarding-capable network entity 615 and/or the controller 620 may include one or more antennas and/or antenna elements for receiving and/or transmitting signals.

For example, as shown in FIG. 6, the first network entity 605 may transmit a signal 625. The signal 625 may be transmitted in a spatial direction toward the forwarding-capable network entity 615. The forwarding-capable network entity 615 may configure the reconfigurable elements of the forwarding-capable network entity 615 to reflect and/or redirect the signal 625 in a desired spatial direction and/or with one or more desired signal characteristics (e.g., beam width, phase, amplitude, frequency, and/or polarization).

In some examples, the reconfigurable elements (e.g., meta-elements) of the forwarding-capable network entity 615 may be configured to reflect and/or redirect the signal 625 using a reflection (or reflective) coefficient. For example, for an angle of arrival $\theta_{i,n}$ for an incident wave at a reconfigurable element n of the forwarding-capable network entity 615, angle of departure $\theta_{r,n}$ for a reflected wave, a reflection gain of the forwarding-capable network entity 615 may be represented as $$h = \sum_{n=0}^{N-1} e^{-j\frac{2\pi\left((d_{i,n}-d_{i,0})+(d_{r,n}-d_{r,0})\right)}{\lambda}} \cdot \alpha_n e^{j\phi_n},$$

where N is a quantity of reconfigurable elements of the forwarding-capable network entity 615, $d_{i,n}$-$d_{i,0}$ is a distance between a first reconfigurable element and a reconfigurable element n associated with the incident wave, $d_{r,n}$-$d_{r,0}$ is a distance between a first reconfigurable element and a reconfigurable element n associated with the reflected wave, $\lambda$ is the wavelength, j represents an imaginary number or imaginary number for a complex number, and $\alpha_n e^{j\phi_n}$ is the reflection coefficient for the reconfigurable element n (e.g., where an is the amplitude of the reflection coefficient and $\phi_n$ is the phase of the reflection coefficient). The equation above may be associated with a general model for reflective beamforming by the forwarding-capable network entity 615. For a far-field model for reflective beamforming by the forwarding-capable network entity 615, a reflection gain of the forwarding-capable network entity 615 may be represented as $$h = \sum_{n=0}^{N-1} e^{-j\frac{2\pi n d}{\lambda}(\sin\theta_i + \sin\theta_r)} \cdot \alpha_n e^{j\phi_n},$$

where d is the distance between reconfigurable elements of the forwarding-capable network entity 615.

As shown by reference number 630, the forwarding-capable network entity 615 may be capable of reflecting the signal 625 in one or more spatial directions. Although multiple beams are shown in FIG. 6 representing different beam states or beam directions of the forwarding-capable network entity 615, the forwarding-capable network entity 615 may be capable of forwarding (e.g., reflecting, redirecting, refracting, and/or otherwise forwarding) a signal with one beam state or one beam direction at a time. In other examples, the may be capable of forwarding a signal with multiple beam states or multiple beam directions at a time. For example, in one case, as shown by reference number 635, the forwarding-capable network entity 615 may be configured to reflect the signal 625 using a first beam state (e.g., beam state 1). "Beam state" may refer to a spatial direction and/or a beam of a reflected signal (e.g., a signal reflected by the forwarding-capable network entity 615). The first beam state may cause the signal 625 to be reflected in a spatial direction toward a first network entity (e.g., 610-1). As shown by reference number 640, in another case, the forwarding-capable network entity 615 may be configured to reflect the signal 625 using a second beam state (e.g., beam state 2). The second beam state may cause the signal 625 to be reflected in a spatial direction toward a second network entity (e.g., 610-2).

The forwarding-capable network entity 615 may be deployed in a wireless network (such as the wireless network 300) to improve communication performance and efficiency. For example, the forwarding-capable network entity 615 may enable a transmitter (e.g., the first network entity 605 or the second network entity 610) to control the scattering, reflection, and refraction characteristics of signals transmitted by the transmitter, to overcome the negative effects of wireless propagation. For example, the forwarding-capable network entity 615 may effectively control signal characteristics (e.g., spatial direction, beam width, phase, amplitude, frequency, and/or polarization) of an impinging signal without a need for complex decoding, encoding, and radio frequency processing operations. Therefore, the forwarding-capable network entity 615 may provide increased channel diversity for propagation of signals in a wireless network. The increased channel diversity provides robustness to channel fading and/or blocking, such as when higher frequencies are used by the first network entity 605 and/or the second network entity 610 (e.g., millimeter wave frequencies and/or sub-terahertz frequencies). Moreover, as the forwarding-capable network entity 615 does not need to perform complex decoding, encoding, and radio frequency processing operations, the forwarding-capable network entity 615 may provide a more cost and energy efficient manner of reflecting and/or redirecting signals in a wireless network (e.g., as compared to other mechanisms for reflecting and/or redirecting signals, such as a relay device).

As indicated above, FIG. 6 is provided as an example. Other examples may differ from what is described with respect to FIG. 6.

Figure 7:
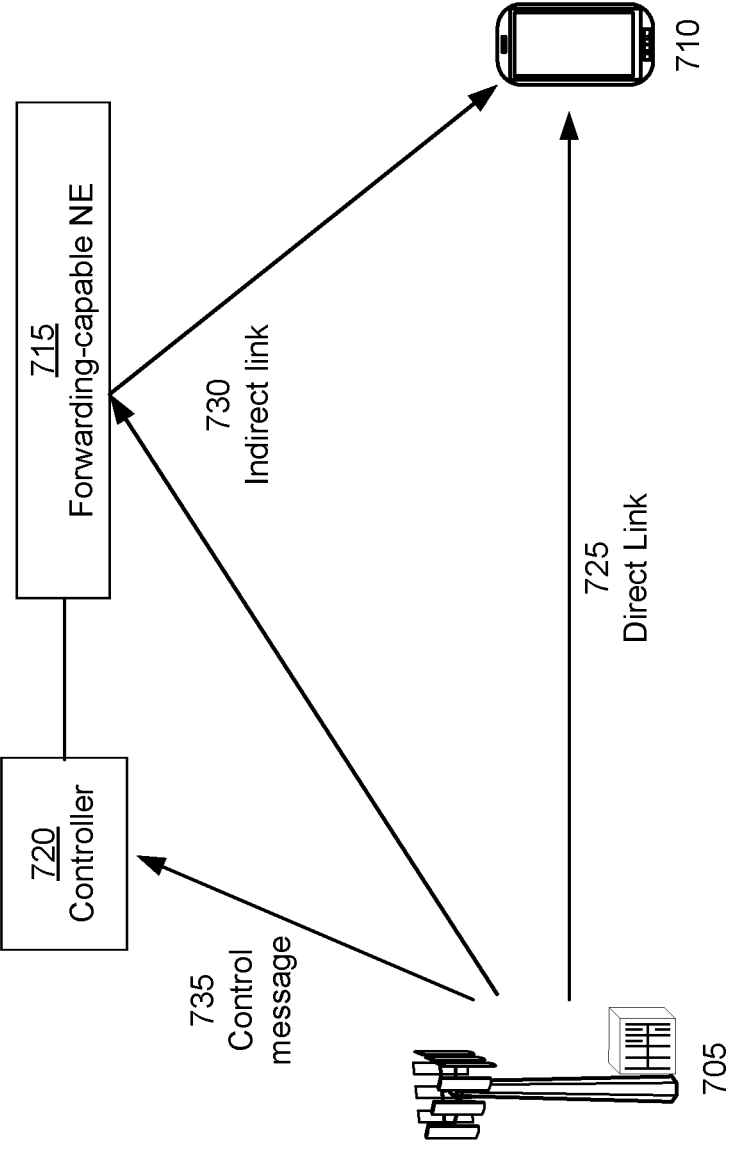
FIG. 7 is a diagram illustrating an example of communication links in a wireless network that includes a forwarding-capable network entity, in accordance with the present disclosure.

FIG. 7 is a diagram illustrating an example 700 of communication links in a wireless network that includes a forwarding-capable network entity, in accordance with the present disclosure. As shown, example 700 includes a first network entity 705, a second network entity 710, and a forwarding-capable network entity 715 (e.g., the forwarding-capable network entity 615). The forwarding-capable network entity 715 may be controlled and/or configured by a controller 720 (e.g., the controller 620).

As shown in FIG. 7, the second network entity 710 may receive a communication (e.g., data and/or control information) directly from the first network entity 705 as a downlink communication. Additionally, or alternatively, the second network entity 710 may receive a communication (e.g., data and/or control information) indirectly from the first network entity 705 via the forwarding-capable network entity 715. For example, the first network entity 705 may transmit the communication in a spatial direction toward the forwarding-capable network entity 715, and the forwarding-capable network entity 715 may redirect or reflect the communication to the second network entity 710.

In some examples, the second network entity 710 may communicate directly with the first network entity 705 via a direct link 725. For example, a communication may be transmitted via the direct link 725. A communication transmitted via the direct link 725 between the second network entity 710 and the network node 110 does not pass through and is not reflected, refracted, or redirected by the forwarding-capable network entity 715. In some examples, the second network entity 710 may communicate indirectly with the first network entity 705 via an indirect link 730 (also referred to as an RIS communication link). For example, a communication may be transmitted via different segments of the indirect link 730. A communication transmitted via the indirect link 730 between the second network entity 710 and the first network entity 705 is reflected, refracted, and/or redirected by the forwarding-capable network entity 715. As shown in FIG. 7 and by reference number 735, the first network entity 705 may communicate with the forwarding-capable network entity 715 (e.g., with the controller 720) via a control channel. For example, the first network entity 705 may indicate, in an RIS control message, spatial direction(s) and/or signal characteristics for signals reflected by the forwarding-capable network entity 715. The controller 720 may configure reconfigurable elements of the forwarding-capable network entity 715 in accordance with the RIS control message. In some examples, the RIS control message may indicate information associated with the wireless network, such as a frame structure, time synchronization information, and/or slot boundaries, among other examples. Using the communication scheme shown in FIG. 7 may improve network performance and increase reliability by providing the second network entity 710 with link diversity for communicating with the first network entity 705.

In some cases, the second network entity 710 may receive a communication (e.g., the same communication) from the first network entity 705 via both the direct link 725 and the indirect link 730. In some examples, the second network entity 710 may receive communication(s) via multiple indirect links associated with respective forwarding-capable network entities 715 (e.g., with or without a direct link 725). In other cases, the first network entity 705 may select one of the links (e.g., either the direct link 725 or the indirect link 730), and may transmit a communication to the second network entity 710 using only the selected link. Alternatively, the first network entity 705 may receive an indication of one of the links (e.g., either the direct link 725 or the indirect link 730), and may transmit a communication to the second network entity 710 using only the indicated link. The indication may be transmitted by the second network entity 710 and/or the forwarding-capable network entity 715. In some examples, such selection and/or indication may be based at least in part on channel conditions and/or link reliability.

As indicated above, FIG. 7 is provided as an example. Other examples may differ from what is described with respect to FIG. 7.

Figure 8:
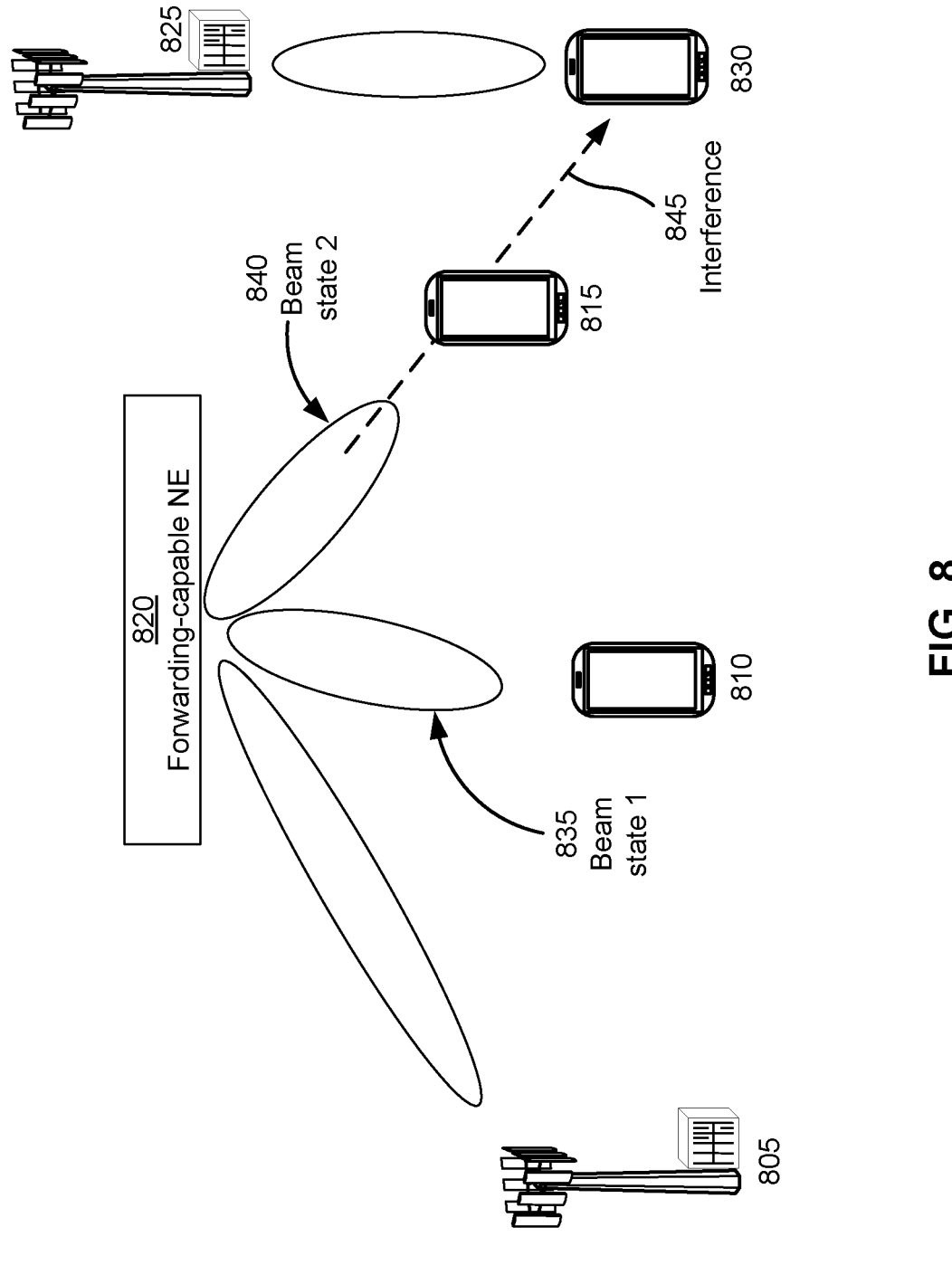
FIG. 8 is a diagram illustrating an example of interference associated with a forwarding-capable network entity in a wireless network, in accordance with the present disclosure.

FIG. 8 is a diagram illustrating an example 800 of interference associated with a forwarding-capable network entity in a wireless network, in accordance with the present disclosure. As shown in FIG. 8, a network entity 805 (e.g., the network entity 102, the network entity 104, the network entity 106, the apparatus 200, the network node 310, the network entity 402, the network entity 404, a base station, a CU, a DU, and/or an RU, among other examples) may communicate with a network entity 810 (e.g., the network entity 102, the network entity 104, the network entity 106, the apparatus 200, and/or the UE 320) and a network entity 815 (e.g., the network entity 102, the network entity 104, the network entity 106, the apparatus 200, and/or the UE 320) via a forwarding-capable network entity 820. For example, the network entity 805 may support or serve a first cell. The network entity 810 and the network entity 815 may be included in and/or operating in the first cell. Additionally, a network entity 825 (e.g., the network entity 102, the network entity 104, the network entity 106, the apparatus 200, the network node 310, the network entity 402, the network entity 404, a base station, a CU, a DU, and/or an RU, among other examples) may communicate with a network entity 830 (e.g., the network entity 102, the network entity 104, the network entity 106, the apparatus 200, and/or the UE 320). For example, the network entity 825 may support or serve a second cell. The network entity 830 may be included in and/or operating in the second cell.

In some examples, the network entity 805, the network entity 810, and the network entity 815 may communicate using a first frequency band (e.g., the first cell may be associated with a first frequency band). The network entity 825 and the network entity 830 may communicate using a second frequency band (e.g., the second cell may be associated with a second frequency band). In some examples, the forwarding-capable network entity 820 may cause interference in the first cell and/or the second cell.

For example, as shown in FIG. 8, the forwarding capable device 820 may forward (e.g., reflect, redirect, refract, and/or otherwise forward) signals in various spatial directions (e.g., various beam directions or beam states). For example, the forwarding-capable network entity 820 may be configured (e.g., via a first forwarding configuration from the network entity 805) to forward a signal using a first beam state 835 (e.g., beam state 1). The first beam state 835 may cause the signal to be forwarded in a spatial direction toward the network entity 810. As another example, the forwarding-capable network entity 820 may be configured (e.g., via a first forwarding configuration from the network entity 805) to forward the signal using a second beam state 840 (e.g., beam state 2). The second beam state 840 may cause the signal to be forwarded in a spatial direction toward the network entity 815. However, as shown in FIG. 8, and by reference number 845, the spatial direction toward the network entity 815 may also be toward the network entity 830 (e.g., that is operating in a different cell and/or using a different frequency band). As a result, the signal forwarded by the forwarding-capable network entity 820 in the second beam state 840 may cause interference at the network entity 830.

Additionally, the forwarding-capable network entity 820 may not support controllable frequency selective operations. For example, the reconfigurable elements (e.g., meta-elements) of the forwarding-capable network entity 820 may be configured to reflect and/or redirect signals using a reflection (or reflective) coefficient. However, the reconfigurable elements and/or the forwarding-capable network entity 820 may not be capable of filtering and/or selecting to forward (e.g., reflect, redirect, and/or refract) only signals associated with a given frequency. In other words, any incident signal arriving at the forwarding-capable network entity 820 may be forwarded in accordance with a current forwarding configuration. Therefore, even signals associated with a different frequency band and/or different cell than the frequency band and/or cell for which the forwarding-capable network entity 820 is configured to assist may be forwarded by the forwarding-capable network entity 820 (e.g., signals associated with a frequency band other than the first frequency band and/or associated with a cell other than the first cell may also be forwarded by the forwarding-capable network entity 820). The signals associated with a different frequency band and/or different cell that are forwarded by the forwarding-capable network entity 820 may cause interference within the first cell and/or within another cell, such as the second cell.

Therefore, signals that are forwarded (e.g., reflected, redirected, and/or refracted) by the forwarding-capable network entity 820 may cause out-of-band interference and/or inter-cell interference. The interference caused by the signals that are forwarded by the forwarding-capable network entity 820 may be exacerbated in multi-band and/or multi-cell scenarios where the forwarding-capable network entity 820 is operating in a geographic region in which network entities are communicating via multiple frequency bands and/or via multiple cells. Additionally, the interference caused by the signals that are forwarded by the forwarding-capable network entity 820 may be exacerbated by the forwarding configuration of the forwarding-capable network entity 820 changing frequently over time. For example, frequently changing the forwarding configuration of the forwarding-capable network entity 820 may result in interference experienced at a given network entity (e.g., the network entity 830) changing frequently over time (e.g., an interference profile experienced by the given network entity may change frequently over time). It may be more difficult for the given network entity to mitigate and/or compensate for interference experienced by the given network entity when the interference experienced at the given network entity is changing frequently over time.

As indicated above, FIG. 8 is provided as an example. Other examples may differ from what is described with respect to FIG. 8.

Figure 9:
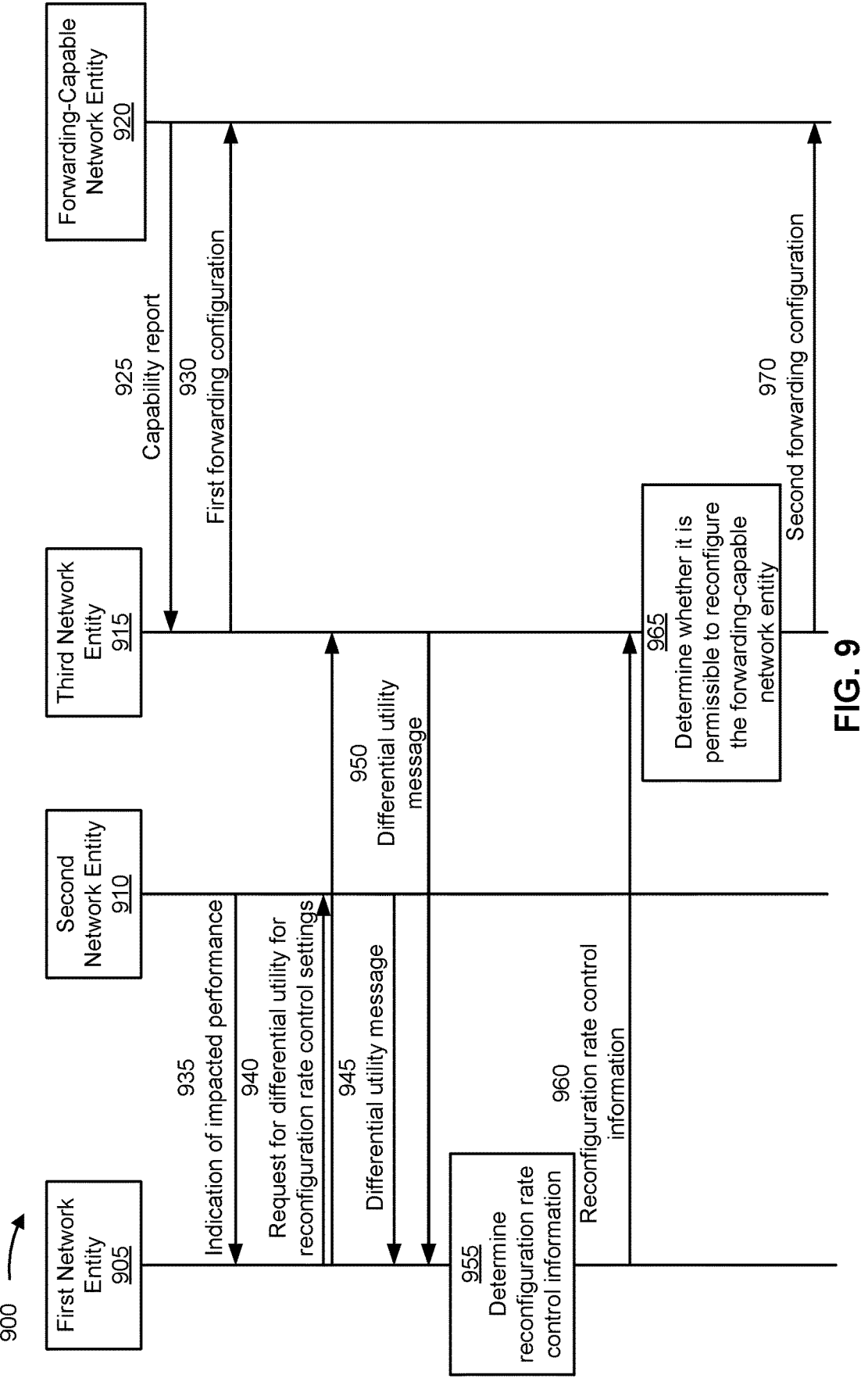
FIG. 9 is a diagram of an example associated with operations associated with forwarding-capable network entity reconfiguration rate control, in accordance with the present disclosure.

FIG. 9 is a diagram of an example associated with operations 900 associated with forwarding-capable network entity reconfiguration rate control, in accordance with the present disclosure. As shown in FIG. 9, a first network entity 905, a second network entity 910, and a third network entity 915 may communicate with each other. In some aspects, the first network entity 905, the second network entity 910, and the third network entity 915 may be part of a wireless network (for example, the wireless network 300). The first network entity 905, the second network entity 910, and/or the third network entity 915 may be the network entity 102, the network entity 104, the network entity 106, the apparatus 200, the network node 310, the UE 320, a base station, a CU, a DU, and/or an RU, among other examples.

In some aspects, the first network entity 905 may be a control entity associated with controlling and/or configuring operations associated with the second network entity 910 and the third network entity 915. For example, the first network entity 905 may be a CU and the second network entity 910 and the third network entity 915 may be DUs. As another example, the first network entity 905 may be a network control entity (e.g., a core network device, a network server device, or another control entity) and the second network entity 910 and the third network entity 915 may be other network entities (e.g., base stations or network nodes).

The third network entity 915 may be associated with a forwarding-capable network entity 920 (e.g., the forwarding-capable network entity 360 or another forwarding-capable network entity described herein). For example, the third network entity 915 may communicate via the forwarding-capable network entity 920. The third network entity 915 may control or configure one or more operations of the forwarding-capable network entity 920. For example, the forwarding-capable network entity 920 may be included in a cell that is served or supported by the third network entity 915.

As shown by reference number 925, the forwarding-capable network entity 920 may transmit, and the third network entity 915 may receive, a capability report. The forwarding-capable network entity 920 may transmit the capability report via capability signaling, an RRC communication, a physical uplink shared channel (PUSCH), and/or a physical uplink control channel (PUCCH), among other examples. The capability report may indicate support for one or more operations described herein. For example, the capability report may indicate whether the forwarding-capable network entity 920 supports one or more operations described herein. For example, the capability report may indicate whether the forwarding-capable network entity 920 supports being reconfigured in a controlled manner. In some aspects, the capability report may indicate whether the forwarding-capable network entity 920 supports being re-configured in accordance with a timer, as described in more detail elsewhere herein. In some aspects, the capability report may indicate one or more timer settings (e.g., amounts of time associated with the timer) that are supported by the forwarding-capable network entity 920.

The third network entity 915 may configure the forwarding-capable network entity 920 in accordance with the capability report. For example, the third network entity 915 may configure, or may trigger, the forwarding-capable network entity 920 to perform one or more operations based on, in response to, or otherwise associated with the capability report indicating that the forwarding-capable network entity 920 supports the one or more operations. As an example, the third network entity 915 may configure, or may trigger, the forwarding-capable network entity 920 to operate using a forwarding configuration (and/or parameters of a forwarding configuration) based on, in response to, or otherwise associated with the capability report indicating that the forwarding-capable network entity 920 supports the forwarding configuration.

As shown by reference number 930, the third network entity 915 may transmit, and the forwarding-capable network entity 920 may receive, an indication of a first forwarding configuration. In some aspects, the third network entity 915 may transmit the first forwarding configuration information via one or more of system information signaling, RRC signaling, one or more MAC control elements (MAC-CEs), and/or downlink control information (DCI), among other examples. In some aspects, the forwarding configuration may include an indication of one or more configuration parameters for selection by the forwarding-capable network entity 920, and/or explicit configuration information for the forwarding-capable network entity 920 to use to configure itself, among other examples.

The first forwarding configuration may cause the forwarding-capable network entity 920 to forward (e.g., reflect, redirect, refract, and/or otherwise forward) signals in a first spatial direction. For example, the first forwarding configuration may cause a controller of the forwarding-capable network entity 920 to control elements on a surface of the forwarding-capable network entity 920, and the surface may act as a phased array. The third network entity 915 may use the controller to control, via the first forwarding configuration, an angle of reflection (e.g., angle of arrival $\theta_i$ for an incident wave, angle of departure $\theta_r$ for a reflected wave), an amplitude, a phase, and/or an electrical-length (or width) of the elements of the forwarding-capable network entity 920 by controlling a voltage to each of the elements. The first forwarding configuration may indicate analog beamforming weights or coefficients that are provided by the forwarding-capable network entity 920 when reflecting signals from one device to another.

The forwarding-capable network entity 920 may configure itself (e.g., via a controller) in accordance with the first forwarding configuration. For example, the forwarding-capable network entity 920 may configure one or more elements of the forwarding-capable network entity 920 to forward signals in a spatial direction indicated by the first forwarding configuration. Additionally, or alternatively, the forwarding-capable network entity 920 may configure one or more elements of the forwarding-capable network entity 920 to forward signals using an angle of reflection, an amplitude, a phase, and/or a width (e.g., a beam width), among other examples, indicated by the first forwarding configuration.

In some aspects, the third network entity 915 may transmit the first forwarding configuration without any reconfiguration rate controls. For example, when transmitting the first forwarding configuration, the third network entity 915 may not have any restrictions as to a rate (or frequency over time) at which the forwarding-capable network entity 920 can be reconfigured. In other aspects, the third network entity 915 may transmit the first forwarding configuration in accordance with first reconfiguration rate control information. The first reconfiguration rate control information may indicate a permissible amount of time (e.g., a minimum amount of time) between reconfigurations of the forwarding-capable network entity 920. In some aspects, the first reconfiguration rate control information may indicate a first timer setting (e.g., where the first timer setting indicates the permissible amount of time). The third network entity 915 may initiate the timer after transmitting a forwarding configuration to the forwarding-capable network entity 920. After an expiration of the timer, the third network entity 915 may determine that it is permissible to transmit another forwarding configuration to the forwarding-capable network entity 920 (e.g., after an expiration of the timer, it may be permissible to reconfigure the forwarding-capable network entity 920).

As shown by reference number 935, the first network entity 905 may receive information indicative of a network performance impact caused by the forwarding-capable network entity 920. For example, the second network entity 910 may transmit, and the first network entity 905 may receive, an indication of impacted performance caused by the forwarding-capable network entity 920. As an example, signals forwarded by the forwarding-capable network entity 920 may cause interference for the second network entity 910 and/or for one or more network entities (e.g., one or more UEs) served by the second network entity 910. For example, the second network entity 910 and/or for one or more network entities (e.g., one or more UEs) served by the second network entity 910 may measure interference. In some aspects, if measurement values of the interference satisfy an interference threshold, then the second network entity 910 may transmit the information indicative of the network performance impact. As another example, if the measurement values of the interference change frequently over time (e.g., if a quantity of occurrences in which the measurement values are changing by a given amount over a time window satisfies a threshold), then the second network entity 910 may transmit the information indicative of the network performance impact.

For example, the forwarding-capable network entity 920 may be configured to operate via a first frequency band (e.g., the third network entity 915 may operate using the first frequency band). The second network entity 910 (or another network entity) may operate using a second frequency band. In some aspects, signals forwarded by the forwarding-capable network entity 920 (e.g., associated with the first frequency band) may cause interference for the second network entity 910 and/or for one or more network entities (e.g., one or more UEs) served by the second network entity 910. Additionally, signals transmitted by the second network entity 910 (or another network entity) via the second frequency band may also be forwarded by the forwarding-capable network entity 920 (e.g., even though the forwarding-capable network entity 920 may be configured to operate via the first frequency band). The signals forwarded via the second frequency band may cause interference for the second network entity 910 and/or for one or more network entities (e.g., one or more UEs) served by the second network entity 910.

As the third network entity 915 changes the forwarding configuration of the forwarding-capable network entity 920, the interference experienced by the second network entity 910 and/or for one or more network entities (e.g., one or more UEs) served by the second network entity 910 may also change (e.g., in terms of power and/or direction of the interference). The changing interference profile for the second network entity 910 and/or for one or more network entities (e.g., one or more UEs) served by the second network entity 910 may degrade performance. Therefore, the second network entity 910 may transmit the information indicative of the network performance impact to indicate (e.g., to the first network entity 905) that a forwarding-capable network entity (e.g., the forwarding-capable network entity 920) may be impacting performance in a cell associated with the second network entity 910.

The first network entity 905 may impose one or more reconfiguration rate controls for the forwarding-capable network entity 920 in response to receiving the information indicative of the network performance impact (e.g., from the second network entity 910 and/or other network entities). For example, the one or more reconfiguration rate controls may limit a rate at which the forwarding-capable network entity 920 can be reconfigured (e.g., by the third network entity 915). Limiting the rate at which the forwarding-capable network entity 920 can be reconfigured may enable other network entities to measure interference and use one or more interference mitigation techniques. For example, limiting the rate at which the forwarding-capable network entity 920 can be reconfigured may allow enough time for the other network entities (e.g., that may be impacted or experience interference due to signals forwarded by the forwarding-capable network entity 920) to measure interference and use one or more interference mitigation techniques before the forwarding configuration of the forwarding-capable network entity 920 is changed again.

In some aspects, the first network entity 905 may obtain differential utility information associated with respective candidate timer settings (e.g., candidate amounts of time to be associated with the timer for reconfiguring the forwarding-capable network entity 920). As used herein, "differential utility information" includes information that is indicative of a network performance difference between a first reconfiguration rate control setting (e.g., a first timer setting) and a second reconfiguration rate control setting (e.g., a second timer setting). For example, the first timer setting may be a current timer setting used by the forwarding-capable network entity 920 and the second timer setting may be a candidate timer setting. The network performance difference may be a network utility difference. For example, the difference in network performance may be a difference in a spectral efficiency for one or more network entities (e.g., UEs) served by a given network entity (such as the second network entity 910 and/or the third network entity 915). Additionally, or alternatively, the difference in network performance may be a difference in a latency. Additionally, or alternatively, the difference in network performance may be a difference in a metric indicative of user experience, such as throughput, among other examples. Additionally, or alternatively, the difference in network performance may be a difference in one or more channel quality metrics, such as signal-to-noise ratio (SNR) or signal-to-interference-plus-noise ratio (SINR), among other examples. For example, as used herein, "utility" refers to one or more metrics of network entities operating in a wireless network, such as spectral efficiency, latency, throughput, data rate, SNR, and/or SINR, among other examples. The differential utility information may indicate a difference between a first utility associated with a first timer setting and a second utility associated with a second timer setting. More generally, utility can be a metric determined for served network entities (e.g., UEs) that is proportional to user experience. Hence, utility may depend on the channel qualities seen by served network entities (e.g., UEs) and, as a result, on the interference profile seen by the served network entities. The differential utility can then be determined as a difference in a computed utility (e.g., associated with a candidate timer setting) and a current utility (e.g., that is currently experienced by the served network entities (e.g., UEs)).

In some aspects, differential utility information may be calculated as an average differential utility for network entities (e.g., UEs) served by a given network entity (such as the second network entity 910 and/or the third network entity 915). As another example, differential utility information may be calculated as a median differential utility, an $n^{th}$ percentile differential utility (e.g., a fifth percentile value), and/or a weighted sum (or weighted average) differential utility for network entities (e.g., UEs) served by a given network entity. The weighted sum (or weighted average) differential utility may be associated with network entities (e.g., UEs) being associated with respective weights for calculating the differential utility (e.g., where UEs associated with different priorities may be associated with different weights).

As shown by reference number 940, the first network entity 905 may transmit, and the second network entity 910 and/or the third network entity 915 may receive, a request for differential utility information for one or more reconfiguration rate control settings. The one or more reconfiguration rate control settings may include one or more candidate timer settings, one or more events, one or more candidate rates (e.g., indicating a quantity of reconfigurations that can occur over a given time period), and/or other information that may indicate to a network entity that it is permissible to reconfigure a forwarding-capable network entity, such as the forwarding-capable network entity 920. The first network entity 905 may transmit the request for differential utility information to network entities that are operating using a neighboring frequency band to the frequency band used by the third network entity 915 (e.g., and the forwarding-capable network entity 920). A neighboring frequency band may be a frequency band that is within a given frequency value of the frequency band used by the third network entity 915 (e.g., and the forwarding-capable network entity 920). For example, a neighboring frequency band may be a frequency band where a difference between a first frequency (e.g., a first center frequency) of the neighboring frequency band and a second frequency (e.g., a second center frequency) of the frequency band used by the third network entity 915 satisfies a frequency threshold (e.g., a frequency difference).

In some aspects, the first network entity 905 may transmit the request for differential utility information to network entities that are geographically located near the forwarding-capable network entity 920. For example, the first network entity 905 may identify one or more network entities that have a distance from the forwarding-capable network entity 920 that satisfies a distance threshold. The first network entity 905 may transmit the request for differential utility information to the one or more network entities (e.g., base stations, CUs, DUs, and/or RUs) that have a distance from the forwarding-capable network entity 920 that satisfies the distance threshold. Additionally, or alternatively, the first network entity 905 may transmit the request for differential utility information to network entities that are associated with a servable area that is within a range of the forwarding-capable network entity 920. The servable area may include a forwarding spatial angular span of the forwarding-capable network entity 920 (e.g., a range of spatial directions in which the forwarding-capable network entity 920 is capable of forwarding signals). This enables the first network entity 905 to obtain differential utility information from network entities (such as the second network entity 910) that are configured to serve an area (e.g., a cell) that is likely to be impacted by operations of the forwarding-capable network entity 920.

For example, the first network entity 905 may transmit the request for differential utility information to the network entity that is configured to control the forwarding-capable network entity 920 (e.g., the third network entity 915) and one or more other network entities that are configured to serve an area (e.g., a cell) that is likely to be impacted by operations of the forwarding-capable network entity 920 (e.g., shown as the second network entity 910 in FIG. 9 as an example). In some aspects, the request for differential utility information may indicate one or more candidate reconfiguration rate control settings, such as one or more candidate timer settings, one or more candidate events, and/or one or more candidate rates (e.g., indicating a quantity of reconfigurations that can occur over a given time period), among other examples.

In some aspects, the request for differential utility information may indicate supporting information associated with the forwarding-capable network entity 920. The supporting information may indicate information to facilitate the calculation or determination of the differential utility information. For example, the supporting information may include an identifier of the forwarding-capable network entity 920, a location of the forwarding-capable network entity 920, an orientation of the forwarding-capable network entity 920, an operating frequency band of the forwarding-capable network entity 920, a range of the forwarding-capable network entity 920, a span of forwarding angles of the forwarding-capable network entity 920, and/or information indicative of an amplification gain, directivity, or beamforming gain of the forwarding-capable network entity 920, among other examples.

The second network entity 910 and the third network entity 915 may determine (e.g., may calculate) differential utility for respective candidate reconfiguration rate control settings indicated by the request from the first network entity 905. The second network entity 910 and the third network entity 915 may determine (e.g., may calculate) the differential utility based on, or otherwise associated with, the supporting information. For example, the third network entity 915 may determine a differential utility for each candidate reconfiguration rate control setting indicated by the request from the first network entity 905. For example, the third network entity 915 may determine a differential utility associated with a given candidate reconfiguration rate control setting based on determining a difference between a current utility associated with one or more network entities (e.g., UEs) served by the third network entity 915 and a determined utility associated with the one or more network entities (e.g., UEs) served by the third network entity 915 if the given candidate reconfiguration rate control setting were to be applied for reconfigurations of the forwarding-capable network entity 920. The third network entity 915 may determine differential utilities for respective candidate reconfiguration rate control settings in a similar manner. In some aspects, the third network entity 915 may generate a differential utility table, where entries in the differential utility table correspond to respective differential utilities determined by the third network entity 915.

The second network entity 910 may determine (e.g., may calculate) differential utility for respective candidate reconfiguration rate control settings indicated by the request from the first network entity 905 in a similar manner. For example, the second network node 910 may determine a differential utility associated with a given candidate reconfiguration rate control setting based on determining a difference between a current utility associated with one or more network entities (e.g., UEs) served by the second network entity 910 and a determined utility associated with the one or more network entities (e.g., UEs) served by the second network entity 910 if the given candidate reconfiguration rate control setting were to be applied for reconfigurations of the forwarding-capable network entity 920. The second network entity 910 may determine differential utilities for respective candidate reconfiguration rate control settings in a similar manner. In some aspects, the third network entity 915 may generate a differential utility table, where entries in the differential utility table correspond to respective differential utilities determined by the second network entity 910. In some aspects, an entry in the differential utility table may indicate multiple differential values for respective utility metrics for a given candidate reconfiguration rate control setting. For example, an entry in the differential utility table may indicate a first differential value associated with spectral efficiency, a second differential value associated with latency, a third differential value associated with throughput, and so on.

As shown by reference number 945, the second network entity 910 may transmit, and the first network entity 905 may receive, a differential utility message. The differential utility message may indicate the differential utilities determined by the second network entity 910 (e.g., may indicate the differential utility table). In some aspects, the differential utility message may indicate one or more recommended reconfiguration rate control settings (e.g., from the one or more candidate reconfiguration rate control settings indicated by the request from the first network entity 905). For example, the second network entity 910 may determine one or more reconfiguration rate control settings that are associated with a positive differential utility or a positive utility change (e.g., where a switch to the reconfiguration rate control setting results in improved user experience for one or more network entities served by the second network entity 910). In some aspects, the second network entity 910 may determine one or more reconfiguration rate control settings that are associated with the greatest positive differential utility. In other aspects, the one or more recommended reconfiguration rate control settings may be any candidate reconfiguration rate control setting associated with a positive differential utility as determined by the second network entity 910.

As shown by reference number 950, the third network entity 915 may transmit, and the first network entity 905 may receive, a differential utility message. The differential utility message may indicate the differential utilities determined by the third network entity 915 (e.g., may indicate a differential utility table). In some aspects, the differential utility message may indicate one or more recommended reconfiguration rate control settings (e.g., from the one or more candidate reconfiguration rate control settings indicated by the request from the first network entity 905). For example, the third network entity 915 may determine one or more reconfiguration rate control settings in a similar manner as described above.

As shown by reference number 955, the first network entity 905 may determine reconfiguration rate control information for the forwarding-capable network entity 920. The first network entity 905 may determine the reconfiguration rate control information based on one or more differential utility messages received by the first network entity 905 (e.g., such as the differential utility messages received from the second network entity 910 and the third network entity 915). For example, the first network entity 905 may determine one or more reconfiguration rate control settings, from the one or more candidate reconfiguration rate control settings, based on the one or more differential utility messages received by the first network entity 905. In some aspects, the first network entity 905 may determine one or more reconfiguration rate control settings associated with a positive differential utility for one or more (all or a highest quantity of) network entities that transmit differential utility messages to the first network entity 905. In some aspects, the first network entity 905 may determine one or more reconfiguration rate control settings associated with greatest net positive differential utility (e.g., a positive utility change) for one or more (all or a highest quantity of) network entities that transmit differential utility messages to the first network entity 905.

For example, the first network entity 905 may determine an allowable (e.g., a minimum) amount of time between reconfigurations of the forwarding-capable network entity 920. For example, the first network entity 905 may determine a timer setting (e.g., an amount of time to be associated with a timer) to be used by the third network entity 915 when reconfiguring the forwarding-capable network entity 920. Additionally, or alternatively, the first network entity 905 may determine an allowable rate of reconfigurations of the forwarding-capable network entity 920. The allowable rate may indicate a quantity of reconfigurations of the forwarding-capable network entity 920 that are allowable within a given time window (e.g., a sliding time window). The first network entity 905 may determine other reconfiguration rate control settings in a similar manner (e.g., to result in a greatest net positive differential utility for one or more (all or a highest quantity of) network entities that transmit differential utility messages to the first network entity 905).

As shown by reference number 960, the first network entity 905 may transmit, and the third network entity 915 may receive, reconfiguration rate control information. For example, the reconfiguration rate control information may include one or more reconfiguration rate control settings. The one or more reconfiguration rate control settings may include an allowable (e.g., a minimum) amount of time between configurations of the forwarding-capable network entity 920. For example, the one or more reconfiguration rate control settings may include a timer setting (e.g., an amount of time to be associated with a timer). The third network entity 915 may be configured to initiate the timer when transmitting a first forwarding configuration to the forwarding-capable network entity 920 (such as described above in connection with reference number 930). After the timer expires, the third network entity 915 may be permitted to transmit a second forwarding configuration to the forwarding-capable network entity 920. Additionally, or alternatively, the one or more reconfiguration rate control settings may include an allowable rate of configuration of the forwarding-capable network entity 920. The allowable rate of configuration may indicate a quantity of configurations that are allowed to be transmitted to (and/or applied by) the forwarding-capable network entity 920 in a given time window (e.g., a sliding time window). The one or more reconfiguration rate control settings may indicate an amount of time associated with the time window and/or the quantity of configurations that are allowed.

As shown by reference number 965, the third network entity 915 may determine whether it is permissible to reconfigure the forwarding-capable network entity 920 in accordance with the reconfiguration rate control information. For example, the third network entity 915 may determine whether it is permissible to reconfigure the forwarding-capable network entity 920 based on an amount of time since the first forwarding configuration was transmitted and/or applied (e.g., as described above in connection with reference number 930). For example, the third network entity 915 may determine whether it is permissible to reconfigure the forwarding-capable network entity 920 based on, or otherwise associated with, one or more reconfiguration rate control settings indicated by the reconfiguration rate control information. In some aspects, the third network entity 915 may determine whether the amount of time since the first forwarding configuration was transmitted and/or applied is greater than or equal to an amount of time indicated by a reconfiguration rate control setting (e.g., a timer setting). For example, the third network entity 915 may determine whether a timer that is initiated when the first forwarding configuration was transmitted and/or applied (e.g., as described above in connection with reference number 930) has expired.

If the amount of time since the first forwarding configuration was transmitted and/or applied is greater than or equal to the amount of time indicated by a reconfiguration rate control setting (e.g., if the timer is expired), then the third network entity 915 may determine that it is permissible to reconfigure the forwarding-capable network entity 920. If the amount of time since the first forwarding configuration was transmitted and/or applied is less than the amount of time indicated by a reconfiguration rate control setting (e.g., if the timer is not expired), then the third network entity 915 may determine that it is not permissible to reconfigure the forwarding-capable network entity 920 (e.g., the third network entity 915 may refrain from reconfiguring the forwarding-capable network entity 920). As another example, the third network entity 915 may determine a quantity of configurations that have been transmitted to and/or applied by the forwarding-capable network entity 920 within a time window. The third network entity 915 may determine whether the quantity of configurations satisfies a rate threshold indicated by a reconfiguration rate control setting (e.g., an allowable rate setting). If the quantity of configurations satisfies the rate threshold, then the third network entity 915 may determine that it is not permissible to reconfigure the forwarding-capable network entity 920 (e.g., the third network entity 915 may refrain from reconfiguring the forwarding-capable network entity 920). If the quantity of configurations does not satisfy the rate threshold, then the third network entity 915 may determine that it is permissible to reconfigure the forwarding-capable network entity 920.

As shown by reference number 970, the third network entity 915 may transmit, and the forwarding-capable network entity 920 may receive, a second forwarding configuration. The third network entity 915 may transmit the second forwarding configuration based on, in response to, or otherwise associated with determining that it is permissible to reconfigure the forwarding-capable network entity 920 (e.g., as described elsewhere herein).

Additionally, or alternatively, the forwarding-capable network entity 920 may determine (e.g., a controller of the forwarding-capable network entity 920 may determine) whether it is permissible to apply the second forwarding configuration. For example, the third network entity 915 may transmit, and the forwarding-capable network entity 920 may receive, an indication of the reconfiguration rate control information. The forwarding-capable network entity 920 may determine whether it is permissible to apply the second forwarding configuration in a similar manner as the third network entity 915 determining whether it is permissible to reconfigure the forwarding-capable network entity 920 (e.g., as described elsewhere herein, such as in connection with reference number 965). The forwarding-capable network entity 920 may apply the second forwarding configuration and forward one or more signals in accordance with the second forwarding configuration.

The third network entity 915 and/or the forwarding-capable network entity 920 may continue to operate in accordance with the reconfiguration rate control information. The third network entity 915 and/or the forwarding-capable network entity 920 may operate in accordance with the reconfiguration rate control information for a given period of time (e.g., after which the third network entity 915 and/or the forwarding-capable network entity 920 may operate without configuration rate control and/or in accordance with previous or default reconfiguration rate control information). In some aspects, the third network entity 915 and/or the forwarding-capable network entity 920 may operate in accordance with the reconfiguration rate control information until the third network entity 915 receives updated or modified reconfiguration rate control information (e.g., from the first network entity 905).

As indicated above, FIG. 9 is provided as an example. Other examples may differ from what is described with respect to FIG. 9.

Figure 10:
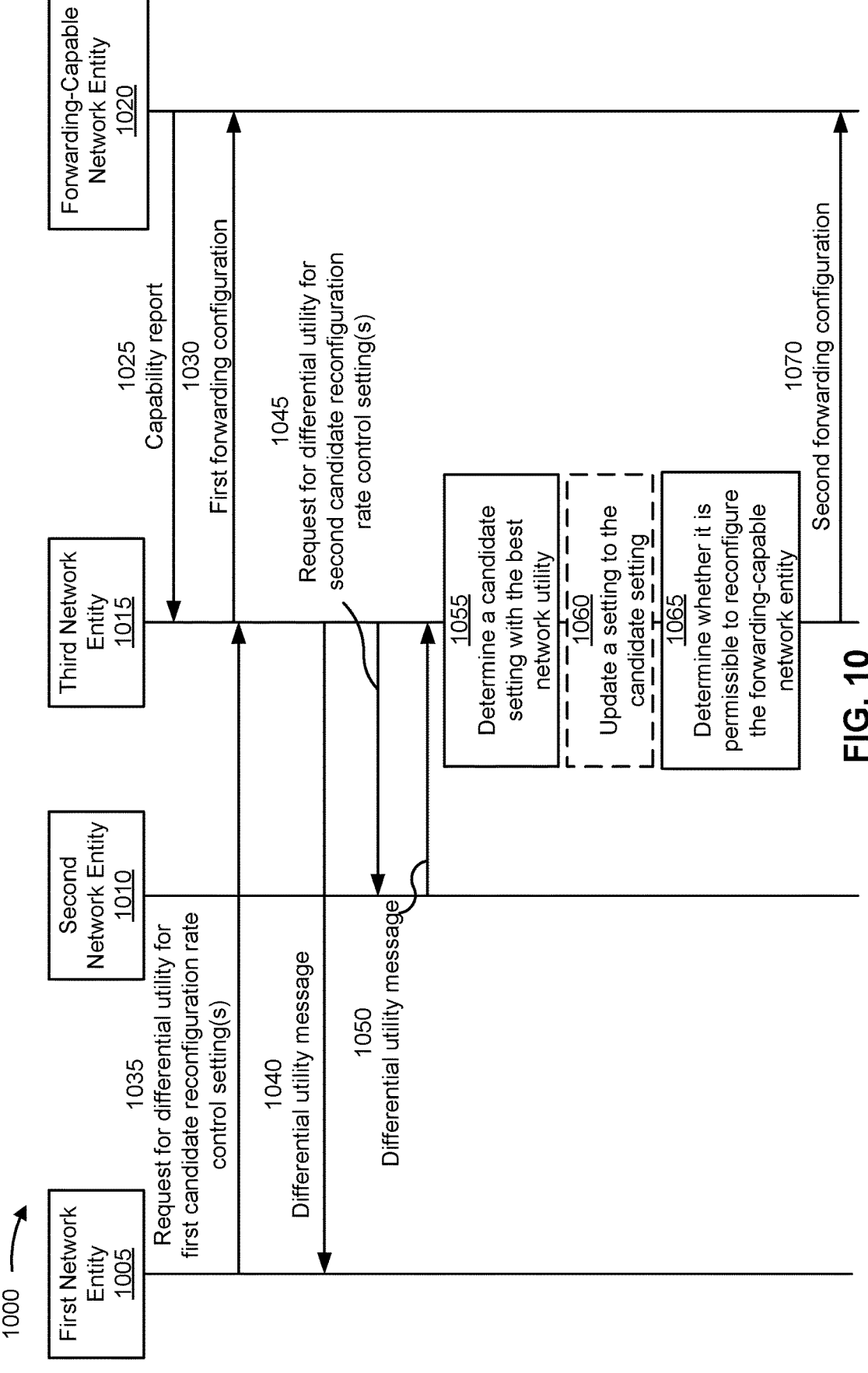
FIG. 10 is a diagram of an example associated with operations associated with forwarding-capable network entity reconfiguration rate control, in accordance with the present disclosure.

FIG. 10 is a diagram of an example associated with operations 1000 associated with forwarding-capable network entity reconfiguration rate control, in accordance with the present disclosure. As shown in FIG. 10, a first network entity 1005, a second network entity 1010, and a third network entity 1015 may communicate with each other. In some aspects, the first network entity 1005, the second network entity 1010, and the third network entity 1015 may be part of a wireless network (for example, the wireless network 300). The first network entity 1005, the second network entity 1010, and/or the third network entity 1015 may be the network entity 102, the network entity 104, the network entity 106, the apparatus 200, the network node 310, the UE 320, a base station, a CU, a DU, and/or an RU, among other examples.

The third network entity 1015 may be associated with a forwarding-capable network entity 1020 (e.g., the forwarding-capable network entity 360 or another forwarding-capable network entity described herein). For example, the third network entity 1015 may communicate via the forwarding-capable network entity 1020. The third network entity 1015 may control or configure one or more operations of the forwarding-capable network entity 1020. For example, the forwarding-capable network entity 1020 may be included in a cell that is served or supported by the third network entity 1015. The first network entity 1005 and/or the second network entity 1010 may be similarly associated with one or more forwarding-capable network entities (not shown in FIG. 10).

As shown by reference number 1025, the forwarding-capable network entity 1020 may transmit, and the third network entity 1015 may receive, a capability report. The forwarding-capable network entity 1020 may transmit the capability report in a similar manner as described in connection with FIG. 9 and reference number 925. For example, the capability report may indicate whether the forwarding-capable network entity 1020 supports one or more operations described herein. In some aspects, the capability report may indicate whether the forwarding-capable network entity 1020 supports being re-configured in accordance with a timer, as described in more detail elsewhere herein. In some aspects, the capability report may indicate one or more reconfiguration rate control settings (e.g., one or more timer settings) that are supported by the forwarding-capable network entity 1020.

The third network entity 1015 may configure the forwarding-capable network entity 1020 in accordance with the capability report. For example, the third network entity 1015 may configure, or may trigger, the forwarding-capable network entity 1020 to perform one or more operations based on, in response to, or otherwise associated with the capability report indicating that the forwarding-capable network entity 1020 supports the one or more operations.

As shown by reference number 1030, the third network entity 1015 may transmit, and the forwarding-capable network entity 1020 may receive, an indication of a first forwarding configuration. In some aspects, the third network entity 915 may transmit the first forwarding configuration information via one or more of system information signaling, RRC signaling, one or more MAC-CEs, and/or DCI, among other examples. In some aspects, the forwarding configuration may include an indication of one or more configuration parameters for selection by the forwarding-capable network entity 1020, and/or explicit configuration information for the forwarding-capable network entity 1020 to use to configure itself, among other examples.

The first forwarding configuration may cause the forwarding-capable network entity 1020 to forward (e.g., reflect, redirect, refract, and/or otherwise forward) signals in a first spatial direction. For example, the first forwarding configuration may cause a controller of the forwarding-capable network entity 1020 to control elements on a surface of the forwarding-capable network entity 1020, and the surface may act as a phased array. The third network entity 1015 may use the controller to control, via the first forwarding configuration, an angle of reflection (e.g., angle of arrival $\theta_i$ for an incident wave, angle of departure $\theta_r$ for a reflected wave), an amplitude, a phase, and/or a width of the elements of the forwarding-capable network entity 1020 by controlling a voltage to each of the elements. The first forwarding configuration may indicate analog beamforming weights or coefficients that are provided by the forwarding-capable network entity 1020 when reflecting signals from one device to another.

The forwarding-capable network entity 1020 may configure itself (e.g., via a controller) in accordance with the first forwarding configuration. For example, the forwarding-capable network entity 1020 may configure one or more elements of the forwarding-capable network entity 1020 to forward signals in a spatial direction indicated by the first forwarding configuration. Additionally, or alternatively, the forwarding-capable network entity 1020 may configure one or more elements of the forwarding-capable network entity 1020 to forward signals using an angle of reflection, an amplitude, a phase, and/or a width (e.g., a beam width), among other examples, indicated by the first forwarding configuration.

In some aspects, the third network entity 1015 may transmit the first forwarding configuration without any reconfiguration rate controls. For example, when transmitting the first forwarding configuration, the third network entity 115 may not have any restrictions as to a rate (or frequency over time) at which the forwarding-capable network entity 1020 can be reconfigured. In other aspects, the third network entity 1015 may transmit the first forwarding configuration in accordance with first reconfiguration rate control information. The first reconfiguration rate control information may indicate a permissible amount of time (e.g., a minimum amount of time) between reconfigurations of the forwarding-capable network entity 1020. In some aspects, the first reconfiguration rate control information may indicate a first timer setting (e.g., where the first timer setting indicates the permissible amount of time). The third network entity 1015 may initiate the timer after transmitting a forwarding configuration to the forwarding-capable network entity 1020. After an expiration of the timer, the third network entity 1015 may determine that it is permissible to transmit another forwarding configuration to the forwarding-capable network entity 1020 (e.g., after an expiration of the timer, it may be permissible to reconfigure the forwarding-capable network entity 1020).

In some aspects, each forwarding-capable network entity in the wireless network may be associated with a set of network entities (e.g., an out-set of network entities) that are impactable due to operations of that forwarding-capable network entity. For example, an out-set of network entities associated with the forwarding-capable network entity 1020 may include one or more network entities that are configured to serve areas (e.g., cells) that may be impacted due to operations of the forwarding-capable network entity 1020. The out-set of network entities associated with the forwarding-capable network entity 1020 may be determined (e.g., by a network entity, such as the third network entity 1015) based on, or otherwise associated with, a geographic location of the forwarding-capable network entity 1020. For example, the out-set of network entities associated with the forwarding-capable network entity 1020 may include one or more network entities that are geographically located near the forwarding-capable network entity 1020. For example, the out-set of network entities associated with the forwarding-capable network entity 1020 may include one or more network entities that have a distance from the forwarding-capable network entity 1020 that satisfies a distance threshold. Additionally, or alternatively, the out-set of network entities associated with the forwarding-capable network entity 1020 may include one or more network entities that are associated with a servable area that is within a range of the forwarding-capable network entity 1020. The servable area may include a forwarding spatial angular span of the forwarding-capable network entity 1020 (e.g., a range of spatial directions in which the forwarding-capable network entity 1020 is capable of forwarding signals). In other words, the out-set of network entities associated with the forwarding-capable network entity 1020 may include one or more network entities (such as the second network entity 1010) that are configured to serve an area (e.g., a cell) that is likely to be impacted by operations of the forwarding-capable network entity 1020.

In some aspects, each network entity (e.g., the first network entity 1005, the second network entity 1010, and/or the third network entity 1015) in the wireless network may be associated with a set of network entities (e.g., an in-set of network entities) that serve or control a forwarding-capable network entity that is capable of impacting a servable area (e.g., a cell) of that network entity. For example, the third network entity 1015 may be associated with an in-set of network entities that includes one or more network entities that are configured to control respective forwarding-capable network entities that are capable of impacting the performance of a servable area (e.g., a cell) of the third network entity 1015 (e.g., that are capable of impacting the performance of at least one UE served by the third network entity 1015). The in-set of network entities may be determined by a network entity (such as the third network entity 1015 and/or another network entity) based on, or otherwise associated with, geographic locations, ranges, and/or forwarding spans, among other examples of one or more forwarding-capable network entities in the wireless network (e.g., in a similar manner as described elsewhere herein).

In some aspects, a network entity that controls a given forwarding-capable network entity may determine the out-set of network entities associated with the given forwarding-capable network entity (e.g., based on information received from other network entities). For example, the third network entity 1015 may receive (e.g., from the first network entity 1005, the second network entity 1010, and/or other network entities in the wireless network) information associated with locations of respective cells and/or of the respective network entities. The third network entity 1015 may determine the out-set of one or more network entities associated with the forwarding-capable network entity 1020 based on, or otherwise associated with, the information associated with the locations. As another example, another network entity, such as a control entity (e.g., a CU, a network server device, or a core network device) may determine the out-set of one or more network entities associated with the forwarding-capable network entity 1020. In such examples, the third network entity 1015 may receive, from the other network entity, an indication of the out-set of one or more network entities associated with the forwarding-capable network entity 1020.

In some aspects, a given network entity may determine an in-set of one or more network entities associated with the given network entity. For example, the third network entity 1015 may receive (e.g., from the first network entity 1005, the second network entity 1010, and/or other network entities in the wireless network) information associated with respective forwarding-capable network entities in the wireless network. For example, the information may include locations, orientations, spans, ranges, and/or other supporting information (as described elsewhere herein) associated with the respective forwarding-capable network entities in the wireless network. The third network entity 1015 determine the in-set of one or more network entities associated with the third network entity 1015 based on, or otherwise associated with, the information associated with respective forwarding-capable network entities in the wireless network. In other aspects, another network entity e.g., a CU, a network server device, or a core network device) may determine the in-set of one or more network entities associated with the third network entity 1015. In such examples, the third network entity 1015 may receive, from the other network entity, an indication of the in-set of one or more network entities associated with the third network entity 1015.

The out-sets (e.g., for each forwarding-capable network entity) and/or the in-sets (e.g., for each network entity) may facilitate efficient information exchange (e.g., efficient exchange of differential utility information) for reconfiguration rate control determinations, as described in more detail elsewhere herein. For example, the out-sets (e.g., for each forwarding-capable network entity) and/or the in-sets (e.g., for each network entity) may enable a given network entity to identify from which network entities the network entity should collect differential utility information for reconfiguration rate control determinations, as described in more detail elsewhere herein.

As shown by reference number 1035, the first network entity 1005 may transmit a request for differential utility for a first one or more candidate reconfiguration rate control settings. For example, the first one or more candidate reconfiguration rate control settings may include a first one or more candidate timer settings. The third network entity may determine that the first network entity 1005 is included in the in-set of one or more network entities associated with the third network entity 1015. Therefore, the third network entity 1015 may determine to respond to the request for differential utility. For example, the first network entity 1005 may broadcast the request for differential utility and only network entities for which the first network entity 1005 is included in the in-set may respond to the request.

For example, the third network entity 1015 may determine (e.g., calculate) differential utility information for respective candidate reconfiguration rate control settings indicated by the request from the first network entity 1005 (e.g., based on, in response to, or otherwise associated with the first network entity 1005 being included in the in-set of one or more network entities associated with the third network entity 1015). The third network entity 1015 may determine (e.g., calculate) the differential utility information in a similar manner as described elsewhere herein, such as in connection with FIG. 9.

As shown by reference number 1040, the third network entity 1015 may transmit, and the first network entity 1005 may receive, a differential utility message. The differential utility message may indicate differential utilities determined by the third network entity 1015 (e.g., may indicate a differential utility table). In some aspects, the differential utility message may indicate one or more recommended reconfiguration rate control settings (e.g., from the one or more candidate reconfiguration rate control settings indicated by the request from the first network entity 1005). For example, the third network entity 1015 may determine one or more reconfiguration rate control settings that are associated with a positive differential utility (e.g., where a switch to the reconfiguration rate control setting results in improved user experience for one or more network entities served by the third network entity 1015). In some aspects, the third network entity 1015 may determine one or more reconfiguration rate control settings that are associated with the greatest positive differential utility. In other aspects, the one or more recommended reconfiguration rate control settings may be any candidate reconfiguration rate control setting associated with a positive differential utility as determined by the third network entity 1015. The first network entity 1005 may determine one or more reconfiguration rate control settings for a forwarding-capable network entity (e.g., not shown in FIG. 10) based on, or otherwise associated with, the differential utility message(s) received by the first network entity 1005.

In some aspects, the third network entity 1015 may determine that the one or more reconfiguration rate control settings for the forwarding-capable network entity 1020 are to be updated. For example, the third network entity 1015 may detect a trigger associated with updating reconfiguration rate control settings for the forwarding-capable network entity 1020. The trigger may be associated with an event that is indicative of a need for an update of a reconfiguration rate control setting (e.g., a timer setting) for the forwarding-capable network entity 1020. In some aspects, the trigger may be associated with a quantity of network entities (e.g., UEs) that are being served by the third network entity 1015 via the forwarding-capable network entity 1020 (e.g., that are communicating with the third network entity 1015 via an indirect link associated with the forwarding-capable network entity 1020). In some aspects, the trigger may be associated with the third network entity 1015 detecting that a utility of one or more network entities (e.g., UEs that are being served by the third network entity 1015 via the forwarding-capable network entity 1020) does not satisfy a threshold (e.g., indicating that it may be beneficial for the forwarding-capable network entity 1020 to be updated or reconfigured more frequently).

For example, the trigger may include the quantity of network entities (e.g., UEs that are being served by the third network entity 1015 via the forwarding-capable network entity 1020) satisfying one or more thresholds. In some aspects, the trigger may include an increase in the quantity of network entities satisfying a first threshold. For example, an increase in the quantity of network entities may indicate that it may be beneficial for the forwarding-capable network entity 1020 to be updated or reconfigured more frequently to serve the increased quantity of network entities. Additionally, or alternatively, the trigger may include a decrease in the quantity of network entities satisfying a second threshold. For example, a decrease in the quantity of network entities may indicate that the forwarding-capable network entity 1020 can be updated or reconfigured less frequently (e.g., to improve performance of out-of-band network entities or network entities operating in neighboring cells).

As shown by reference number 1045, the third network entity 1015 may transmit a request for differential utility information for a second one or more candidate reconfiguration rate control settings (e.g., one or more candidate timer settings for a timer associated with reconfiguring the forwarding-capable network entity 1015). In some aspects, the third network entity 1015 may broadcast the request for differential utility information. Additionally, or alternatively, the third network entity 1015 may transmit the request for differential utility information to network entities included in the out-set of one or more network entities associated with the forwarding-capable network entity 1020. For example, as shown in FIG. 10, the second network entity 1010 may be included in the out-set of one or more network entities associated with the forwarding-capable network entity 1020. Therefore, the third network entity 1015 may transmit, and the second network entity 1010 may receive, the request for differential utility information.

The one or more reconfiguration rate control settings may include one or more candidate timer settings, one or more events, one or more candidate rates (e.g., indicating a quantity of reconfigurations that can occur over a given time period), and/or other information that may indicate to a network entity that it is permissible to reconfigure a forwarding-capable network entity, such as the forwarding-capable network entity 1020. In some aspects, the request for differential utility information may indicate one or more candidate reconfiguration rate control settings, such as one or more candidate timer settings, one or more candidate events, and/or one or more candidate rates (e.g., indicating a quantity of reconfigurations that can occur over a given time period), among other examples.

In some aspects, the request for differential utility information may indicate supporting information associated with the forwarding-capable network entity 1020. The supporting information may indicate information to facilitate the calculation or determination of the differential utility information. For example, the supporting information may include an identifier of the forwarding-capable network entity 1020, a location of the forwarding-capable network entity 1020, an orientation of the forwarding-capable network entity 1020, an operating frequency band of the forwarding-capable network entity 1020, a range of the forwarding-capable network entity 1020, a span of forwarding angles of the forwarding-capable network entity 920, information indicative of an amplification gain, directivity, and/or beamforming gain of the forwarding-capable network entity 1020, and/or an estimated (e.g., virtual) effective isotropic radiated power (EIRP) associated with the forwarding-capable network entity 1020, among other examples. The estimated (e.g., virtual) EIRP may be an EIRP of the forwarding-capable network entity 1020 when the forwarding-capable network entity 1020 is viewed as (or considered as) a virtual transmit (Tx) array.

The second network entity 1010 and the third network entity 1015 may determine (e.g., may calculate) differential utility for respective candidate reconfiguration rate control settings indicated by the request. The second network entity 1010 and the third network entity 1015 may determine (e.g., may calculate) the differential utility based on, or otherwise associated with, the supporting information. For example, the third network entity 1015 may determine a differential utility for each candidate reconfiguration rate control setting indicated by the request transmitted by the third network entity 1015. For example, the third network entity 1015 may determine a differential utility associated with a given candidate reconfiguration rate control setting based on determining a difference between a current utility associated with one or more network entities (e.g., UEs) served by the third network entity 1015 and a determined utility associated with the one or more network entities (e.g., UEs) served by the third network entity 1015 if the given candidate reconfiguration rate control setting were to be applied for reconfigurations of the forwarding-capable network entity 1020. The third network entity 1015 may determine differential utilities for respective candidate reconfiguration rate control settings in a similar manner. In some aspects, the third network entity 1015 may generate a differential utility table, where entries in the differential utility table correspond to respective differential utilities determined by the third network entity 1015. In some aspects, an entry in the differential utility table may indicate multiple differential values for respective utility metrics for a given candidate reconfiguration rate control setting. For example, an entry in the differential utility table may indicate a first differential value associated with spectral efficiency, a second differential value associated with latency, a third differential value associated with throughput, and so on.

The second network entity 1010 may determine (e.g., may calculate) differential utility for respective candidate reconfiguration rate control settings indicated by the request from the third network entity 1015 in a similar manner. For example, the second network entity 1010 may determine a differential utility associated with a given candidate reconfiguration rate control setting based on determining a difference between a current utility associated with one or more network entities (e.g., UEs) served by the second network entity 1010 and a determined utility associated with the one or more network entities (e.g., UEs) served by the second network entity 1010 if the given candidate reconfiguration rate control setting were to be applied for reconfigurations of the forwarding-capable network entity 1020. The second network entity 1010 may determine differential utilities for respective candidate reconfiguration rate control settings in a similar manner as described elsewhere herein. In some aspects, the second network entity 1010 may generate a differential utility table, where entries in the differential utility table correspond to respective differential utilities determined by the second network entity 1010.

As shown by reference number 1050, the second network entity 1010 may transmit, and the third network entity 1015 may receive, a differential utility message. The differential utility message may indicate the differential utilities determined by the second network entity 1010 (e.g., may indicate the differential utility table). In some aspects, the differential utility message may indicate one or more recommended reconfiguration rate control settings (e.g., from the one or more candidate reconfiguration rate control settings indicated by the request from the third network entity 1015). For example, the second network entity 1010 may determine one or more reconfiguration rate control settings that are associated with a positive differential utility (e.g., where a switch to the reconfiguration rate control setting results in improved user experience for one or more network entities served by the second network entity 1010). In some aspects, the second network entity 1010 may determine one or more reconfiguration rate control settings that are associated with the greatest positive differential utility. In other aspects, the one or more recommended reconfiguration rate control settings may be any candidate reconfiguration rate control setting associated with a positive differential utility as determined by the second network entity 1010.

As shown by reference number 1055, the third network entity 1015 may determine a candidate reconfiguration rate control setting with a best network utility based on, or otherwise associated with, received differential utility message(s) and the differential utility determined by the third network entity 1015. For example, the third network entity 1015 may determine a network utility value for each candidate reconfiguration rate control setting. The third network entity 1015 may determine a network utility value based on, or otherwise associated with, one or more differential utility values indicated by received differential utility message(s) and a differential utility value determined (e.g., calculated) by the third network entity 1015 for a given candidate reconfiguration rate control setting. For example, the third network entity 1015 may aggregate or sum the differential utility values for the given candidate reconfiguration rate control setting.

In some aspects, the network utility value for a given candidate reconfiguration rate control setting (e.g., a given candidate timer setting) may be a weighted sum (e.g., a weighted linear combination) of a differential utility value determined by the third network entity 1015 and one or more differential utility values indicated by differential utility message(s) received by the third network entity 1015. For example, the third network entity 1015 may determine the network utility value by summing the differential utility value determined by the third network entity 1015 (e.g., applying a first weight or a first factor to the differential utility value) and the one or more differential utility values (e.g., applying a second one or more weights or a second one or more factors to the differential utility value). For example, the differential utility value determined by the third network entity 1015 may have a weight that results in the differential utility value contributing more (or having a greater impact on) the weighted sum than other differential utility values indicated by differential utility message(s) received by the third network entity 1015. For example, the weighted sum may enable the network performance of the network entities served by the forwarding-capable network entity 1020 to be prioritized over other network entities (e.g., that may be impacted or receive interference due to the operations of the forwarding-capable network entity 1020). For example, the weighted sum may be a weighted sum of values including a first value and a second value. First differential utility information (e.g., determined by the third network entity 1015) may indicate the first value. Second differential utility information (e.g., received by the third network entity 1015 from another network entity) may indicate the second value. The first value may be associated with a first weight and the second value may be associated with a second weight. In some aspects, the first weight may be greater than the second weight.

The third network entity 1015 may determine network utility values for respective candidate reconfiguration rate control settings. As shown by reference number 1060, the third network entity 1015 may update the reconfiguration rate control setting associated with the forwarding-capable network entity 1020. For example, the third network entity 1015 may determine a network utility value that indicates a greatest improvement of network performance (e.g., a highest network utility value). If the network utility value indicates an overall improvement for network performance (e.g., if the network utility value is a positive value), then the third network entity 1015 may determine that the reconfiguration rate control setting associated with the forwarding-capable network entity 1020 is to be updated to the candidate reconfiguration rate control setting associated with the network utility value. If the network utility value indicates no improvement or a degradation of network performance (e.g., if the network utility value is zero or a negative value), then the third network entity 1015 may determine that the reconfiguration rate control setting associated with the forwarding-capable network entity 1020 is not to be updated.

In some aspects, the third network entity 1015 may determine whether to update the reconfiguration rate control setting using a probability metric. The probability metric may be a value that indicates a probability that the third network entity 1015 actually updates the reconfiguration rate control setting in response to the third network entity 1015 determining to update the reconfiguration rate control setting. For example, if the probability metric has a value of 0.8, this may indicate that the third network entity 1015 actually updates the reconfiguration rate control setting 80% of the time that the third network entity 1015 determines to update the reconfiguration rate control setting. For example, the probability metric may have a value that is less than 1 and greater than 0. The third network entity 1015 may be configured with the value of the probability metric (e.g., via another network entity or a control entity). Using the probability metric may reduce a likelihood of a ping-pong effect of switching the reconfiguration rate control setting each time there is a positive network utility value (e.g., if there is a slight or small positive network utility value this may result in the third network entity 1015 frequently changing the reconfiguration rate control setting in response to small changes in network performance or network conditions).

For example, the third network entity 1015 may update an amount of time associated with a timer based on, in response to, or otherwise associated with determining to update the reconfiguration rate control setting associated with the forwarding-capable network entity 1020. As described elsewhere herein, the timer may be associated with indicating an allowable (e.g., a minimum) amount of time between forwarding configurations being transmitted to and/or applied by the forwarding-capable network entity 1020.

As shown by reference number 1065, the third network entity 1015 may determine whether it is permissible to reconfigure the forwarding-capable network entity 1020 in accordance with the reconfiguration rate control setting of the forwarding-capable network entity 1020. For example, the third network entity 1015 may determine whether it is permissible to reconfigure the forwarding-capable network entity 1020 based on an amount of time since the first forwarding configuration was transmitted and/or applied (e.g., as described above in connection with reference number 1030). For example, the third network entity 1015 may determine whether it is permissible to reconfigure the forwarding-capable network entity 1020 based on, or otherwise associated with, one or more reconfiguration rate control settings determined and/or updated by the third network entity 1015. In some aspects, the third network entity 1015 may determine whether the amount of time since the first forwarding configuration was transmitted and/or applied is greater than or equal to an amount of time indicated by a reconfiguration rate control setting (e.g., a timer setting). For example, the third network entity 1015 may determine whether a timer that is initiated when the first forwarding configuration was transmitted and/or applied (e.g., as described above in connection with reference number 1030) has expired.

If the amount of time since the first forwarding configuration was transmitted and/or applied is greater than or equal to the amount of time indicated by a reconfiguration rate control setting (e.g., if the timer is expired), then the third network entity 1015 may determine that it is permissible to reconfigure the forwarding-capable network entity 1020. If the amount of time since the first forwarding configuration was transmitted and/or applied is less than the amount of time indicated by a reconfiguration rate control setting (e.g., if the timer is not expired), then the third network entity 1015 may determine that it is not permissible to reconfigure the forwarding-capable network entity 1020 (e.g., the third network entity 1015 may refrain from reconfiguring the forwarding-capable network entity 1020). As another example, the third network entity 1015 may determine a quantity of configurations that have been transmitted to and/or applied by the forwarding-capable network entity 1020 within a time window. The third network entity 1015 may determine whether the quantity of configurations satisfies a rate threshold indicated by a reconfiguration rate control setting (e.g., an allowable rate setting). If the quantity of configurations satisfies the rate threshold, then the third network entity 1015 may determine that it is not permissible to reconfigure the forwarding-capable network entity 1020 (e.g., the third network entity 1015 may refrain from reconfiguring the forwarding-capable network entity 1020). If the quantity of configurations does not satisfy the rate threshold, then the third network entity 1015 may determine that it is permissible to reconfigure the forwarding-capable network entity 1020.

As shown by reference number 1070, the third network entity 1015 may transmit, and the forwarding-capable network entity 1020 may receive, a second forwarding configuration. The third network entity 1015 may transmit the second forwarding configuration based on, in response to, or otherwise associated with determining that it is permissible to reconfigure the forwarding-capable network entity 1020 (e.g., as described elsewhere herein).

Additionally, or alternatively, the forwarding-capable network entity 1020 may determine (e.g., a controller of the forwarding-capable network entity 1020 may determine) whether it is permissible to apply the second forwarding configuration. For example, the third network entity 1015 may transmit, and the forwarding-capable network entity 1020 may receive, an indication of the reconfiguration rate control information. The forwarding-capable network entity 1020 may determine whether it is permissible to apply the second forwarding configuration in a similar manner as the third network entity 1015 determining whether that it is permissible to reconfigure the forwarding-capable network entity 1020 (e.g., as described elsewhere herein, such as in connection with reference number 1065). The forwarding-capable network entity 1020 may apply the second forwarding configuration and forward one or more signals in accordance with the second forwarding configuration.

The third network entity 1015 and/or the forwarding-capable network entity 1020 may continue to operate in accordance with the reconfiguration rate control setting(s). The third network entity 1015 and/or the forwarding-capable network entity 1020 may operate in accordance with the reconfiguration rate control information for a given period of time (e.g., after which the third network entity 1015 and/or the forwarding-capable network entity 1020 may operate without configuration rate control and/or in accordance with previous or default reconfiguration rate control setting). In some aspects, the third network entity 1015 and/or the forwarding-capable network entity 1020 may operate in accordance with the reconfiguration rate control setting until the third network entity 1015 determines to update the reconfiguration rate control setting, as described in more detail elsewhere herein.

As indicated above, FIG. 10 is provided as an example. Other examples may differ from what is described with respect to FIG. 10.

Figure 11:
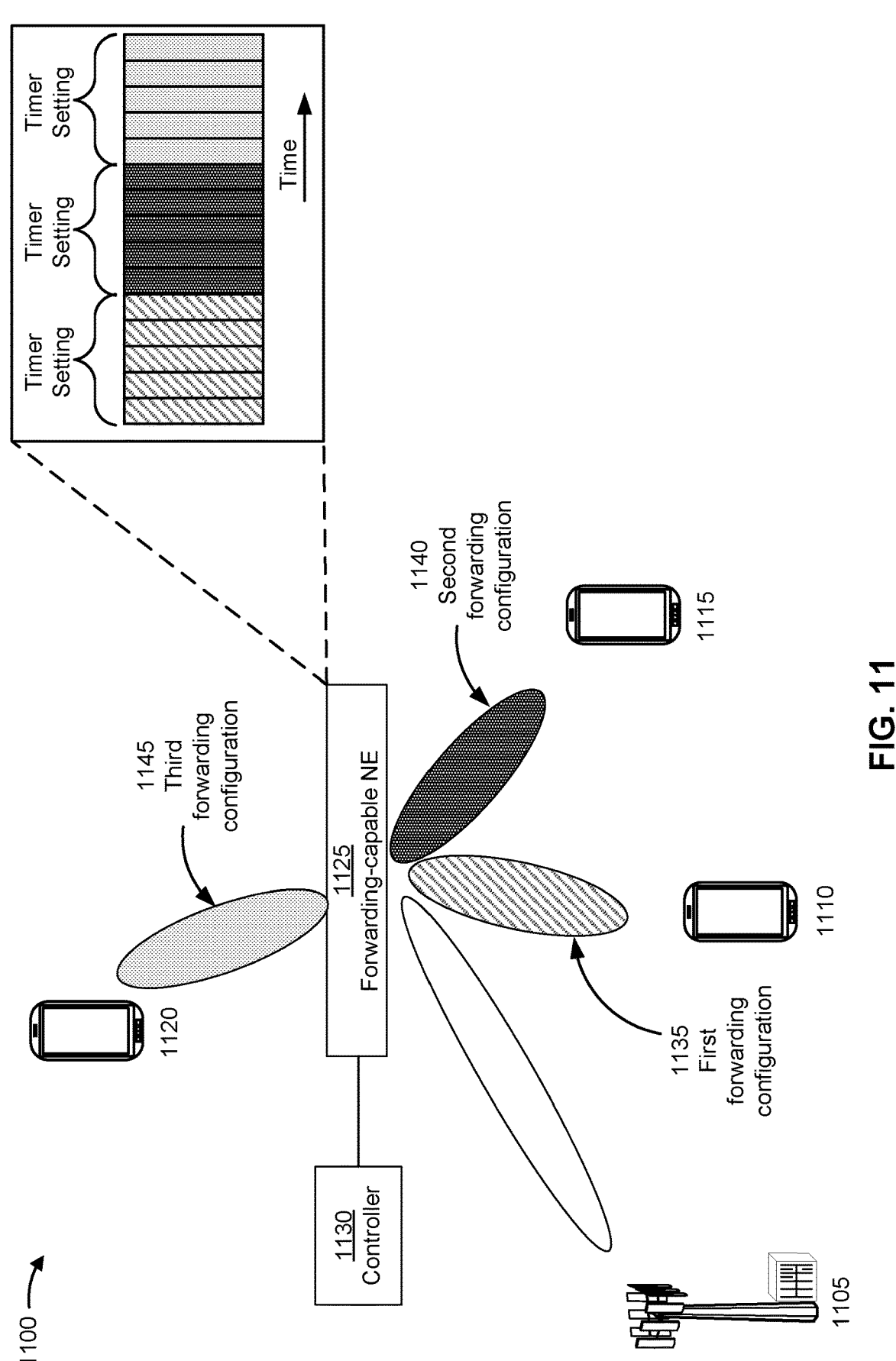
FIG. 11 is a diagram of an example associated with forwarding-capable network entity reconfiguration rate control, in accordance with the present disclosure.

FIG. 11 is a diagram of an example 1100 associated with forwarding-capable network entity reconfiguration rate control, in accordance with the present disclosure. As shown in FIG. 11, a first network entity 1105, a second network entity 1110, a third network entity 1115, and a fourth network entity 1120 may communicate with each other (e.g., in a wireless network, such as the wireless network 300). The first network entity 1105, the second network entity 1110, the third network entity 1115, and the fourth network entity 1120 may be the network entity 102, the network entity 104, the network entity 106, the apparatus 200, the network node 310, the UE 320, a base station, a CU, a DU, and/or an RU, among other examples.

In some aspects, the first network entity 1105 may be a network node 310 (e.g., a base station, a CU, a DU, and/or an RU) and the second network entity 1110, the third network entity 1115, and the fourth network entity 1120 may each be UEs. For example, the second network entity 1110, the third network entity 1115, and the fourth network entity 1120 may be UEs operating in a cell that is served and/or supported by the first network entity 1105. The first network entity 1105 may be, or may be similar to, the third network entity 915 and/or the third network entity 1015. For example, as shown in FIG. 11, the first network entity 1105 may be associated with a forwarding-capable network entity 1125 (e.g., that includes a controller 1130 in a similar manner as described elsewhere herein). For example, the first network entity 1105 may communicate with the second network entity 1110, the third network entity 1115, and/or the fourth network entity 1120 via respective indirect links associated with the forwarding-capable network entity 1125.

For example, as shown in FIG. 11, the forwarding-capable network entity 1125 may be associated with a first forwarding configuration 1135. When the forwarding-capable network entity 1125 is configured with and/or is applying the first forwarding configuration 1135, the reconfigurable elements of the forwarding-capable network entity 1125 may be configured to forward (e.g., redirect, reflect, refract, and/or otherwise forward) signals in a spatial direction toward the second network entity 1010. Similarly, the forwarding-capable network entity 1125 may be associated with a second forwarding configuration 1140. When the forwarding-capable network entity 1125 is configured with and/or is applying the second forwarding configuration 1140, the reconfigurable elements of the forwarding-capable network entity 1125 may be configured to forward (e.g., redirect, reflect, refract, and/or otherwise forward) signals in a spatial direction toward the third network entity 1115. The forwarding-capable network entity 1125 may be associated with a third forwarding configuration 1145. When the forwarding-capable network entity 1125 is configured with and/or is applying the third forwarding configuration 1145, the reconfigurable elements of the forwarding-capable network entity 1125 may be configured to forward (e.g., redirect, reflect, refract, and/or otherwise forward) signals in a spatial direction toward the fourth network entity 1120.

In a similar manner as described elsewhere herein, the forwarding-capable network entity 1125 may be associated with one or more reconfiguration rate control settings. As an example, the reconfiguration rate control setting shown in FIG. 11 is a timer setting (e.g., an amount of time that is needed between reconfigurations of the forwarding-capable network entity 1125). The amount of time may be in terms of milliseconds, slots, symbols (e.g., OFDM symbols), and/or another time interval. As shown in FIG. 11, the timer setting may indicate an amount of time associated with a timer (e.g., five slots or five OFDM symbols). The time between the forwarding-capable network entity 1125 being configured with and/or applying different forwarding configurations may be greater than or equal to the amount of time associated with the timer. In some aspects, the first network entity 1105 may transmit different forwarding configurations to the forwarding-capable network entity 1125 (and/or the controller 1130) based on, in response to, or otherwise associated with an expiration of the timer. For example, the first network entity 1105 may transmit an indication of the first forwarding configuration 1135. The first network entity 1105 may initiate the timer after (at or when) transmitting the first forwarding configuration 1135. After an expiration of the timer (e.g., after the amount of time from transmitting the first forwarding configuration 1135 is greater than or equal to the amount of timer indicated by the timer setting), the first network entity 1105 may transmit an indication of the second forwarding configuration 1140. In other words, the first network entity 1105 may be permitted to reconfigure the forwarding-capable network entity 1125 based on, in response to, or otherwise associated with the expiration of the timer.

As another example, the forwarding-capable network entity 1125 (and/or the controller 1130) may apply different forwarding configurations based on, in response to, or otherwise associated with an expiration of the timer. For example, the first network entity 1105 may transmit, and the forwarding-capable network entity 1125 (and/or the controller 1130) may receive, an indication of the first forwarding configuration 1135, the second forwarding configuration 1140, and the second forwarding configuration 1140. The forwarding-capable network entity 1125 (and/or the controller 1130) may apply the first forwarding configuration 1135 at a first time. The forwarding-capable network entity 1125 (and/or the controller 1130) may initiate the timer after (or at) the first time. After an expiration of the timer, the forwarding-capable network entity 1125 (and/or the controller 1130) may apply the second forwarding configuration 1140 at a second time (e.g., based on, or otherwise associated with, a difference between the first time and the second time being greater than or equal to an amount of time indicated by the timer setting). The forwarding-capable network entity 1125 (and/or the controller 1130) may initiate the timer after (or at) the second time. After an expiration of the timer, the forwarding-capable network entity 1125 (and/or the controller 1130) may apply the third forwarding configuration 1145 at a third time (e.g., based on, or otherwise associated with, a difference between the second time and the third time being greater than or equal to an amount of time indicated by the timer setting).

As a result, a rate at which the forwarding-capable network entity 1125 is reconfigured may be controlled. This may allow enough time for other network entities (e.g., that may experience interference caused by the forwarding-capable network entity 1125 forwarding one or more signals) to measure the interference and perform one or more operations to mitigate the interference.

As indicated above, FIG. 11 is provided as an example. Other examples may differ from what is described with respect to FIG. 11.

Figure 12:
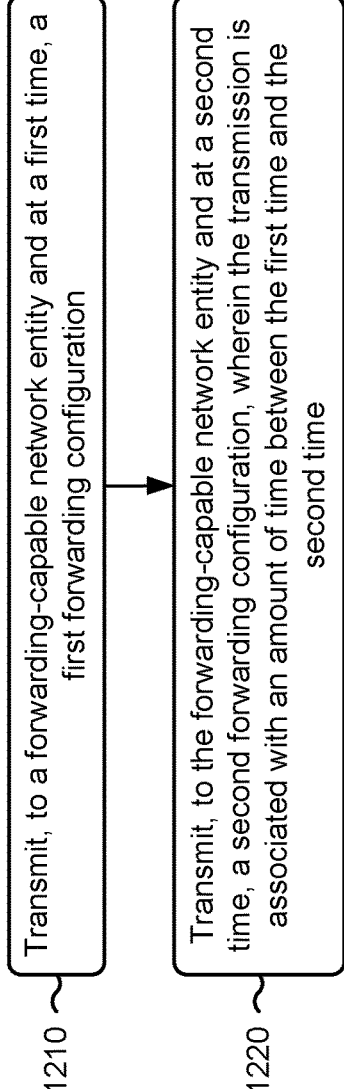
FIG. 12 is a diagram illustrating an example process performed, for example, by a first network entity, in accordance with the present disclosure.

FIG. 12 is a diagram illustrating an example process 1200 performed, for example, by a first network entity, in accordance with the present disclosure. Example process 1200 is an example where the first network entity (e.g., the third network entity 915, the third network entity 1015, the network entity 102, the network entity 104, the network entity 106, the apparatus 200, the network node 310, the network entity 402, the network entity 404, a base station, a CU, a DU, and/or an RU) performs operations associated with forwarding-capable network entity reconfiguration rate control.

As shown in FIG. 12, in some aspects, process 1200 may include transmitting, to a forwarding-capable network entity and at a first time, a first forwarding configuration (block 1210). For example, the first network entity (e.g., using communication manager 1508 and/or transmission component 1504, depicted in FIG. 15) may transmit, to a forwarding-capable network entity and at a first time, a first forwarding configuration, as described above.

As further shown in FIG. 12, in some aspects, process 1200 may include transmitting, to the forwarding-capable network entity and at a second time, a second forwarding configuration, where the transmission is associated with an amount of time between the first time and the second time (block 1220). For example, the first network entity (e.g., using communication manager 1508 and/or transmission component 1504, depicted in FIG. 15) may transmit, to the forwarding-capable network entity and at a second time, a second forwarding configuration, where the transmission is associated with an amount of time between the first time and the second time, as described above.

Process 1200 may include additional aspects, such as any single aspect or any combination of aspects described below and/or in connection with one or more other processes described elsewhere herein.

In a first aspect, process 1200 includes receiving from a second network entity, information indicating that a forwarding configuration rate of the forwarding-capable network entity is to be restricted, and transmitting the second forwarding configuration includes transmitting the second forwarding configuration in association with receiving the information.

In a second aspect, alone or in combination with the first aspect, the amount of time is associated with a timer that is initiated at the first time, and transmitting the second forwarding configuration includes transmitting the second forwarding configuration in association with an expiration of the timer.

In a third aspect, alone or in combination with one or more of the first and second aspects, process 1200 includes receiving, from a second network entity, an indication of an amount of time associated with the timer.

In a fourth aspect, alone or in combination with one or more of the first through third aspects, the amount of time is associated with a timer that is initiated at the first time, where the amount of time associated with the timer is associated with first differential utility information, and where the first differential utility information is associated with respective candidate amounts of time, including the amount of time, associated with the timer.

In a fifth aspect, alone or in combination with one or more of the first through fourth aspects, process 1200 includes transmitting, to a second network entity, the first differential utility information.

In a sixth aspect, alone or in combination with one or more of the first through fifth aspects, the first differential utility information indicates differences between a first value of a utility metric associated with the amount of time and second values of the utility metric associated with the respective candidate amounts of time.

In a seventh aspect, alone or in combination with one or more of the first through sixth aspects, the utility metric includes at least one of a spectral efficiency, a latency, a metric indicative of user experience, or one or more channel quality metrics.

In an eighth aspect, alone or in combination with one or more of the first through seventh aspects, process 1200 includes transmitting, to a second network entity, a request for second differential utility information, where the second differential utility information is associated with the respective candidate amounts of time, and receiving, from the second network entity, an indication of the second differential utility information, and where the amount of time is associated with the first differential utility information and the second differential utility information.

In a ninth aspect, alone or in combination with one or more of the first through eighth aspects, the amount of time is associated with a weighted sum of values, where the values includes a first value and a second value, where the first differential utility information indicates the first value, and where the second differential utility information indicates the second value.

In a tenth aspect, alone or in combination with one or more of the first through ninth aspects, process 1200 includes updating the amount of time associated with the timer.

In an eleventh aspect, alone or in combination with one or more of the first through tenth aspects, updating the amount of time includes updating the amount of time to a candidate amount of time from the respective candidate amounts of time, where the candidate amount of time is associated with a weighted sum of differential utility values that is indicative of a positive utility change for the first network entity, where the differential utility values include a first value and a second value, and where the first differential utility information indicates the first value and the second differential utility information indicates the second value.

In a twelfth aspect, alone or in combination with one or more of the first through eleventh aspects, updating the amount of time includes updating the amount of time using a probability metric.

In a thirteenth aspect, alone or in combination with one or more of the first through twelfth aspects, transmitting the request includes transmitting, to the second network entity, supporting information associated with the request.

In a fourteenth aspect, alone or in combination with one or more of the first through thirteenth aspects, the second network entity is associated with a servable area that is within a range of the forwarding-capable network entity.

In a fifteenth aspect, alone or in combination with one or more of the first through fourteenth aspects, the range includes a forwarding spatial angular span of the forwarding-capable network entity.

In a sixteenth aspect, alone or in combination with one or more of the first through fifteenth aspects, the supporting information includes at least one of an identifier of the forwarding-capable network entity, a location of the forwarding-capable network entity, an orientation of the forwarding-capable network entity, an operating frequency band of the forwarding-capable network entity, a span of forwarding angles of the forwarding-capable network entity, or information indicative of an amplification gain, directivity, or beamforming gain of the forwarding-capable network entity.

In a seventeenth aspect, alone or in combination with one or more of the first through sixteenth aspects, process 1200 includes receiving, from a second network entity, a request for the first differential utility information, and transmitting, to the second network entity, an indication of the first differential utility information.

In an eighteenth aspect, alone or in combination with one or more of the first through seventeenth aspects, the first network entity is configured to serve a coverage area, and the second network entity is included in a set of one or more network entities that are associated with respective forwarding-capable network entities that are capable of impacting the coverage area.

In a nineteenth aspect, alone or in combination with one or more of the first through eighteenth aspects, the first differential utility information indicates one or more differential utility values for each candidate amount of time of the respective candidate amounts of time.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

58

Figure 13:
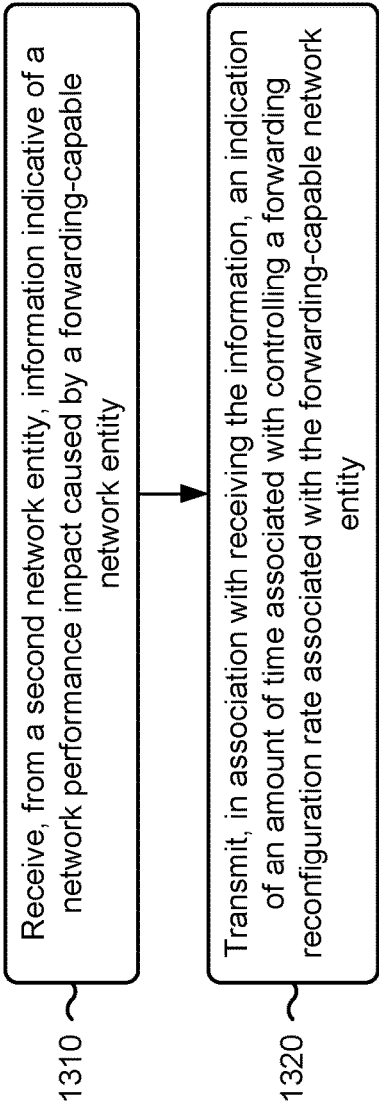
FIG. 13 is a diagram illustrating an example process performed, for example, by a first network entity, in accordance with the present disclosure.

FIG. 13 is a diagram illustrating an example process 1300 performed, for example, by a first network entity, in accordance with the present disclosure. Example process 1300 is an example where the first network entity (e.g., the first network entity 905, the third network entity 1015, the network entity 102, the network entity 104, the network entity 106, the apparatus 200, the network node 310, the network entity 402, the network entity 404, a base station, a CU, a DU, and/or an RU) performs operations associated with forwarding-capable network entity reconfiguration rate control.

As shown in FIG. 13, in some aspects, process 1300 may include receiving, from a second network entity, information indicative of a network performance impact caused by a forwarding-capable network entity (block 1310). For example, the first network entity (e.g., using communication manager 1608 and/or reception component 1602, depicted in FIG. 16) may receive, from a second network entity, information indicative of a network performance impact caused by a forwarding-capable network entity, as described above.

As further shown in FIG. 13, in some aspects, process 1300 may include transmitting, in association with receiving the information, an indication of an amount of time associated with controlling a forwarding reconfiguration rate associated with the forwarding-capable network entity (block 1320). For example, the first network entity (e.g., using communication manager 1608 and/or transmission component 1604, depicted in FIG. 16) may transmit, in association with receiving the information, an indication of an amount of time associated with controlling a forwarding reconfiguration rate associated with the forwarding-capable network entity, as described above.

Process 1300 may include additional aspects, such as any single aspect or any combination of aspects described below and/or in connection with one or more other processes described elsewhere herein.

In a first aspect, the second network entity is associated with a first frequency band and the forwarding-capable network entity is associated with a second frequency band.

In a second aspect, alone or in combination with the first aspect, the amount of time is associated with an allowable amount of time between times at which the forwarding-capable network entity is configured.

In a third aspect, alone or in combination with one or more of the first and second aspects, information associated with the amount of time is associated with differential utility information, where the differential utility information includes first differential utility information associated with the second network entity and second differential utility information.

In a fourth aspect, alone or in combination with one or more of the first through third aspects, process 1300 includes transmitting, to the second network entity, a request for the first differential utility information, and receiving, from the second network entity and in response to the request, an indication of the first differential utility information.

In a fifth aspect, alone or in combination with one or more of the first through fourth aspects, process 1300 includes transmitting, to a set of one or more network entities, a request for the second differential utility information, and receiving, from the set of one or more network entities and in response to the request, an indication of the second differential utility information.

In a sixth aspect, alone or in combination with one or more of the first through fifth aspects, the set of one or more network entities includes the second network entity.

In a seventh aspect, alone or in combination with one or more of the first through sixth aspects, the set of one or more network entities includes network entities associated with serviceable areas that are impactable by operations of the forwarding-capable network entity.

In an eighth aspect, alone or in combination with one or more of the first through seventh aspects, transmitting the request includes transmitting, to the set of one or more network entities, supporting information associated with the request.

In a ninth aspect, alone or in combination with one or more of the first through eighth aspects, the supporting information includes at least one of an identifier of the forwarding-capable network entity, a location of the forwarding-capable network entity, an orientation of the forwarding-capable network entity, an operating frequency band of the forwarding-capable network entity, a span of forwarding angles of the forwarding-capable network entity, or information indicative of an amplification gain, directivity, or beamforming gain of the forwarding-capable network entity.

In a tenth aspect, alone or in combination with one or more of the first through ninth aspects, the differential utility information indicates differences between a first value of a utility metric associated with the amount of time and second values of the utility metric associated with respective candidate amounts of time.

In an eleventh aspect, alone or in combination with one or more of the first through tenth aspects, the utility metric includes at least one of a spectral efficiency, a latency, a metric indicative of user experience, or one or more channel quality metrics.

In a twelfth aspect, alone or in combination with one or more of the first through eleventh aspects, the differential utility information includes one or more recommended amounts of time.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
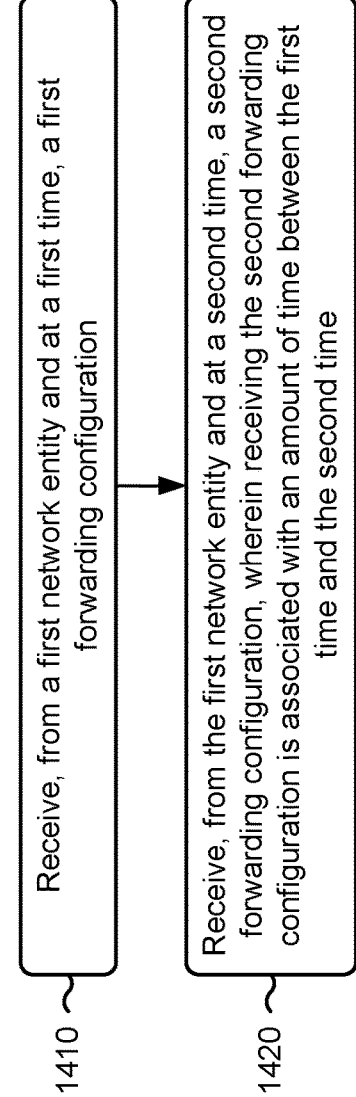
FIG. 14 is a diagram illustrating an example process performed, for example, by a forwarding-capable network entity, in accordance with the present disclosure.

FIG. 14 is a diagram illustrating an example process 1400 performed, for example, by a forwarding-capable network entity, in accordance with the present disclosure. Example process 1400 is an example where the forwarding-capable network entity (e.g., the forwarding-capable network entity 360, the forwarding-capable network entity 920, and/or the forwarding-capable network entity 1020) performs operations associated with forwarding-capable network entity reconfiguration rate control.

As shown in FIG. 14, in some aspects, process 1400 may include receiving, from a first network entity and at a first time, a first forwarding configuration (block 1410). For example, the forwarding-capable network entity (e.g., using communication manager 1708 and/or reception component 1702, depicted in FIG. 17) may receive, from a first network entity and at a first time, a first forwarding configuration, as described above.

As further shown in FIG. 14, in some aspects, process 1400 may include receiving, from the first network entity and at a second time, a second forwarding configuration, receiving the second forwarding configuration is associated with an amount of time between the first time and the second time (block 1420). For example, the forwarding-capable network entity (e.g., using communication manager 1708 and/or reception component 1702, depicted in FIG. 17) may receive, from the first network entity and at a second time, a second forwarding configuration, receiving the second forwarding configuration is associated with an amount of time between the first time and the second time, as described above.

Process 1400 may include additional aspects, such as any single aspect or any combination of aspects described below and/or in connection with one or more other processes described elsewhere herein.

In a first aspect, process 1400 includes receiving, from a second network entity, information indicating that a forwarding configuration rate of the forwarding-capable network entity is to be restricted, and receiving the second forwarding configuration includes receiving the second forwarding configuration in association with receiving the information.

In a second aspect, alone or in combination with the first aspect, the amount of time is associated with a timer that is initiated at the first time, and receiving the second forwarding configuration includes receiving or applying the second forwarding configuration in association with an expiration of the timer.

In a third aspect, alone or in combination with one or more of the first and second aspects, process 1400 includes receiving, from a second network entity or the first network entity, an indication of the amount of time.

In a fourth aspect, alone or in combination with one or more of the first through third aspects, process 1400 includes applying the second forwarding configuration in association with the expiration of the timer.

In a fifth aspect, alone or in combination with one or more of the first through fourth aspects, the forwarding-capable network entity includes at least one of a reconfigurable intelligent surface, an amplify-and-forward-capable network entity, or a decode-and-forward-capable network entity.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
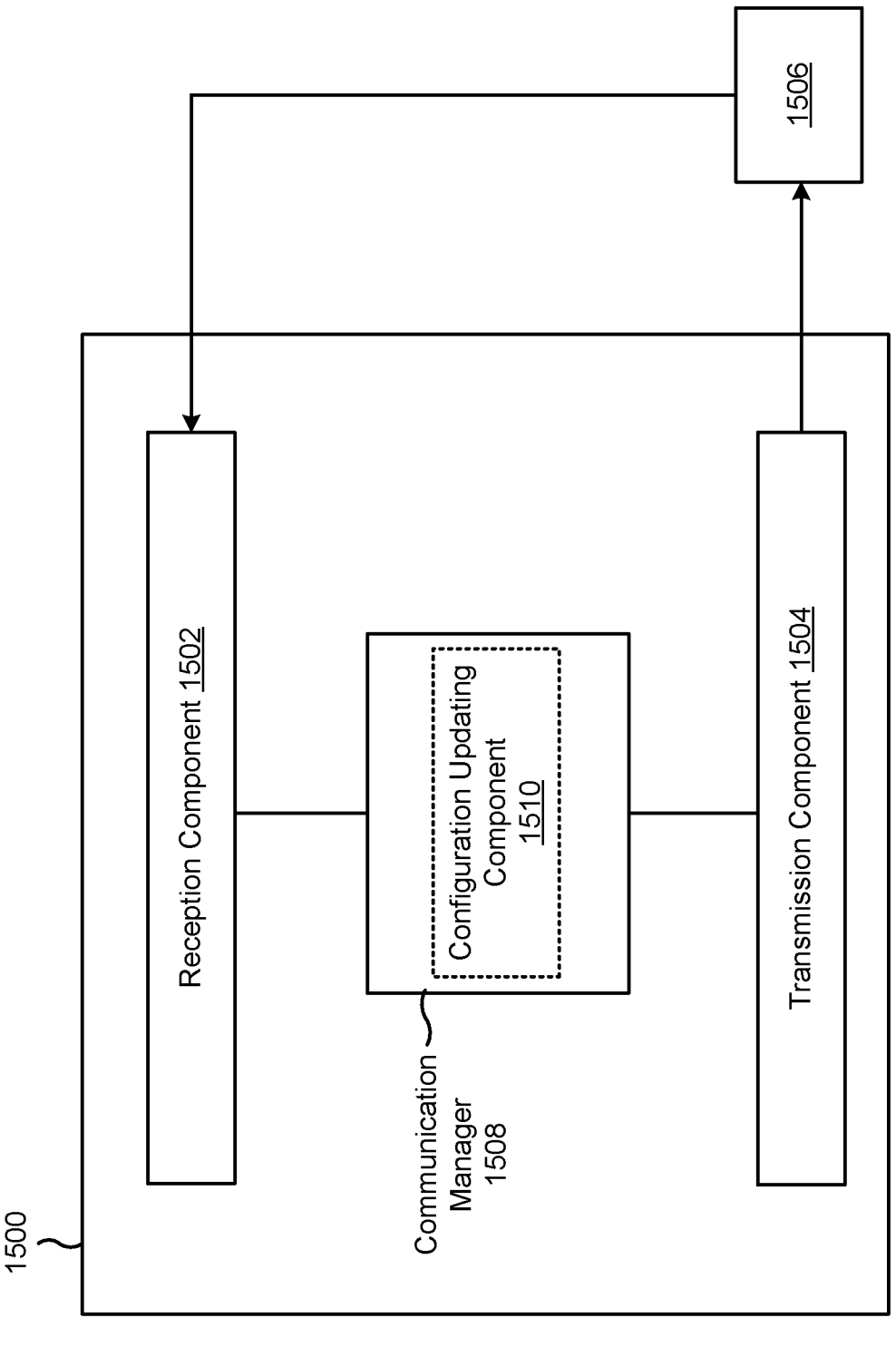
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a network entity, or a network entity may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 1508. The communication manager 1508 may be, or may be similar to, the communication manager 110, the communication manager 114, the communication manager 235, the communication manager 350, and/or the communication manager 460. The communication manager 1508 may include a configuration updating component 1510, among other examples.

In some aspects, the apparatus 1500 may be configured to perform one or more operations described herein in connection with FIGS. 9-11. Additionally, or alternatively, the apparatus 1500 may be configured to perform one or more processes described herein, such as process 1200 of FIG. 12, or a combination thereof. In some aspects, the apparatus 1500 and/or one or more components shown in FIG. 15 may include one or more components of the network entity described in connection with FIG. 4. Additionally, or alternatively, one or more components shown in FIG. 15 may be implemented within one or more components described in connection with FIG. 4. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network entity described in connection with FIG. 4.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the network entity described in connection with FIG. 4. In some aspects, the transmission component 1504 may be co-located with the reception component 1502 in a transceiver.

The transmission component 1504 may transmit, to a forwarding-capable network entity and at a first time, a first forwarding configuration. The transmission component 1504 may transmit, to the forwarding-capable network entity and at a second time, a second forwarding configuration, wherein the transmission is associated with an amount of time between the first time and the second time.

The reception component 1502 may receive from a second network entity, information indicating that a forwarding configuration rate of the forwarding-capable network entity is to be restricted.

The reception component 1502 may receive, from a second network entity, an indication of an amount of time associated with the timer.

The transmission component 1504 may transmit, to a second network entity, the first differential utility information.

The transmission component 1504 may transmit, to a second network entity, a request for second differential utility information, wherein the second differential utility information is associated with the respective candidate amounts of time.

The reception component 1502 may receive, from the second network entity, an indication of the second differential utility information, wherein the amount of time is associated with the first differential utility information and the second differential utility information.

The configuration updating component 1510 may update the amount of time associated with the timer.

The reception component 1502 may receive, from a second network entity, a request for the first differential utility information.

The transmission component 1504 may transmit, to the second network entity, an indication of the first differential utility information.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
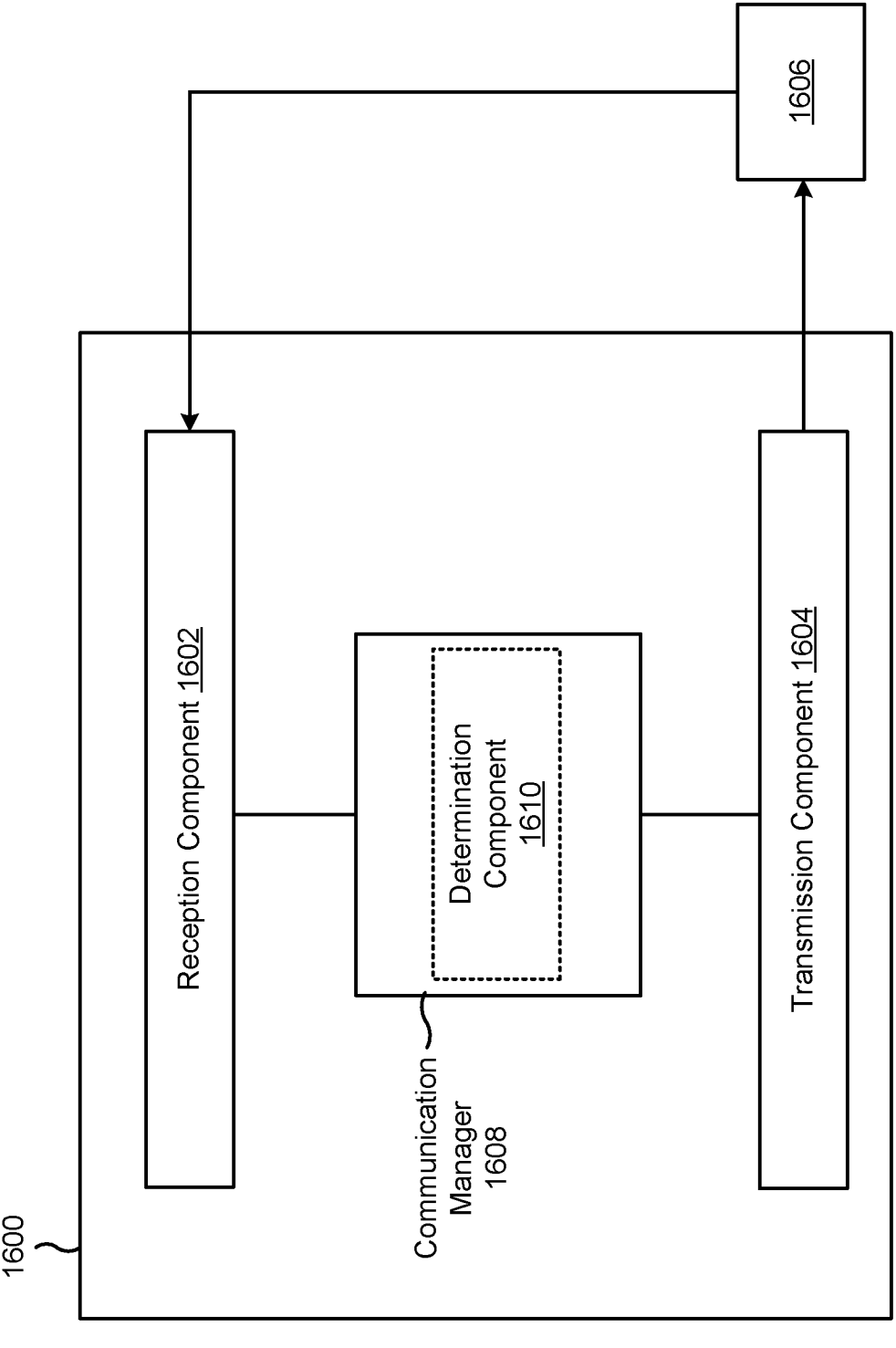
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be a network entity, or a network entity may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 1608. The communication manager 1608 may be, or may be similar to, the communication manager 110, the communication manager 114, the communication manager 235, the communication manager 350, and/or the communication manager 460. The communication manager 1608 may include a determination component 1610, among other examples.

In some aspects, the apparatus 1600 may be configured to perform one or more operations described herein in connection with FIGS. 9-11. Additionally, or alternatively, the apparatus 1600 may be configured to perform one or more processes described herein, such as process 1300 of FIG. 13, or a combination thereof. In some aspects, the apparatus 1600 and/or one or more components shown in FIG. 16 may include one or more components of the network entity described in connection with FIG. 4. Additionally, or alternatively, one or more components shown in FIG. 16 may be implemented within one or more components described in connection with FIG. 4. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the network entity described in connection with FIG. 4.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the network entity described in connection with FIG. 4. In some aspects, the transmission component 1604 may be co-located with the reception component 1602 in a transceiver.

The reception component 1602 may receive, from a second network entity, information indicative of a network performance impact caused by a forwarding-capable network entity. The transmission component 1604 may transmit, in association with receiving the information, an indication of an amount of time associated with controlling a forwarding reconfiguration rate associated with the forwarding-capable network entity.

The determination component 1610 may determine one or more reconfiguration rate control settings. The determination component 1610 may determine the one or more reconfiguration rate control settings information indicative of a network performance impact. The one or more reconfiguration rate control settings may include the amount of time associated with controlling the forwarding reconfiguration rate.

The transmission component 1604 may transmit, to the second network entity, a request for the first differential utility information.

The reception component 1602 may receive, from the second network entity and in response to the request, an indication of the first differential utility information.

The transmission component 1604 may transmit, to a set of one or more network entities, a request for the second differential utility information.

The reception component 1602 may receive, from the set of one or more network entities and in response to the request, an indication of the second differential utility information.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
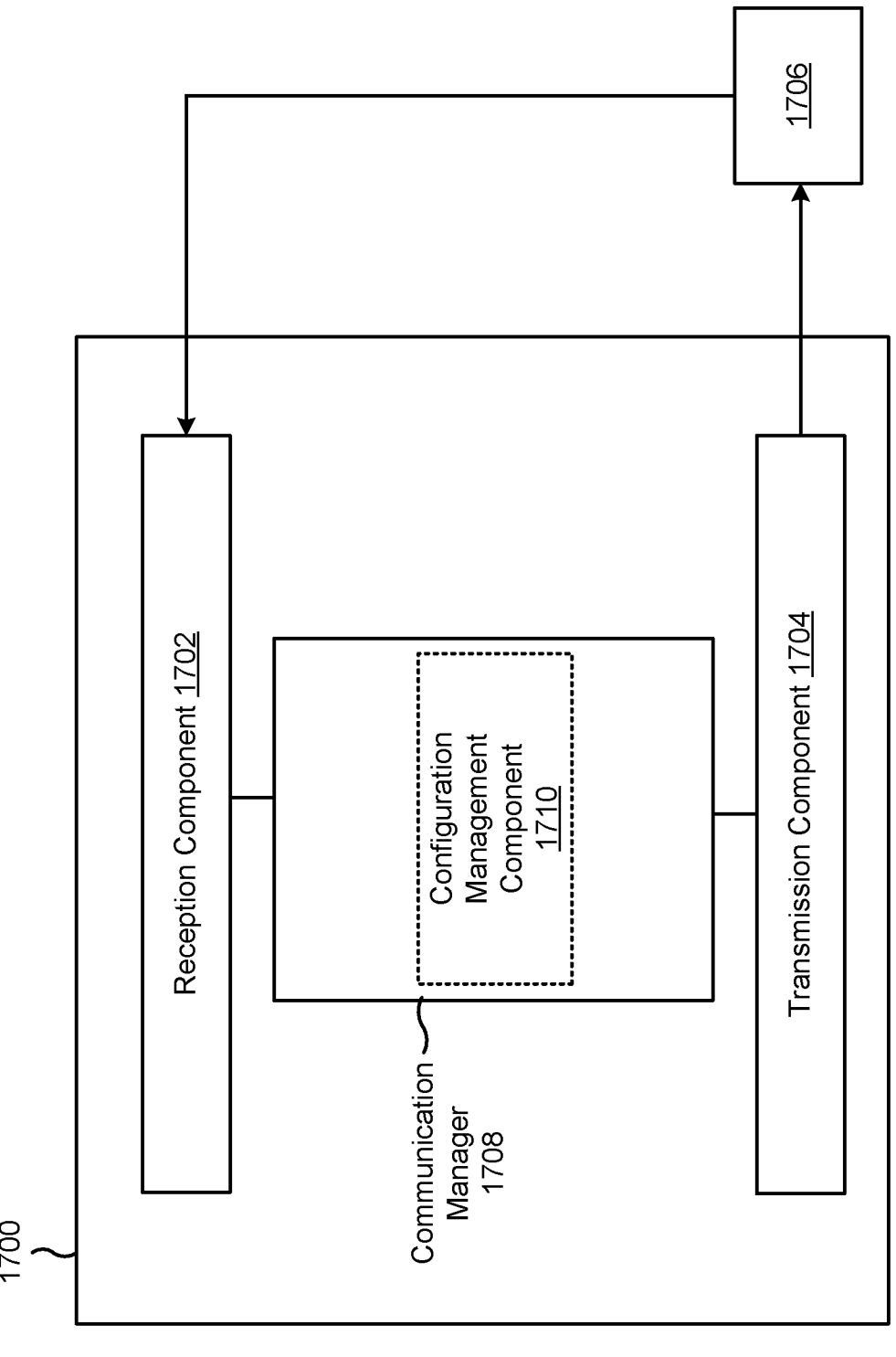
FIG. 17 is a diagram of an example apparatus for wireless communication, in accordance with the present disclosure.

FIG. 17 is a diagram of an example apparatus 1700 for wireless communication, in accordance with the present disclosure. The apparatus 1700 may be a forwarding-capable network entity, or a forwarding-capable network entity may include the apparatus 1700. For example, the apparatus 1700 may be a controller of the forwarding-capable network entity or the controller may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 1708. The communication manager 1708 may include a configuration management component 1710, among other examples.

In some aspects, the apparatus 1700 may be configured to perform one or more operations described herein in connection with FIGS. 9-11. Additionally, or alternatively, the apparatus 1700 may be configured to perform one or more processes described herein, such as process 1400 of FIG. 14, or a combination thereof. In some aspects, the apparatus 1700 and/or one or more components shown in FIG. 17 may include one or more components of the forwarding-capable network entity described in connection with FIG. 4. Additionally, or alternatively, one or more components shown in FIG. 17 may be implemented within one or more components described in connection with FIG. 4. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the forwarding-capable network entity described in connection with FIG. 4.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the forwarding-capable network entity described in connection with FIG. 4. In some aspects, the transmission component 1704 may be co-located with the reception component 1702 in a transceiver.

The reception component 1702 may receive, from a first network entity and at a first time, a first forwarding configuration. The reception component 1702 may receive, from the first network entity and at a second time, a second forwarding configuration, wherein receiving the second forwarding configuration is associated with an amount of time between the first time and the second time.

The reception component 1702 may receive, from a second network entity, information indicating that a forwarding configuration rate of the forwarding-capable network entity is to be restricted.

The reception component 1702 may receive, from a second network entity or the first network entity, an indication of the amount of time.

The configuration management component 1710 may apply the second forwarding configuration in association with the expiration of the timer.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a first network entity, comprising: transmitting, to a forwarding-capable network entity and at a first time, a first forwarding configuration; and transmitting, to the forwarding-capable network entity and at a second time, a second forwarding configuration, wherein the transmission is associated with an amount of time between the first time and the second time.

Aspect 2: The method of Aspect 1, further comprising: receiving from a second network entity, information indicating that a forwarding configuration rate of the forwarding-capable network entity is to be restricted; and wherein transmitting the second forwarding configuration comprises: transmitting the second forwarding configuration in association with receiving the information, wherein transmitting the second forwarding configuration comprises: transmitting the second forwarding configuration in association with receiving the information.

Aspect 3: The method of any of Aspects 1-2, wherein the amount of time is associated with a timer that is initiated at the first time, and wherein transmitting the second forwarding configuration comprises: transmitting the second forwarding configuration in association with an expiration of the timer.

Aspect 4: The method of Aspect 3, further comprising: receiving, from a second network entity, an indication of an amount of time associated with the timer.

Aspect 5: The method of any of Aspects 1-4, wherein the amount of time is associated with a timer that is initiated at the first time, wherein the amount of time is associated with first differential utility information, and wherein the first differential utility information is associated with respective candidate amounts of time, including the amount of time, associated with the timer.

Aspect 6: The method of Aspect 5, further comprising: transmitting, to a second network entity, the first differential utility information.

Aspect 7: The method of any of Aspects 5-6, wherein the first differential utility information indicates differences between a first value of a utility metric associated with the amount of time and second values of the utility metric associated with the respective candidate amounts of time.

Aspect 8: The method of Aspect 7, wherein the utility metric includes at least one of: a spectral efficiency, a latency, a metric indicative of user experience, or one or more channel quality metrics.

Aspect 9: The method of any of Aspects 5-8, further comprising: transmitting, to a second network entity, a request for second differential utility information, wherein the second differential utility information is associated with the respective candidate amounts of time; and receiving, from the second network entity, an indication of the second differential utility information, wherein the amount of time is associated with the first differential utility information and the second differential utility information.

Aspect 10: The method of Aspect 9, wherein the amount of time is associated with a weighted sum of values, wherein the values includes a first value and a second value, wherein the first differential utility information indicates the first value, and wherein the second differential utility information indicates the second value.

Aspect 11: The method of any of Aspects 9-10, further comprising: updating the amount of time associated with the timer.

Aspect 12: The method of Aspect 11, wherein updating the amount of time comprises: updating the amount of time to a candidate amount of time from the respective candidate amounts of time, wherein the candidate amount of time is associated with a weighted sum of differential utility values that is indicative of a positive utility change for the first network entity, wherein the differential utility values include a first value and a second value, and wherein the first differential utility information indicates the first value and the second differential utility information indicates the second value.

Aspect 13: The method of any of Aspects 11-12, wherein updating the amount of time comprises: updating the amount of time using a probability metric.

Aspect 14: The method of any of Aspects 9-13, wherein transmitting the request comprises: transmitting, to the second network entity, supporting information associated with the request.

Aspect 15: The method of Aspect 14, wherein the second network entity is associated with a servable area that is within a range of the forwarding-capable network entity.

Aspect 16: The method of Aspect 15, wherein the range includes a forwarding spatial angular span of the forwarding-capable network entity.

Aspect 17: The method of any of Aspects 14-15, wherein the supporting information includes at least one of: an identifier of the forwarding-capable network entity, a location of the forwarding-capable network entity, an orientation of the forwarding-capable network entity, an operating frequency band of the forwarding-capable network entity, a span of forwarding angles of the forwarding-capable network entity, or information indicative of an amplification gain, directivity, or beamforming gain of the forwarding-capable network entity.

Aspect 18: The method of any of Aspects 5-17, further comprising: receiving, from a second network entity, a request for the first differential utility information; and transmitting, to the second network entity, an indication of the first differential utility information.

Aspect 19: The method of Aspect 18, wherein the first network entity is configured to serve a coverage area, and wherein the second network entity is included in a set of one or more network entities that are associated with respective forwarding-capable network entities that are capable of impacting the coverage area.

Aspect 20: The method of any of Aspects 5-19, wherein the first differential utility information indicates one or more differential utility values for each candidate amount of time of the respective candidate amounts of time.

Aspect 21: A method of wireless communication performed by a first network entity, comprising: receiving, from a second network entity, information indicative of a network performance impact caused by a forwarding-capable network entity; and transmitting, in association with receiving the information, an indication of an amount of time associated with controlling a forwarding reconfiguration rate associated with the forwarding-capable network entity.

Aspect 22: The method of Aspect 21, wherein the second network entity is associated with a first frequency band and the forwarding-capable network entity is associated with a second frequency band.

Aspect 23: The method of any of Aspects 21-22, wherein the amount of time is associated with an allowable amount of time between times at which the forwarding-capable network entity is configured.

Aspect 24: The method of any of Aspects 21-23, wherein information associated with the amount of time is associated with differential utility information, wherein the differential utility information includes first differential utility information associated with the second network entity and second differential utility information.

Aspect 25: The method of Aspect 24, further comprising: transmitting, to the second network entity, a request for the first differential utility information; and receiving, from the second network entity and in response to the request, an indication of the first differential utility information.

Aspect 26: The method of any of Aspects 24-25, further comprising: transmitting, to a set of one or more network entities, a request for the second differential utility information; and receiving, from the set of one or more network entities and in response to the request, an indication of the second differential utility information.

Aspect 27: The method of Aspect 26, wherein the set of one or more network entities includes the second network entity.

Aspect 28: The method of any of Aspects 26-27, wherein the set of one or more network entities includes network entities associated with serviceable areas that are impactable by operations of the forwarding-capable network entity.

Aspect 29: The method of any of Aspects 26-28, wherein transmitting the request comprises: transmitting, to the set of one or more network entities, supporting information associated with the request.

Aspect 30: The method of Aspect 29, wherein the supporting information includes at least one of: an identifier of the forwarding-capable network entity, a location of the forwarding-capable network entity, an orientation of the forwarding-capable network entity, an operating frequency band of the forwarding-capable network entity, a span of forwarding angles of the forwarding-capable network entity, or information indicative of an amplification gain, directivity, or beamforming gain of the forwarding-capable network entity.

Aspect 31: The method of any of Aspects 24-30, wherein the differential utility information indicates differences between a first value of a utility metric associated with the amount of time and second values of the utility metric associated with respective candidate amounts of time.

Aspect 32: The method of Aspect 31, wherein the utility metric includes at least one of: a spectral efficiency, a latency, a metric indicative of user experience, or one or more channel quality metrics.

Aspect 33: The method of any of Aspects 24-32, wherein the differential utility information includes one or more recommended amounts of time.

Aspect 34: A method of wireless communication performed by a forwarding-capable network entity, comprising: receiving, from a first network entity and at a first time, a first forwarding configuration; and receiving, from the first network entity and at a second time, a second forwarding configuration, wherein receiving the second forwarding configuration is associated with an amount of time between the first time and the second time.

Aspect 35: The method of Aspect 34, further comprising: receiving, from a second network entity, information indicating that a forwarding configuration rate of the forwarding-capable network entity is to be restricted; and wherein receiving the second forwarding configuration comprises: receiving the second forwarding configuration in association with receiving the information, wherein receiving the second forwarding configuration comprises: receiving the second forwarding configuration in association with receiving the information.

Aspect 36: The method of any of Aspects 34-35, wherein the amount of time is associated with a timer that is initiated at the first time, and wherein receiving the second forwarding configuration comprises: receiving or applying the second forwarding configuration in association with an expiration of the timer.

Aspect 37: The method of Aspect 36, further comprising: receiving, from a second network entity or the first network entity, an indication of the amount of time.

Aspect 38: The method of any of Aspects 36-37, further comprising: applying the second forwarding configuration in association with the expiration of the timer.

Aspect 39: The method of any of Aspects 34-38, wherein the forwarding-capable network entity includes at least one of: a reconfigurable intelligent surface, an amplify-and-forward-capable network entity, or a decode-and-forward-capable network entity.

Aspect 40: An apparatus for wireless communication at a device, comprising one or more processors; memory coupled with the processor; and instructions stored in the memory and executable by the processor to cause the apparatus to perform the method of one or more of Aspects 1-39.

Aspect 41: A device for wireless communication, comprising one or more memories and one or more processors coupled to the one or more memories, the one or more processors configured to perform the method of one or more of Aspects 1-39.

Aspect 42: An apparatus for wireless communication, comprising at least one means for performing the method of one or more of Aspects 1-39.

Aspect 43: A non-transitory computer-readable medium storing code for wireless communication, the code comprising instructions executable by one or more processors to perform the method of one or more of Aspects 1-39.

Aspect 44: A non-transitory computer-readable medium storing a set of instructions for wireless communication, the set of instructions comprising one or more instructions that, when executed by one or more processors of a device, cause the device to perform the method of one or more of Aspects 1-39.

Aspect 45: A device for wireless communication, comprising at least one memory, at least one communication interface and one or more processors coupled to the at least one memory and the at least one communication interface, the device configured to perform the method of one or more of Aspects 1-39.

The foregoing disclosure provides illustration and description but is neither exhaustive nor limiting of the scope of this disclosure. For example, various aspects and examples are disclosed herein, but this disclosure is not limited to the precise form in which such aspects and examples are described. Modifications and variations may be made in light of the above disclosure or may be acquired from practice of the aspects.

As used herein, the term "component" shall be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. Systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, because those skilled in the art understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and/or measuring, among other examples. Also, "determining" can include receiving (such as receiving information), accessing (such as accessing data stored in memory), and/or transmitting (such as transmitting information), among other examples. As another example, "determining" can include resolving, selecting, obtaining, choosing, establishing and other such similar actions.

Even though particular combinations of features are recited in the claims and/or disclosed in the specification, these combinations do not limit the scope of the disclosure. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" covers a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein is critical or essential unless explicitly described as such. Also, as used herein, the articles "a" and "an" include one or more items and may be used interchangeably with "one or more." Further, as used herein, the article "the" includes one or more items referenced in connection with the article "the" and may be used interchangeably with "the one or more." Furthermore, as used herein, the terms "set" and "group" include one or more items and may be used interchangeably with "one or more." Where only one item is intended, the phrase "only one" or similar language is used. Also, as used herein, the terms "has," "have," "having," or the like are open-ended terms that do not limit an element that they modify (e.g., an element "having" A may also have B). Further, as used herein, "based on" is in the inclusive sense, unless otherwise explicitly indicated. For example, "based on" may be used interchangeably with "based at least in part on," "associated with", or "in accordance with" unless otherwise explicitly indicated. The phrase "based on" shall not be construed as a reference to a closed set of information, one or more conditions, one or more factors, or the like. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Also, as used herein, the term "or" is inclusive when used in a series and may be used interchangeably with "and/or," unless explicitly stated otherwise (e.g., if used in combination with "either" or "only one of").

What is claimed is:

1. A first network entity for wireless communication, comprising:
   at least one memory;
   at least one communication interface; and
   at least one processor coupled to the at least one memory and the at least one communication interface, wherein the first network entity is configured to:
      receive, from a second network entity, information indicating that a forwarding configuration rate of the forwarding-capable network entity is to be restricted;
      transmit, to a forwarding-capable network entity at a first time, a first forwarding configuration; and
      transmit, to the forwarding-capable network entity at a second time and in association with receipt of the information, a second forwarding configuration, wherein the transmission of the second forwarding configuration is associated with an amount of time between the first time and the second time.

2. The first network entity of claim 1, wherein the amount of time is associated with a timer that is initiated at the first time, and wherein, to transmit the second forwarding configuration, the first network entity is configured to:
   transmit the second forwarding configuration in association with an expiration of the timer.

3. A first network entity for wireless communication, comprising:
   at least one memory;
   at least one communication interface; and
   at least one processor coupled to the at least one memory and the at least one communication interface, wherein the first network entity is configured to:
      transmit, to a forwarding-capable network entity at a first time, a first forwarding configuration; and
      transmit, to the forwarding-capable network entity at a second time, a second forwarding configuration, wherein the transmission of the second forwarding configuration is associated with an amount of time between the first time and the second time, wherein:
         the amount of time is associated with a timer that is initiated at the first time,
         the amount of time is associated with first differential utility information, and
         the first differential utility information is associated with respective candidate amounts of time, including the amount of time, associated with the timer.

4. The first network entity of claim 3, wherein the first network entity is configured to:
   transmit, to a second network entity, the first differential utility information.

5. The first network entity of claim 3, wherein the first differential utility information indicates differences between a first value of a utility metric associated with the amount of time and second values of the utility metric associated with the respective candidate amounts of time.

6. The first network entity of claim 3, wherein the first network entity is configured to:
   transmit, to a second network entity, a request for second differential utility information, wherein the second differential utility information is associated with the respective candidate amounts of time; and
   receive, from the second network entity, an indication of the second differential utility information, wherein the amount of time is associated with the first differential utility information and the second differential utility information.

7. The first network entity of claim 6, wherein the amount of time is associated with a weighted sum of values, wherein the values includes a first value and a second value,
   wherein the first differential utility information indicates the first value, and
   wherein the second differential utility information indicates the second value.

8. The first network entity of claim 6, wherein the first network entity is configured to:
   update the amount of time associated with the timer.

9. The first network entity of claim 8, wherein, to update the amount of time, the first network entity is configured to:
   update the amount of time to a candidate amount of time from the respective candidate amounts of time,
   wherein the candidate amount of time is associated with a weighted sum of differential utility values that is indicative of a positive utility change for the first network entity,
   wherein the differential utility values include a first value and a second value, and
   wherein the first differential utility information indicates the first value and the second differential utility information indicates the second value.

10. A first network entity for wireless communication, comprising:
   at least one communication interface; and
   one or more processors coupled to the at least one communication interface, wherein the first network entity is configured to:
      receive, from a second network entity, information indicative of a network performance impact caused by a forwarding-capable network entity; and
      transmit, in association with receiving the information, an indication of an amount of time associated with control of a forwarding reconfiguration rate associated with the forwarding-capable network entity.

11. The first network entity of claim 10, wherein the second network entity is associated with a first frequency band and the forwarding-capable network entity is associated with a second frequency band.

12. The first network entity of claim 10, wherein the amount of time is associated with an allowable amount of time between times at which the forwarding-capable network entity is configured.

13. The first network entity of claim 10, wherein information associated with the amount of time is associated with differential utility information,
   wherein the differential utility information includes first differential utility information associated with the second network entity and second differential utility information.

14. The first network entity of claim 13, wherein the first network entity is configured to:
   transmit, to the second network entity, a request for the first differential utility information; and
   receive, from the second network entity and in response to the request, an indication of the first differential utility information.

15. A method of wireless communication performed by a first network entity, comprising:
   transmitting, to a forwarding-capable network entity at a first time, a first forwarding configuration; and
   transmitting, to the forwarding-capable network entity at a second time, a second forwarding configuration, wherein the transmission of the second forwarding configuration is associated with an amount of time between the first time and the second time, wherein:

the amount of time is associated with a timer that is initiated at the first time, the amount of time is associated with first differential utility information, and the first differential utility information is associated with respective candidate amounts of time, including the amount of time, associated with the timer.

16. The method of claim 15, further comprising:

transmitting, to a second network entity, a request for second differential utility information, wherein the second differential utility information is associated with the respective candidate amounts of time; and receiving, from the second network entity, an indication of the second differential utility information, wherein the amount of time is associated with the first differential utility information and the second differential utility information.

17. The method of claim 16, further comprising:

updating the amount of time associated with the timer.

18. The method of claim 17, wherein updating the amount of time comprises:

updating the amount of time using a probability metric.

19. The method of claim 16, wherein transmitting the request comprises:

transmitting, to the second network entity, supporting information associated with the request.

20. The method of claim 19, wherein the second network entity is associated with a servable area that is within a range of the forwarding-capable network entity.

21. The method of claim 20, wherein the range includes a forwarding spatial angular span of the forwarding-capable network entity.

22. The method of claim 19, wherein the supporting information includes at least one of:

an identifier of the forwarding-capable network entity, a location of the forwarding-capable network entity, an orientation of the forwarding-capable network entity, an operating frequency band of the forwarding-capable network entity, a span of forwarding angles of the forwarding-capable network entity, or information indicative of an amplification gain, directivity, or beamforming gain of the forwarding-capable network entity.

23. The method of claim 15, further comprising:

receiving, from a second network entity, a request for the first differential utility information; and transmitting, to the second network entity, an indication of the first differential utility information.

24. A method of wireless communication performed by a first network entity, comprising:

receiving, from a second network entity, information indicative of a network performance impact caused by a forwarding-capable network entity; and transmitting, in association with receiving the information, an indication of an amount of time associated with controlling a forwarding reconfiguration rate associated with the forwarding-capable network entity.

25. The method of claim 24, wherein information associated with the amount of time is associated with differential utility information, wherein the differential utility information includes first differential utility information associated with the second network entity and second differential utility information.

26. The method of claim 25, further comprising:

transmitting, to the second network entity, a request for the first differential utility information; and receiving, from the second network entity and in response to the request, an indication of the first differential utility information.

27. The method of claim 25, further comprising:

transmitting, to a set of one or more network entities, a request for the second differential utility information; and receiving, from the set of one or more network entities and in response to the request, an indication of the second differential utility information.

28. The method of claim 27, wherein transmitting the request comprises:

transmitting, to the set of one or more network entities, supporting information associated with the request.

* * * * *